US008498453B1

(12) United States Patent
Benson et al.

(10) Patent No.: US 8,498,453 B1
(45) Date of Patent: Jul. 30, 2013

(54) EVALUATING DIGITAL IMAGES USING HEAD POINTS

(75) Inventors: Keith Alan Benson, Eden Prairie, MN (US); Thomas Mark Ellis, St. Paul, MN (US); Charmaine O. Light, Eden Prairie, MN (US); Michael John Surma, Eagan, MN (US); Richard Lee Swanson, Hopkins, MN (US)

(73) Assignee: Lifetouch, Inc., Eden Prairie, MN (US)

( * ) Notice: Subject to any disclaimer, the term of this patent is extended or adjusted under 35 U.S.C. 154(b) by 798 days.

(21) Appl. No.: 12/570,803

(22) Filed: Sep. 30, 2009

(51) Int. Cl.
*G06K 9/00* (2006.01)
(52) U.S. Cl.
USPC .......................................................... 382/118
(58) Field of Classification Search
None
See application file for complete search history.

(56) References Cited

U.S. PATENT DOCUMENTS

| 6,862,374 | B1 * | 3/2005 | Nagai et al. ................... 382/285 |
| 7,082,211 | B2 * | 7/2006 | Simon et al. ................... 382/118 |
| 7,114,079 | B1 * | 9/2006 | Cook et al. ..................... 713/186 |
| 7,146,028 | B2 * | 12/2006 | Lestideau ....................... 382/118 |
| 7,379,568 | B2 * | 5/2008 | Movellan et al. .............. 382/118 |
| 2004/0240708 | A1 * | 12/2004 | Hu et al. ......................... 382/103 |
| 2007/0154096 | A1 | 7/2007 | Cao et al. |
| 2007/0183661 | A1 * | 8/2007 | El-Maleh et al. .............. 382/173 |
| 2008/0163880 | A1 * | 7/2008 | Garrell ........................... 132/200 |
| 2008/0246777 | A1 | 10/2008 | Swanson et al. |

FOREIGN PATENT DOCUMENTS

WO      WO 94/26057      11/1994

OTHER PUBLICATIONS

Suh et al. (2003) "Automatic thumbnail cropping and its effectiveness." Proc. 16th Annual ACM Symposium on User Interface Software and Technology, pp. 95-104.*
Wikipedia (http://en.wikipedia.org/wiki/OpenCV); Open CV; Sep. 23, 2009; 3 pages.
FullOpenCVWiki (http://opencv.willowgarage.com/wiki/FullOenCVWiki?action=print); Full OpenCV Wiki; Sep. 23, 2009; 11 pages.
Snapfish by Hewlitt Packard (www.snapfish.com); Sep. 9, 2009; 9 pages.
Datacard Group; Datacard SecureCapture Solution; 2008; 2 pages.
Datacard Group; Select Datacard Tru Photo Solutions; 2004; 2 pages.

* cited by examiner

*Primary Examiner* — Barry Drennan
(74) *Attorney, Agent, or Firm* — Merchant & Gould P.C.

(57) ABSTRACT

An image processing system includes an image analysis module and an error detection module. The image analysis module is configured to analyze a digital image and to locate a plurality of head points of a subject in the digital image. The image analysis module is configured to detect a high hair condition of a subject, and to compute an adjusted top of head point if a high hair condition is present. The error detection module is configured to evaluate the head points identified by the image analysis module by performing a geometry test to evaluate a geometry of the head points.

22 Claims, 45 Drawing Sheets

2502

2504 2506

2508

| 0.91 | 0.81 | 0.76 | 0.41 | 0.67 | 0.83 | 0.89 |
|------|------|------|------|------|------|------|
| 0.94 | 0.68 | 0.51 | 0.38 | 0.61 | 0.79 | 0.96 |
| 0.91 | 0.95 | 0.76 | 0.51 | 0.76 | 0.86 | 0.99 |
| 0.91 | 0.84 | 0.46 | 0.12 | 0.61 | 0.75 | 0.85 |
| 0.86 | 0.77 | 0.51 | 0.24 | 0.67 | 0.67 | 0.91 |
| 0.95 | 0.95 | 0.82 | 0.58 | 0.78 | 0.76 | 0.78 |
| 0.97 | 0.78 | 0.76 | 0.89 | 0.82 | 0.92 | 0.95 |

2510

TABLE OF CONFIDENCE
VALUES

*FIG. 25*

| | | | | | | |
|---|---|---|---|---|---|---|
| 1 | 0.9 | 0.9 | 0.9 | 0.9 | 0.9 | 1 |
| 0.9 | 0.7 | 0.6 | 0.5 | 0.6 | 0.7 | 0.9 |
| 0.9 | 0.6 | 0.3 | 0.1 | 0.3 | 0.6 | 0.9 |
| 0.9 | 0.5 | 0.1 | 0 | 0.1 | 0.5 | 0.9 |
| 0.9 | 0.6 | 0.3 | 0.1 | 0.3 | 0.6 | 0.9 |
| 0.9 | 0.7 | 0.6 | 0.5 | 0.6 | 0.7 | 0.9 |
| 1 | 0.9 | 0.9 | 0.9 | 0.9 | 0.9 | 1 |

WEIGHTING TABLE

FIG. 26

EVALUATING DIGITAL IMAGES USING HEAD POINTS

TECHNICAL FIELD

This disclosure relates generally to the field of digital photography, and more particularly to digital image processing, and more particularly still to identifying head points of a subject and utilizing those head points for processing of a digital image.

BACKGROUND

One of the advantages that digital photography has over traditional film-based photography is that digital images can be further processed even after the camera has taken and stored the image. Because the digital image is stored as digital data that fully describes the digital image, digital processing can be used to manipulate that data in a wide variety of ways. Such processing can include color adjustment or enhancement, filtering (such as blurring), image size adjustment, cropping, and a variety of other processing techniques.

Due to the wide variability of digital images, however, digital image processing is often a very manual and time consuming process. Examples of such variability include differences in color or brightness, and differences in the position or size of the subject within the digital images. Although various tools are available to assist the operator in processing the digital data, the tools generally require the operator to selectively apply the various processes based on the unique characteristics of a particular image. The deficiencies of existing tools are particularly pronounced when large volumes of digital images need to be processed.

Further, because of the manual nature of such image processing tools, the final results are often inconsistent and variable. Such variability is particularly undesirable when a composite product (such as a school yearbook or photo directory) is produced including arrangements of multiple digital images. The lack of uniformity of the images in such products can be very noticeable when arranged in this manner.

Therefore, there is a need for systems and methods for improving the automation of digital image processing, such as to reduce the amount of manual effort required to process the digital images, and to produce final images having improved uniformity and consistency.

SUMMARY

In general terms, this disclosure relates to digital photography, and more particularly to digital image processing, and more particularly still to identifying head points of a subject and utilizing those head points for processing of a digital image, such as to define cropping locations within a digital image.

One aspect is an image processing system comprising a processing device and a memory device. The memory device stores instructions, which when executed by the processor, cause the processor to generate an image analysis module and an error detection module. The image analysis module is configured to analyze a digital image and to locate a plurality of head points of a subject in the digital image. The error detection module is configured to evaluate the head points identified by the image analysis module by performing a geometry test to evaluate a geometry of the head points.

Another aspect is a method of cropping a digital image, the method comprising: identifying within the digital image a first point, the first point representing a top of a subject's head within the digital image; and determining, with a computing device, whether the subject has a high hair condition using at least the first point.

Yet another aspect is a method of checking a location of a first head point identified within a digital image including a plurality of head points, the method comprising: determining, with a computing device, a reference distance as a distance between two of the plurality of head points, other than the first head point; determining, with the computing device, a first distance between the first head point and one of the plurality of head points; and comparing the first distance with the reference distance.

BRIEF DESCRIPTION OF THE DRAWINGS

FIG. 25 illustrates an example table of confidence values generated by the process shown in FIG. 24.

FIG. 26 illustrates an example weighting table for use in the pattern test shown in FIG. 20.

DETAILED DESCRIPTION

Figure 1:
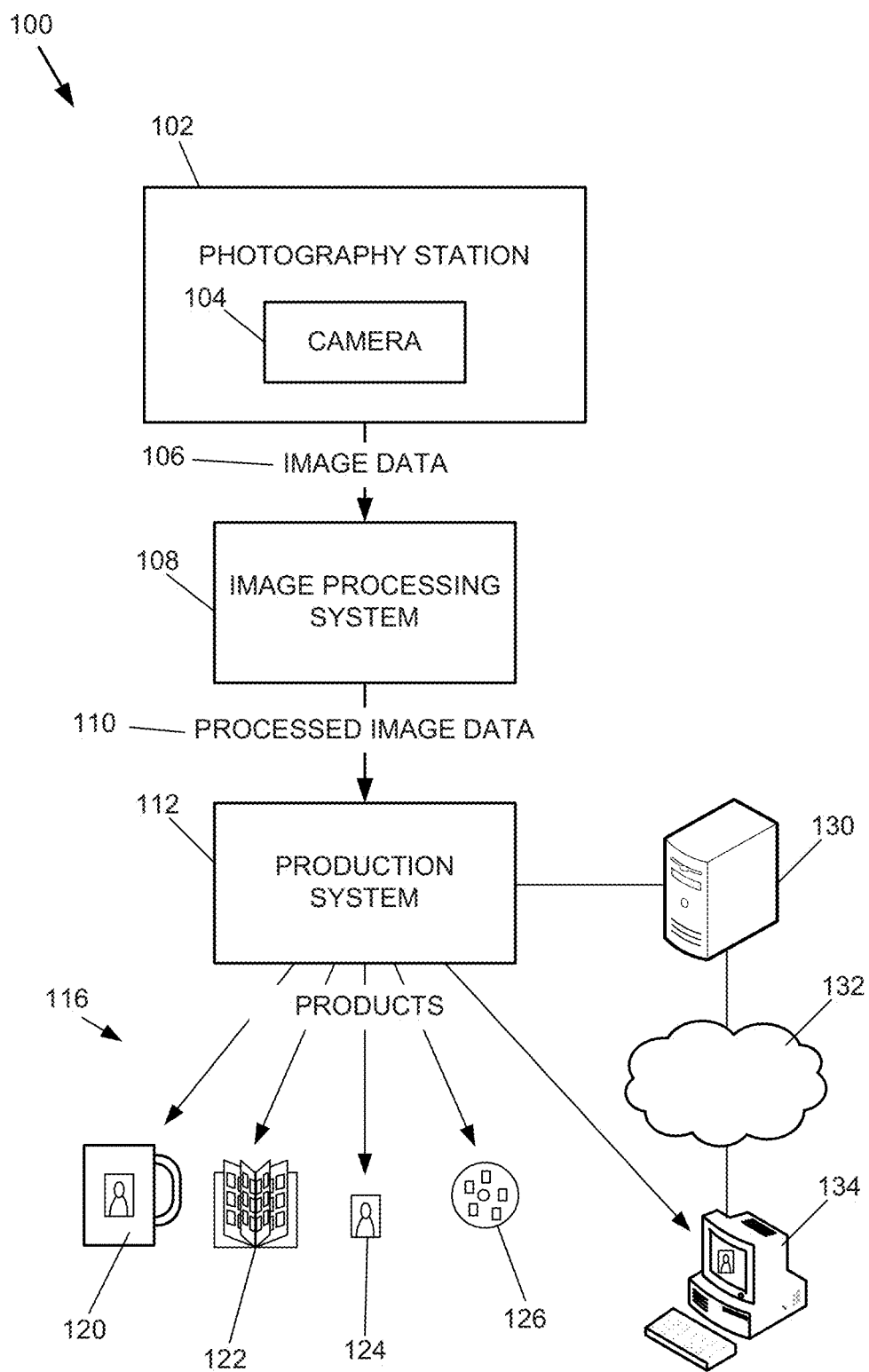
FIG. 1 is a schematic block diagram of an example system for capturing memories.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic block diagram of an example system 100 for capturing memories. In this example, system 100 includes a photography station 102, camera 104, original image data 106, image processing system 108, processed image data 110, production system 112, and products 116. In some embodiments, photography station 102 is a portrait photography station that captures portraits of human and/or animal subjects.

Photography station 102 is a location where a digital image is captured with camera 104. In some embodiments, photography station 102 is a professional photography studio where subjects go to have their photograph taken. In other embodiments, photography station 102 is a mobile photography studio, which is portable so that it can be setup at a remote location, such as in a school, a church, or other building or location. Typically the photography station includes one or more decorative backgrounds, one or more lights, and at least one camera 104.

As discussed below, in some embodiments system 100 includes an image processing system 108 that generates image rendering instructions that define one or more crops that can be applied to image data 106 to generate products 106 (or alternatively generates cropped images directly). In some embodiments, the system 100 allows the photographer to use a wider angle of view, knowing that the final product can be cropped to remove unnecessary space around the subject. This allows the photographer to take photographs more quickly and efficiently.

Camera 104 is a device that operates to capture an image of one or more subjects in the photography studio. Camera 104 is typically a digital camera, although a film camera can also be used in some embodiments. A digital camera typically includes at least an electronic image sensor for converting an optical image to an electric signal, and memory for storing the electric signal in the form of digital image data 106. An example of an electronic image sensor is a charge-coupled device (CCD). Another example of an electronic image sensor is a complementary metal-oxide-semiconductor (CMOS) active-pixel sensor. The electronic image sensor receives light from a subject and background and converts the received light into the electrical signals. The signals are converted into a voltage, which is then sampled, digitized, and stored as digital image data 106 in memory. Examples of memory include memory cards. A wide variety of memory cards are available for use in various embodiments. Examples include: a CompactFlash (CF) memory card (including type I or type II), a Secure Digital (SD) memory card, a mini Secure Digital (miniSD) memory card, a micro Secure Digital (microSD) memory card, a smart media (SM/SMC) card, a Multimedia Card (MMC), an xD-Picture Card (xD), a memory stick (MS) including any of the variations of memory sticks, an NT card, and a USB memory stick (such as a flash-type memory stick). Other embodiments include other types of memory.

Some embodiments of camera 104 further include one or more of a processor, a lens, a shutter activation button, one or more communication systems for communicating with one or more external devices (e.g., a universal serial bus port and communication system), and other components.

In some embodiments, photography station 102 further includes other devices, such as a computing device. Further, some embodiments include a photography control station which interfaces between camera 104 and the computing device. The photography control station, for example, coordinates the operation of the lights, performs some initial processing on digital images received from camera 104 (such as to associate Meta data with the digital images). In some embodiments, after the digital image has been captured, the image data is stored in a computer readable medium. Examples of computer readable media include memory cards (discussed above), a compact disc (CD), a digital versatile disc (DVD), a hard disc of a hard disc drive, or other types of computer readable media.

Image data 106 is next transferred to an image processing system 108. For example, the computer readable medium is brought to the image processing system 108, or is transported through a mail delivery system. In other embodiments, the image data 106 is transferred across a network, such as the Internet (e.g., network 132), or a local area network.

Image processing system 108 is system that receives the image data 106 and processes the original image data 106 to generate processed image data 110. An example of image processing system 108 is illustrated and described in more detail with reference to FIG. 2. For example, in some embodiments the image data 106 is processed to identify one or more head points of the subject. The head points are subsequently used for further processing, such as to define the desired cropping locations to be used by production system 112 to generate a final product 116. Processed image data 110 is then stored in a computer-readable medium. In some embodiments processed image data 110 includes image data 106 as well as additional data defining one or more transformations that can be applied to the original image data 106. In other embodiments, processed image data 110 includes only the additional data pertaining to the image data 106. In some of these embodiments, original image data 106 is separately provided to production system 112. In yet other embodiments, image processing system 108 performs one or more transformations to image data 106 (e.g., cropping), and stores the transformed image data as processed image data 110 without the original image data 106. Examples of transformations include a color correction, a dust correction, a brightness correction, a definition of a crop location, a cropping, a tilt, or other desired transformations or combinations of transformations.

After processed image data 110 has been generated, it is provided to production system 112, which uses the processed image data 110 to produce one or more products 116. Some additional examples of products 116 include a photo mug 120, a picture book 122, a photograph 124, a computer-readable medium 126 storing digital image data, and digital images delivered across network 132. Other examples of products include a composite product (composed of multiple different images), a photo mouse pad, a collage, a key tag, a digital picture frame or digital key chain, a photo card (such as a student identification card, drivers license, holiday or greeting card, security badge, baseball or other sports card, luggage tag, etc.), a photo magnet, an ornament, a puzzle, a calendar, a tote bag, a photo keepsake box, a t-shirt, an apron, or a variety of other products including a photographic image.

In some embodiments, production system 112 includes a web server 130 that is configured to communicate data across a network 132, such as to send products in the form of digital data to a client computing system 134. For example, in some embodiments Web server 130 is in data communication with network 132 and hosts a web site. The network 132 is a digital data communication network, such as the Internet, a local area network, a telephone network, or a smart phone network. A customer uses a client computing system 134 to communicate across the network 132, and accesses the web site of server 130, such as by using a browser software application operating on the client computing system 134. In some embodiments the customer can purchase products through the web site, or can access products that were previously purchased. The products can then be downloaded to client computing system 134, where they are stored in memory. In some embodiments the products continue to be hosted on server 130, but the customer is provided with links that can be inserted into the customer's own web pages or on third party web sites (e.g., Facebook®, MySpace®, etc.) to allow others to view and/or download the products.

Figure 3:
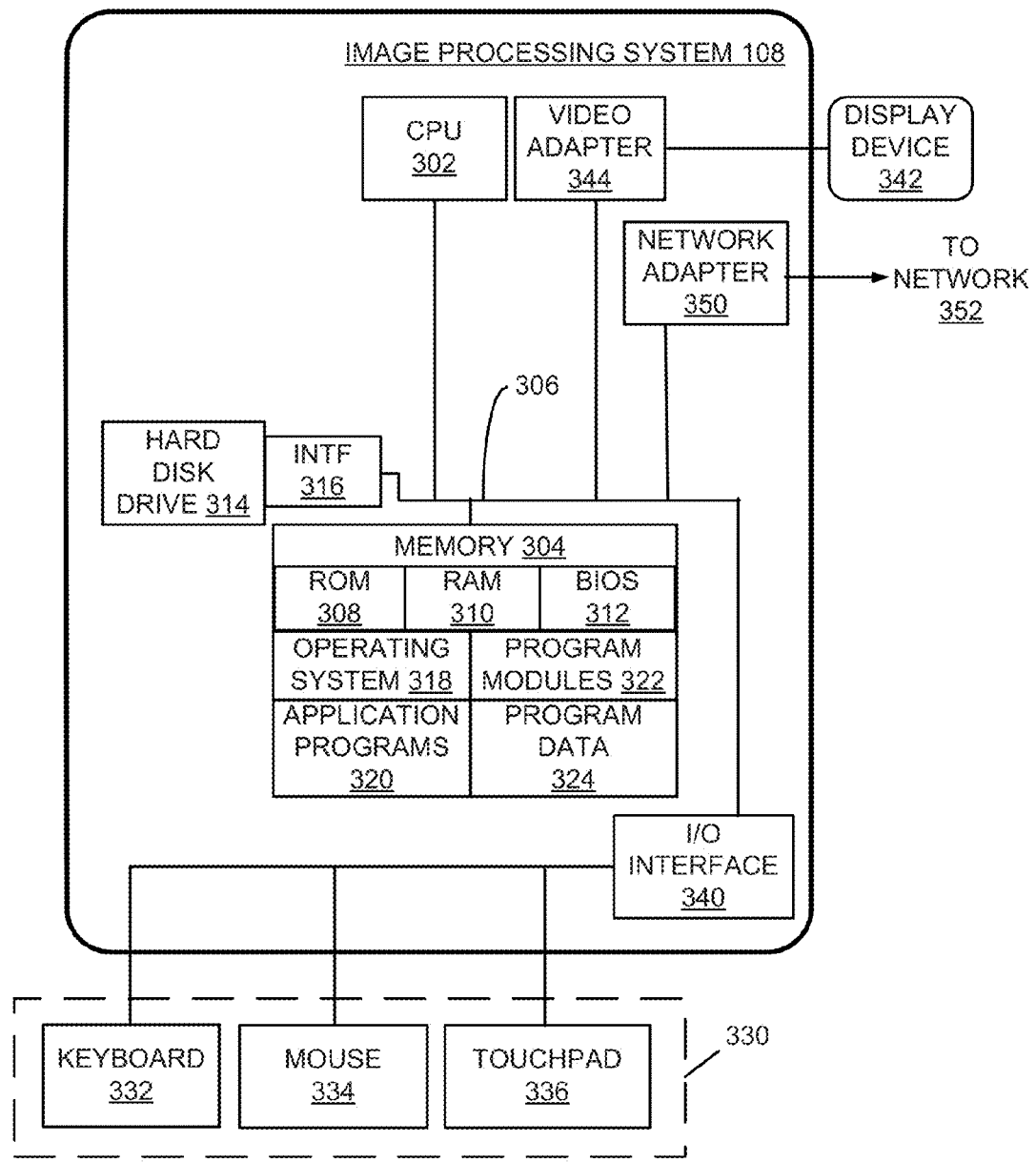
FIG. 3 is a schematic block diagram illustrating an architecture of the example image processing system shown in FIG. 2.

An example of client computing system 134 is a computing device, such as illustrated in FIG. 3. Some embodiments include client computing systems 134 in the form of a smart phone, a laptop computer, a handheld computer, a desktop computer, or other computing systems.

The above description of system 100 provides examples of some of the possible environments in which an image processing system 108 can be implemented. Other embodiments are implemented in yet other systems or environments. Any of the systems described herein can be implemented by one or more devices as additional embodiments.

Figure 2:
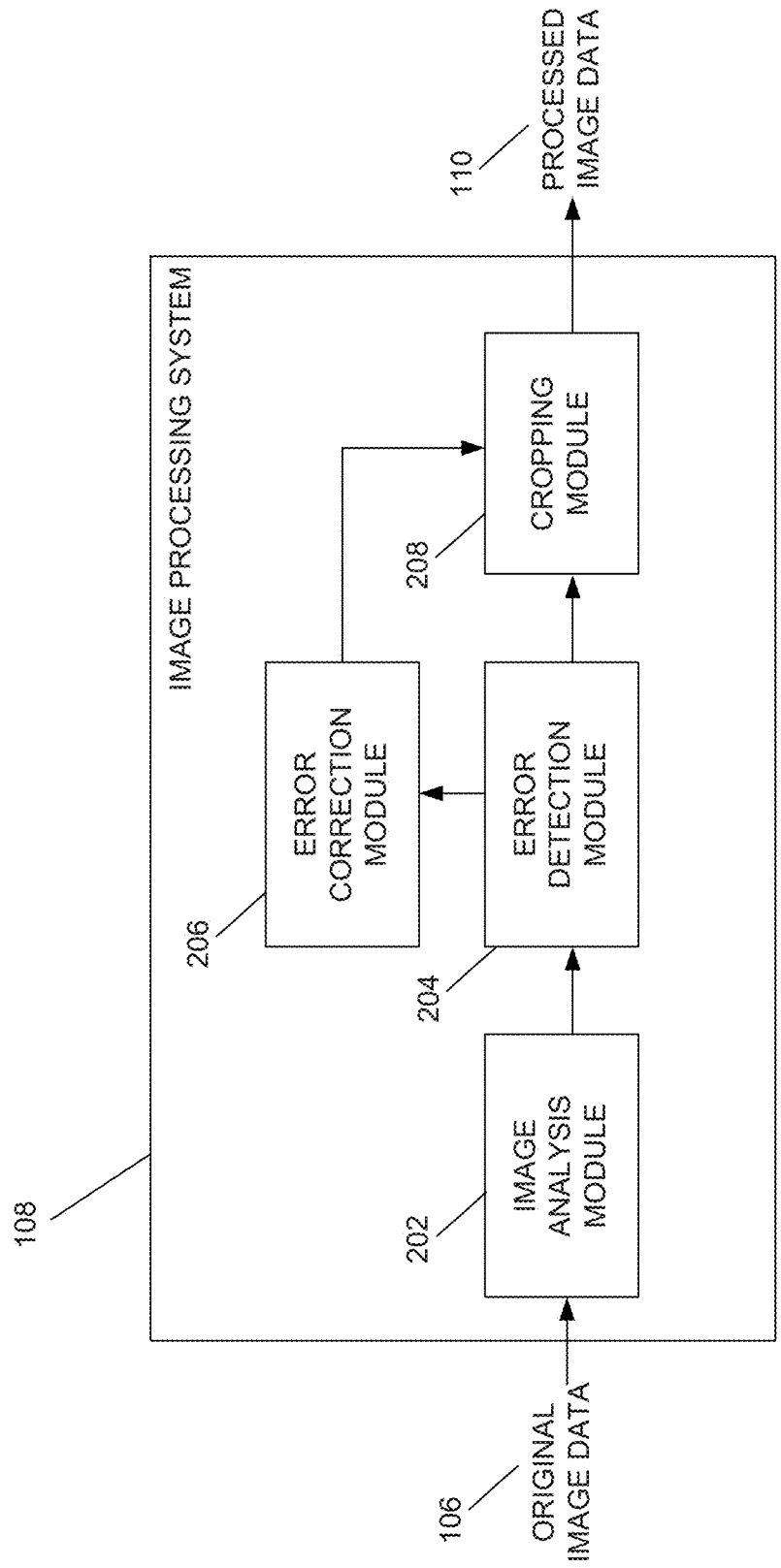
FIG. 2 is a schematic block diagram of an example image processing system of the system shown in FIG. 1.

FIG. 2 is a schematic block diagram of an example image processing system 108. The image processing system 108 receives original image data 106 and generates processed image data 110. In this example, image processing system 108 includes image analysis module 202, error detection module 204, error correction module 206, and cropping module 208.

The various modules (202, 204, 206, and 208) of image processing system 108 operate to automate or partially automate image processing in some embodiments, such as to allow images to be processed more quickly or with less manual labor, and to generate images with greater uniformity and consistency.

Figure 4:
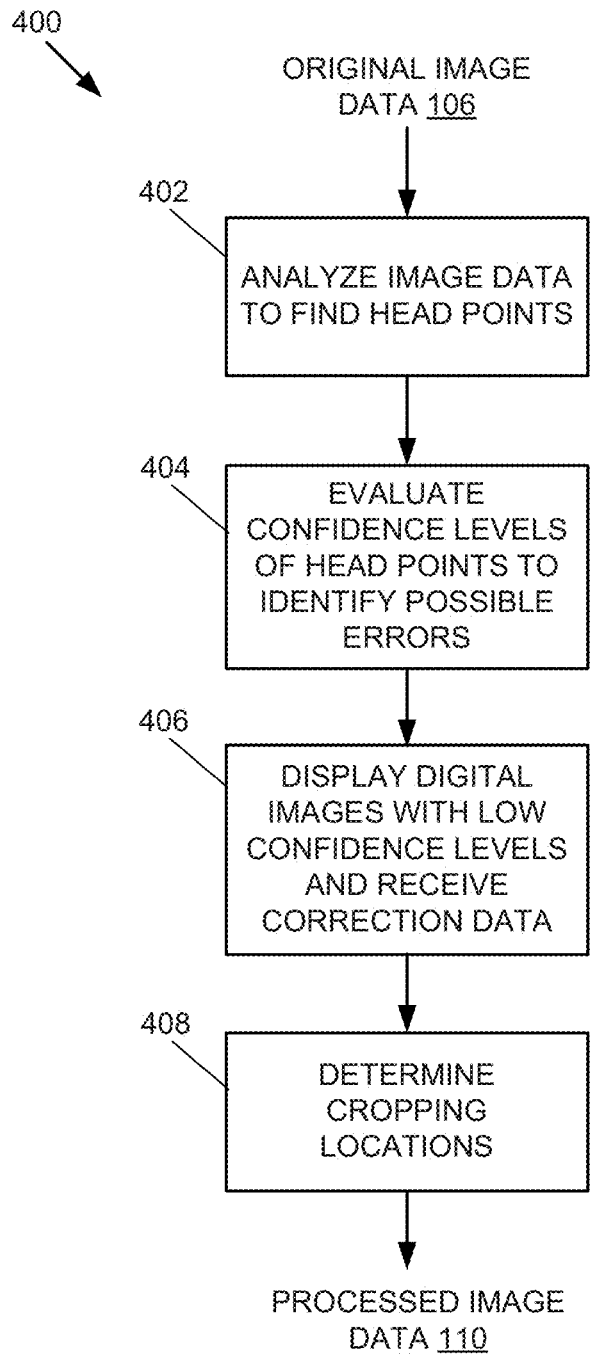
FIG. 4 is a flow chart illustrating an example method of processing digital images, such as using the image processing system shown in FIG. 2.

In some embodiments, image processing system 108 is a computing device, such as illustrated and described in more detail herein with reference to FIG. 4. Examples of image processing system 108 include a personal computer, a laptop computer, a handheld computer, a Smartphone (such as an IPHONE® mobile digital device or a BLACKBERRY® Smartphone), a personal digital assistant, or other computing devices. For increased processing power, image processing system 108 is alternatively a super computer or group of computers, such as set of networked computing devices or a computer cluster. In yet other embodiments, image processing system 108 includes multiple stand-alone computing devices that each perform one or more operations discussed herein.

Original image data 106 contains one or more digital images of one or more subjects. Original image data 106 can be formatted in a variety of digital formats, such as joint photographic experts group (JPEG) format, exchangeable image file format (EXIF), tagged image file format (TIFF), raw image format (RAW), portable network graphics (PNG) format, graphics interchange format (GIF), bitmap file format (BMP), portable bitmap (PBM) format, or other digital file formats.

In some embodiments, original image data 106 typically includes digital data storing photographs of one or more subjects. The photographs may be taken, for example, by a photographer at a photography station (102, shown in FIG. 1). After the photographs have been taken, the digital images are stored in memory as original image data, either on the camera or in a separate computing device. If desired, the original image data can be subsequently transferred to and stored in a computer-readable storage medium, such as a compact disc (CD), a digital versatile disc (DVD), or other memory devices (a flash drive, a hard disc drive, etc.). In some embodiments the CD, DVD, or other memory device is sent (such as via mail or hand delivery) to the location of image processing system 108. The memory device is then connected to or inserted into the image processing system 108, which reads the original image data 106. In yet another possible embodiment, original image data is received at image processing system 108 from a communication network.

Once the original image data 106 is received at image processing system 108, the image data 106 is then processed by modules 202, 204, 206, and 208 to generate processed image data 110. In one embodiment, processed image data 110 contains one or more processed digital images in any of a variety of digital image formats. In another embodiment, however, processed image data 110 does not contain digital images, but rather contains data that defines one or more transformations that can be subsequently applied to the original image data 106 to generate one or more final products.

Image analysis module 202 receives original image data 106 and processes the image data 106 to find head points. Examples of head points include center of eyes, top of head, sides of head, and chin points. Image analysis module 202 is described in more detail herein with reference to FIGS. 5-17.

Head points are used in some embodiments to generate cropped images. In other embodiments, head points are used for other purposes, such as identifying a location for a border or to identify a location for an image enhancement. For example, in some embodiments it is desirable to soften the image by applying a blurring filter to the digital image. However, it is preferred in some embodiments that the eyes remain clear and sharp. Accordingly, the head point data is used to determine the location of the eyes, and the image enhancement is applied to regions surrounding the eyes, but not directly on the region including the eyes. Other image enhancements are used in other embodiments.

Error detection module 204 operates to evaluate the head points identified by image analysis module 202 and to identify head points that may have been incorrectly identified. The digital images associated with those potentially incorrectly identified head points are then processed by the error correction module 206. Error detection module 204 is illustrated and described in more detail herein with reference to FIGS. 18-27.

Error correction module 206 displays the digital images flagged by the error detection module 204 to a user, and receives an input from the user indicating whether or not the head points were correctly identified. If not, the error correction module 206 requests corrected head point data from the user. Image analysis module 202 is illustrated and described in more detail herein with reference to FIGS. 28-33.

Following error detection module 204 and error correction module 206, cropping module 208 processes the original image data 106 to identify crop locations for one or more digital images, utilizing the head point data generated by image analysis module 202. In some embodiments, cropping module 208 determines one or more cropping locations for a given image, and then generates image rendering instructions that are stored in memory and transferred to production system 112 as part of processed image data 110. The image rendering instructions are then used, for example, by the production system 112, which generates one or more cropped images from the original image data 106. In another possible embodiment, cropping module 208 generates one or more cropped images, which are transferred to production system 112 as processed image data 110. Example of cropping module 208 are illustrated and described in more detail herein with reference to FIGS. 34-49.

Once the head point data has been determined using the image analysis module 202, cropping module 208 is operable in some embodiments to generate various possible products from the single set of head point data and the original image data 106. For example, cropped images having various sizes or aspect ratios can be generated by cropping module 208. A first example of a cropped image has a portrait orientation and be tightly zoomed on the face of the subject. A second example of a cropped image has a landscape orientation and is zoomed out to include the head and torso of the subject. A third example of a cropped image is generated by rotating the original image, such as to generate a cropped image in which the subject's head appears to be tilted with respect to the original image. A fourth example of a cropped image is zoomed into the subject's head and shoulders and conforms to U.S. passport photograph requirements. In this way, a wide variety of possible products can be generated from a single image and a single set of head point data. Products can also include more than one cropped image. For example, some embodiments include a final composite product composed of multiple differently cropped images, originating from one or more original images.

Although cropping module 208 is, in some embodiments, part of image processing system 108, in other possible embodiments cropping module 208 is part of production system 112. In this example, original images and head point data, for example, are provided to production system 112 as processed image data 110. Production system 112 utilizes this processed image data 110 to generate cropped images, as needed, using cropping module 208. This allows production system 112, for example, to render cropped images on the fly and when needed, such as when an order is placed that requires the generation of a particular cropped image.

In some embodiments the modules 202, 204, 206, 208, discussed above, are implemented by image processing system 108. Examples of modules 202, 204, 206, and 208 are software applications or sets of software instructions that are executed by a processor of the image processing system 108 to perform a set of functions. In another example, modules 202, 204, 206, and 208 are implemented by hardware, software, firmware, or combinations thereof.

FIG. 3 is a schematic block diagram illustrating an architecture of an example image processing system 108. In this example, image processing system 108 is a computing device, such as a personal computer. In some embodiments, image processing system 108 operates to execute the operating system, application programs, and software modules described herein, such as modules 202, 204, 206, and 208 shown in FIG. 1.

Image processing system 108 includes, in some embodiments, at least one processing device 302. A variety of processing devices are available from a variety of manufacturers, for example, Intel or Advanced Micro Devices. In this example, image processing system 108 also includes system memory 304, and system bus 306 that couples various system components including system memory 304 to processing device 302. System bus 306 is one of any number of types of bus structures including a memory bus, or memory controller; a peripheral bus; and a local bus using any of a variety of bus architectures.

System memory 304 includes read-only memory 308 and random access memory 310. Basic input/output system 312, containing the basic routines that act to transfer information within image processing system 108, such as during start up, is typically stored in read-only memory 308.

Image processing system 108 also includes secondary storage device 314 in some embodiments, such as a hard disk drive, for storing digital data. Secondary storage device 314 is connected to system bus 306 by secondary storage interface 316. Secondary storage devices 314 and their associated computer readable media provide nonvolatile storage of computer readable instructions (including application programs and program modules), data structures, and other data for image processing system 108.

Although the exemplary architecture described herein employs a hard disk drive as a secondary storage device, other types of computer readable media are included in other embodiments. Examples of these other types of computer readable media include magnetic cassettes, flash memory cards, digital video disks, Bernoulli cartridges, compact disc read only memories, digital versatile disk read only memories, random access memories, or read only memories.

A number of program modules can be stored in secondary storage device 314 or system memory 304, including operating system 318, one or more application programs 320, other program modules 322, and program data 324.

In some embodiments, a user provides inputs to the image processing system 108 through one or more input devices 330. Examples of input devices 330 include keyboard 332, mouse 334, and touchpad 336 (or a touch sensitive display). Other embodiments include other input devices 330. Input devices 330 are often connected to the processing device 302 through input/output interface 340 that is coupled to system bus 306. These input devices 330 can be connected by any number of input/output interfaces, such as a parallel port, serial port, game port, or a universal serial bus. Wireless communication between input devices and interface 340 is possible as well, and includes infrared, BLUETOOTH® wireless technology, 802.11a/b/g/n wireless communication, cellular communication, or other radio frequency communication systems in some possible embodiments.

In this example embodiment, a display device 342, such as a monitor, liquid crystal display device, projector, or touch screen display device, is also connected to system bus 306 via an interface, such as video adapter 344. In addition to display device 342, the image processing system 108 can include various other peripheral devices (not shown), such as speakers or a printer.

When used in a local area networking environment or a wide area networking environment (such as the Internet), image processing system 108 is typically connected to network 352 through a network interface or adapter 350. Other possible embodiments use other communication devices. For example, some embodiments of image processing system 108 include a modem for communicating across network 352.

Image processing system 108 typically includes at least some form of computer-readable media. Computer readable media include any available media that can be accessed by image processing system 108. By way of example, computer-readable media include computer readable storage media and communication media.

Computer readable storage media includes volatile and nonvolatile, removable and non-removable media implemented in any device configured to store information, such as computer readable instructions, data structures, operating systems 318, application programs 320, program modules 322, program data 324, or other data. System memory 304 is an example of computer readable storage media. Computer readable storage media includes, but is not limited to, read-only memory 308, random access memory 310, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by image processing system 108.

Communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, communication media includes wired media such as a wired network or direct-wired connection, and wireless media such as acoustic, radio frequency, infrared, and other wireless media. Combinations of any of the above are also included within the scope of computer readable media.

FIG. 4 is a flow chart illustrating an example method 400 of processing digital images. In this example, method 400 includes operations 402, 404, 406, and 408.

Once the original image data 106 has been received it is analyzed by operation 402 to find head points. In an example embodiment, operation 402 is performed by an image analysis module 202 (shown in FIG. 1). In some embodiments, the head points include a top of head point, a left side of head point, a right side of head point, and a chin point. In another possible embodiment, the head points further include inter-eye points, including a center of left eye point and a center of right eye point. Head point data is then stored in memory and associated with the respective digital image to which the head points belong.

Additional points are also identified in some embodiments, such as a center point between the eyes, a nose point, a mouth point, ear points, eyebrow points, or points indicating any other part, feature, or boundary of the head. Yet further embodiments find additional parts of the body, such as arm points, shoulder points, neck points, hand points, waist points, feet points, or other points indicating another part, feature, or boundary of the subject's body. Some embodiments are configured to find head or body points of multiple subjects in a single digital image. Similar points can also be identified for an animal subject in an alternate embodiment, such as for a dog, a cat, a bird, a farm animal, or other pets or animals.

In some embodiments, portions of operation 402 are performed by commercially available face finding software. An example of a commercially available face finding software is the VisPro-ware Software Development Kit distributed by Cryptometrics, Inc. of Tuckahoe, N.Y., such as to find the eye points or chin points. Other embodiments utilize other methods of finding such points, such as disclosed herein.

After the head points have been located, operation 404 is performed to evaluate the confidence levels of the head points. Various processes can be used to evaluate confidence levels. For example, a point at the periphery of the head (including the top of head point and sides of head points) is evaluated by checking the color difference on opposite sides of the point to confirm that a part of the head is on one side of the point and the background is on the other side of the point. A point will be assigned a higher confidence value if there is a greater color difference, and will be assigned a lower confidence value if there is a lesser color difference. Confidence levels are then stored in memory and associated with the head points and digital images to which they belong. In an example embodiment, confidence levels are selected from HIGH, LOW, or UNSET. In some embodiments, each confidence level has a default of HIGH unless subsequently changed to LOW. In some embodiments the UNSET confidence level is assigned if any head point data is unavailable or was unable to be determined for that image. The LOW confidence level is assigned in some embodiments if the overall computed confidence value does not satisfy a threshold value, as discussed in more detail below.

As another example, confidence levels can also or alternatively be assigned based on geometry checks. Although no two heads are the same, generally common characteristics of the positioning of head features and relative sizing and distances of head features can be used to assign confidence levels. As a simple example, if a chin point is identified as being above the inter-eye points, then a low confidence level can be assigned to one or more of these points, because either the digital image is upside down, or one or more of the head points are incorrectly identified. Other geometry checks are used in some embodiments, as discussed in more detail herein.

After the confidence levels of the head points have been evaluated, operation 406 is performed to display to a user those digital images having at least one head point with a low confidence level. The user can then visually inspect the digital image to determine if correction is required. If so, operation 406 guides the user to enter the correction data and, in some embodiments, also corrects the head point data associated with that digital image.

After correct head point data has been identified for the digital images, operation 408 determines one or more cropping locations for the digital images. If the original image data 106 includes sufficiently large digital images, the digital images can be cropped to remove unwanted portions of the digital images. As one simple example, a tight crop can be defined by operation 408 to cause the subject's head to fill the majority of the digital image. A looser crop can also or alternatively be defined by operation 408 to include the subject's shoulders (or waist, or full body, etc.) and to show more of the background. Crops of different aspect ratios can also be defined by operation 408. In some embodiments, data defining the crop locations is stored in memory and associated with the digital image to which it belongs. In other possible embodiments, original image data 106 is processed to generate the cropped images. The cropped images are stored in memory.

The result of operations 402, 404, 406, and 408 is to generate processed image data 110, which is stored in memory. As noted above, the processed image data 110 is, in some embodiments, data that can be subsequently used to transform original image data 106, such as prior to printing or saving the final photographs. In other possible embodiments, processed image data 110 contains the final digital image data that has already been transformed to generate processed digital images.

Figure 5:
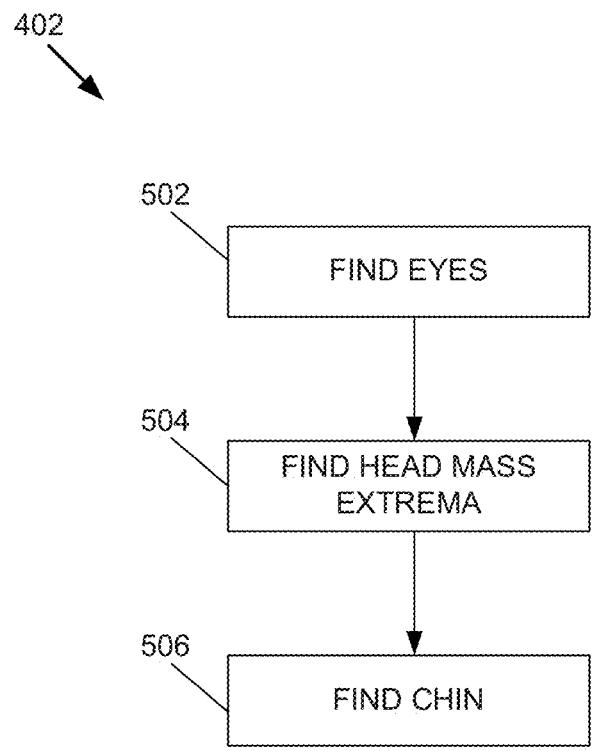
FIG. 5 is a flow chart illustrating an example method of analyzing original image data to find head points.

FIG. 5 is a flow chart illustrating an example of operation 402 including a method of analyzing original image data to find head points. In this example, operation 402 includes further operations 502, 504, and 506.

Operation 502 is performed to find the eyes in the digital image. In some embodiments, operation 502 finds a left eye center point and a right eye center point. Other embodiments find other points relating to the eyes, such as a center point between the left and the right eyes. A more detailed example of operation 502 is illustrated and described with reference to FIGS. 6-7.

After the eyes have been found, operation 504 is performed to find head mass extrema points. In one example embodiment, the head mass extrema points include a top of head point, a left side of head point, and a right side of head point. A more detailed example of operation 504 is illustrated and described with reference to FIGS. 8-12. In some embodiments, one or more of the head mass extrema points are used to define cropping locations for a cropped digital image. In some embodiments, because the head mass extrema points identify edges of the subject's head (as opposed to face points, such as the eye centerpoints that are often not at the edges of the subject's head in a digital image), closer cropping can be performed, if desired, without risking removing a portion of the subject's head from the cropped digital image.

Operation 506 is performed to find a chin point in the digital image. In one example embodiment, the chin point is the lowest point of the head in the digital image. In another example embodiment, the chin point is the lowest point of the face that is directly below a center point between the eyes. Other embodiments include other chin points. A more detailed example of operation 506 is illustrated and described with reference to FIGS. 13-14.

Figure 6:
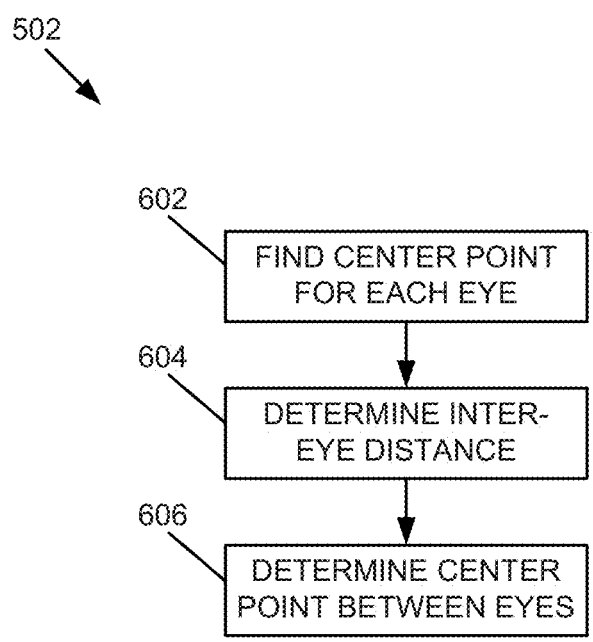
FIG. 6 is a flow chart illustrating an example method of finding eye points in a digital image.

FIG. 6 is a flow chart illustrating an example of operation 502 including a method of finding eye points in a digital image. Operation 502 includes operations 602, 604, and 606.

Operation 602 is first performed to find center points of the eyes in the digital image, including a center point of the left eye and a center point of the right eye. In some embodiments operation 602 is performed by a commercial face finding software application, such as the VisPro-ware Software Development Kit. In some embodiments the center points are identified by coordinates (x,y) including a horizontal coordinate (x) and a vertical coordinate (y), which are computed as a number of pixels away from an origin. Typically the origin is taken to be the upper left corner of the image, which is represented by the coordinate (0,0). The center points of the eyes are then stored in memory and associated with the digital image.

Operation 604 is then performed in some embodiments to determine an inter-eye distance. In some embodiments, the inter-eye distance is the distance between the center point of the left eye and the center point of the right eye. This distance can be computed using the Pythagorean Theorem using the coordinates of the eye points. In another possible embodiment, the inter-eye distance is the horizontal component of the actual distance (the difference between the x coordinates of the left and right eye center points). The inter-eye distance is then stored in memory and associated with the digital image.

Operation 606 is performed in some embodiments to determine a center point between the eyes. Once the center points of each eye are known, the center point between the eyes is computed, for example, by determining the coordinate that is half of the distance between the x coordinates and half of the distance between the y coordinates. The center point between the eyes is then stored in memory and associated with the digital image.

Figure 7:
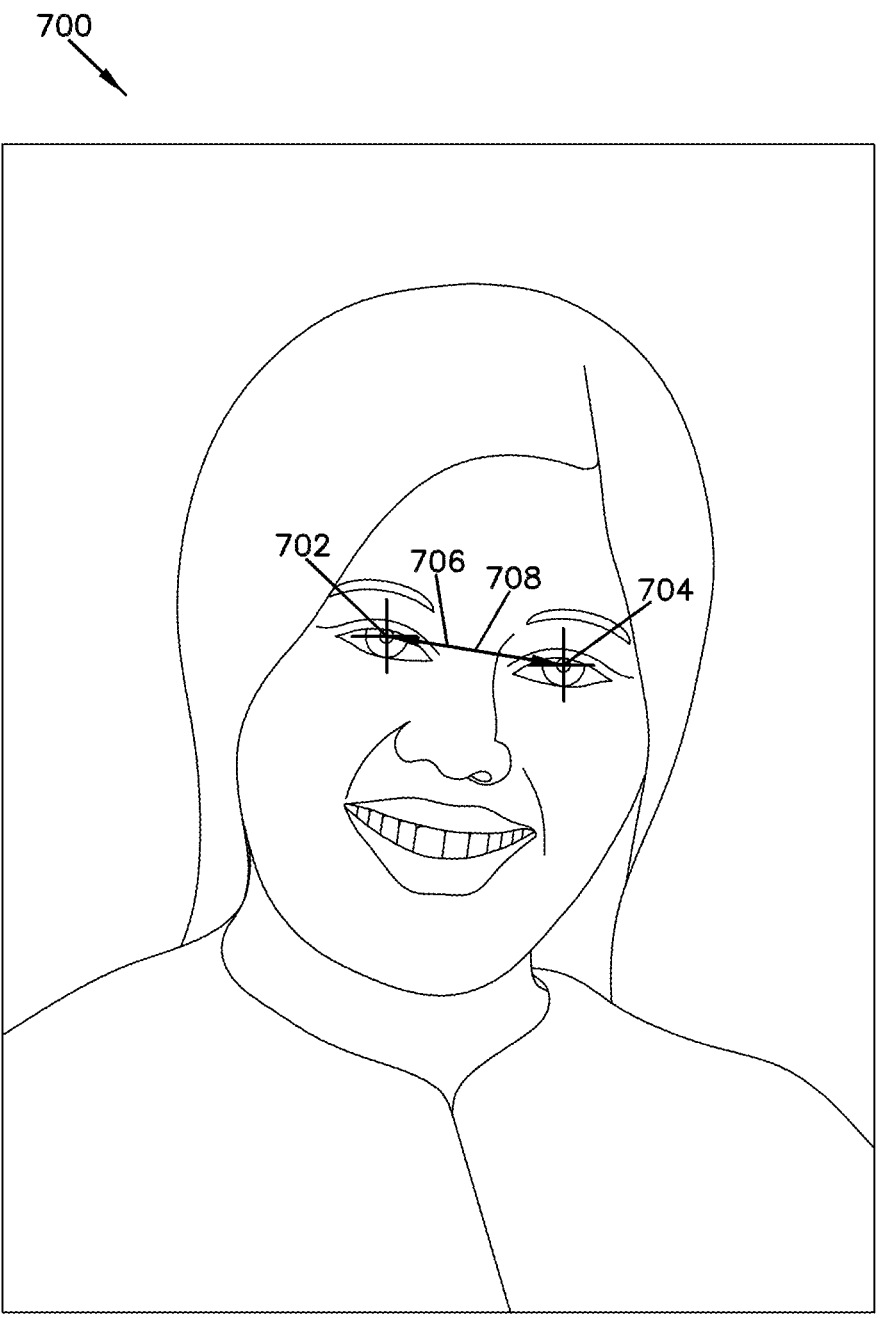
FIG. 7 is an example of a digital image including a graphical representation of the eye points found using the method shown in FIG. 6.

FIG. 7 is an example digital image 700 of the original image data 106, which includes a graphical representation of the eye points found using the example operation 502 described in FIG. 6. The example digital image 700 includes a left eye center point 702, a right eye center point 704, an inter-eye distance 706 and inter-eye center point 708.

Although the terms "left" and "right" are generally used herein relative to digital images (i.e., the left side of the image and the right side of the image), the terms can alternatively be used to refer to the left and right sides of the subject, in which case they are typically the reverse.

Figure 8:
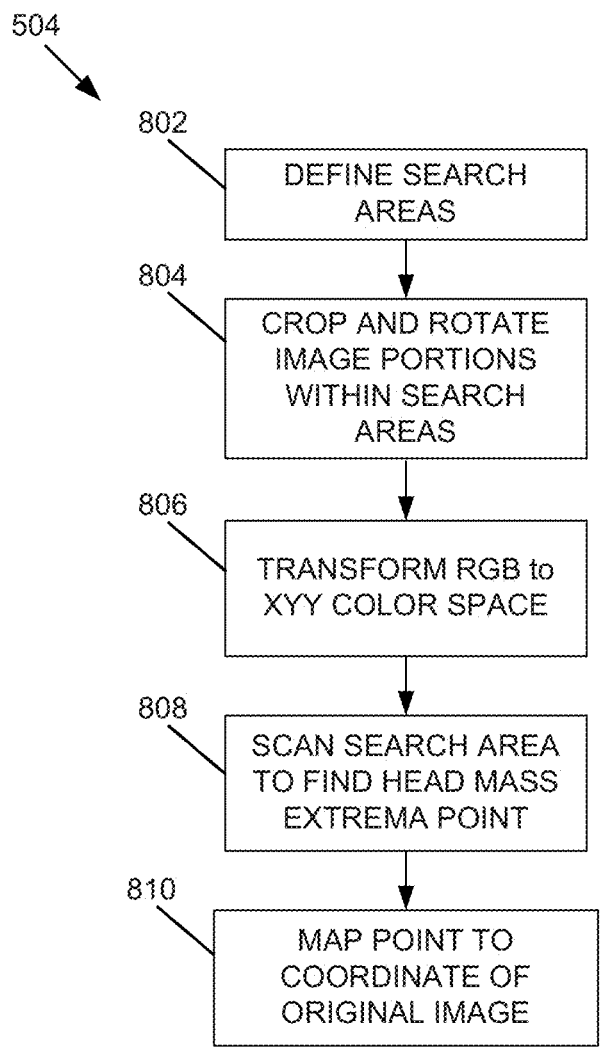
FIG. 8 is a flow chart illustrating an example method of finding head mass extrema points.

FIGS. 8-16 illustrate an exemplary method of finding head mass extrema points. FIG. 8 is a flow chart illustrating an example of operation 502, which includes a method of finding head mass extrema points. FIGS. 9-16 illustrate a particular example using the digital image 700.

Referring now to FIG. 8, an example of operation 504 is shown, which includes a method of finding head mass extrema points in a digital image. In this example, operation 504 includes operations 802, 804, 806, 808, and 810. This example finds all desired head mass extrema points in a single execution of operation 504. In an alternate embodiment, operation 504 is performed individually for a first point and then repeated as many times as needed to find additional head mass extrema points.

To begin finding head mass extrema points, operation 802 is performed to identify appropriate areas to search for the points. Because the eye center points (702 and 704 in FIG. 7) have already been located, these points can be used along with the calculated inter-eye distance 706 and inter-eye center point 708 to define appropriate search areas. In this example, three search areas are defined, including a left side of head search area, a top of head search area, and a right side of head search area.

Figure 9:
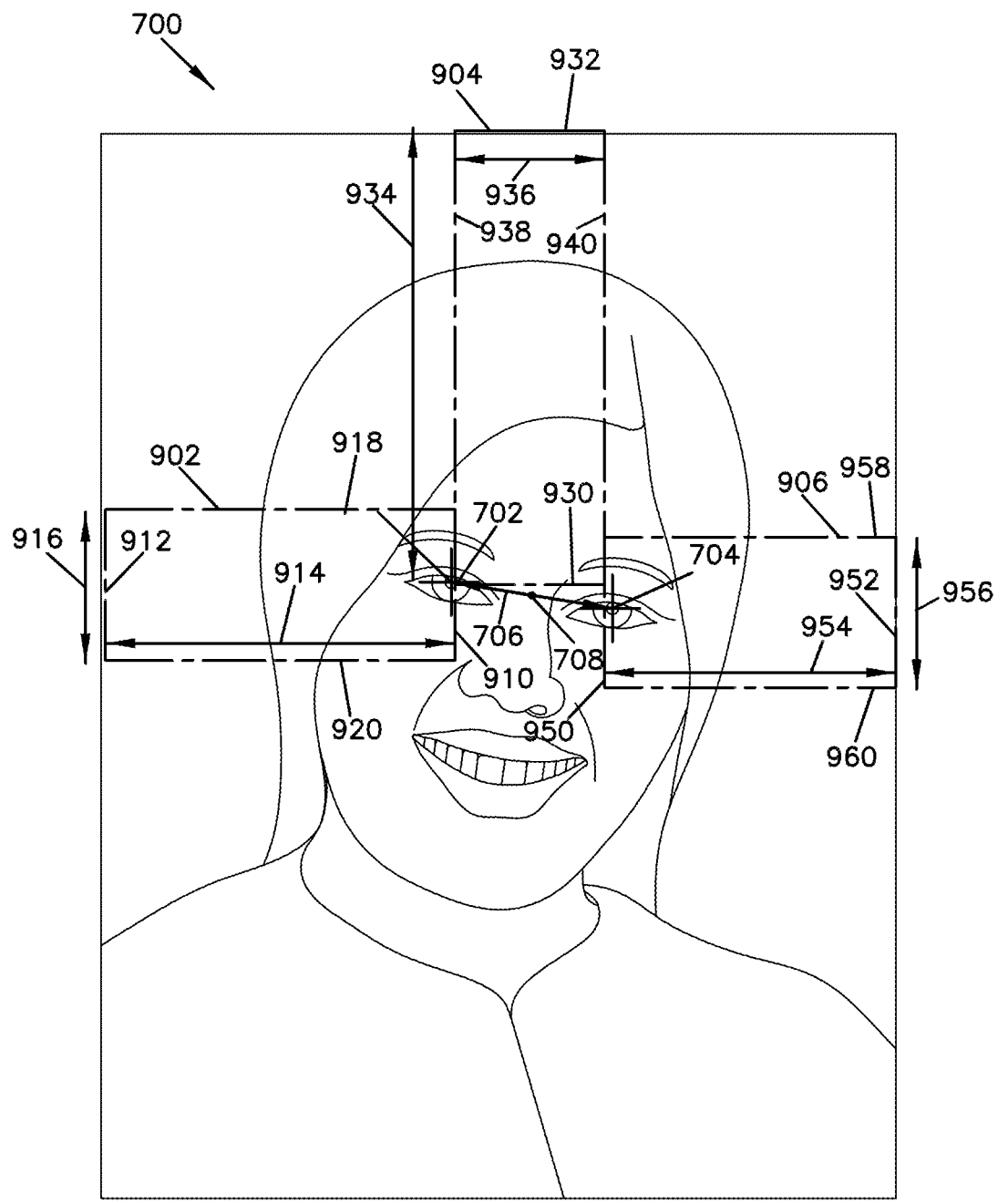
FIG. 9 illustrates example head mass extrema search areas for the method of finding head mass extrema points shown in FIG. 8.

Examples of the head mass extrema search areas are illustrated in FIG. 9, which shows the left side of head search area 902, top of head search area 904, and right side of head search area 906. In one example embodiment, the left side of the head is known to be toward the left of the left eye center point 702, and the right side of the head is known to be toward the right of the right eye center point 704. Therefore, in some embodiments the right-most boundary 910 for the left side of head search area 902 is set as equal to the x-coordinate of the left eye center point 702. In another possible embodiment, the right-most boundary is set as equal to the x-coordinate of the left eye center point 702 minus a padding distance. If it is known or assumed that the subject is facing directly, or substantially directly, at the camera, it is known that there will be some distance between the left side of the head and the left eye center point 702. The padding distance is an estimate of the minimum distance that the left side of the head will be away from the left eye. The padding distance is, in some embodiments, a multiple of the inter-eye distance 706, such as in a range from about 0.1 times to about 0.4 times the inter-eye distance 706.

The left-most boundary 912 for the left eye search area is similarly set as a distance 914 to the left of the x-coordinate of the center of the left eye center point 702, or alternatively is set to equal to the left-most coordinate of the digital image (e.g., 0). In some embodiments the left-most boundary 912 is set a distance 914 to the left of the left eye center point 702, the distance 914 being in a range from about 1.5 times to about 2.5 times the inter-eye distance 706. The distance 914 away from the center of the left eye should be large enough to ensure that the left-most boundary 912 will be positioned at the image background, rather than a portion of the subject's head.

The height 916 of the left side of the head search area 902 also needs to be determined. The height 916 is the distance between the upper boundary 918 and the lower boundaries 920 of the search area 902. In one possible embodiment, the height 916 is a single pixel, such that the search area 902 is a single row of pixels along the y-coordinate of the center of the left eye center point 702. However, in other embodiments the height 916 is larger, such as in a range from about 10 pixels to about 100 pixels. In another embodiment, the height 916 is in a range from about 0.5 times to about 1.5 times the inter-eye distance 706. The upper and lower boundaries 918 and 920 are set so that the search area 902 is centered along the y-coordinate of the left eye center point 702, or alternatively, along the y-coordinate of inter-eye center point 708.

The top of the head search area 904 is also selected based on known factors. For example, it is known that the top of the head must be above the eyes. Therefore, the lower boundary 930 of the top of the head search area 904 is set equal to the y-coordinate of the highest of the left eye center point 702 or the right eye center point 704. In another possible embodiment, the lower boundary 930 is set equal to the y-coordinate of the inter-eye center point 708. Other embodiments include a padding distance, such that the lower boundary 930 is located above the eyes a distance equal to the padding distance. The padding distance is, in some embodiments, a multiple of the inter-eye distance 706, such as in a range from about 0.5 times to about 1.5 times the inter-eye distance 706.

The upper boundary 932 for the top of the head search area 904 is set as a distance 934 above the lower boundary 930, or alternatively is set to equal to the top coordinate of the digital image (e.g., 0). In some embodiments the upper boundary 932 is set a distance 934 above the lower boundary 930, the distance 934 being in a range from about 2.5 times to about 4 times the inter-eye distance 706. In one example embodiment the distance 934 is set to three times the inter-eye distance 706. The distance 934 should be large enough to ensure that the upper boundary 932 will be positioned at the image background, rather than a portion of the subject's head.

The width 936 of the top of the head search area 904 is the distance between the left boundary 938 and the right boundary 940. The width 936 can be determined in the same manner as the height of the left side of the head search area 902, such as to be a fixed number of pixels in width or a multiple of the inter-eye distance 706.

The right side of head search area 906 is selected in a similar manner to the left side of head search region 902. For example, the left boundary 950 is set in some embodiments to be equal to the x-coordinate of the right eye center 704 and the right boundary 952 is set in some embodiments to be a distance 954 to the right of the left boundary 950. The upper boundary 958 and the lower boundary 960 is arranged, in some embodiments, to be a distance 956 apart and centered along the y-coordinate of the right eye center point 704.

Returning now briefly to FIG. 8, after defining the search areas in operation 802, operation 804 is performed to crop and rotate the search areas into a common orientation. Cropping is performed to extract the portion of the image within the search area from the rest of the image. The images are then rotated, in some embodiments, to a common orientation so that the portion includes a part of the head on one side (e.g., the left side of the image portion) and a part of the background on the other side (e.g., the right side of the image portion). A common edge finding process can then be used to identify the head extrema. However, another possible embodiment does not rotate the image portions, and different edge finding processes are used for each image portion.

Figure 10:
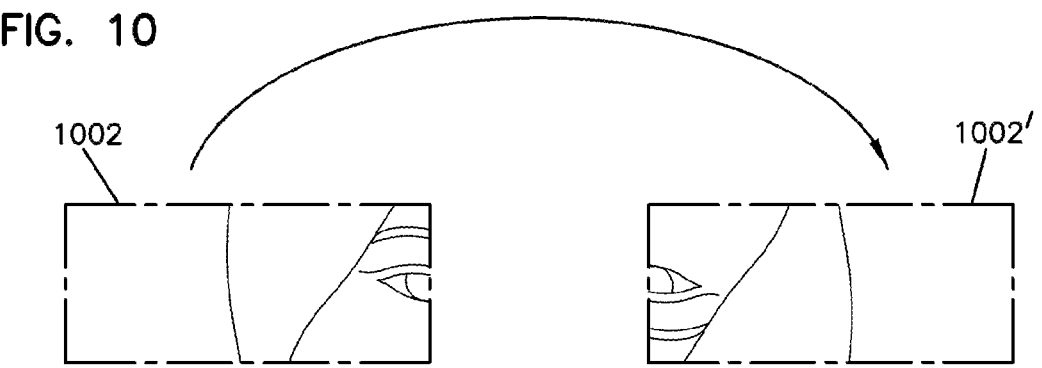
FIG. 10 illustrates an example process for cropping and rotating a left side of head image portion.
Figure 11:
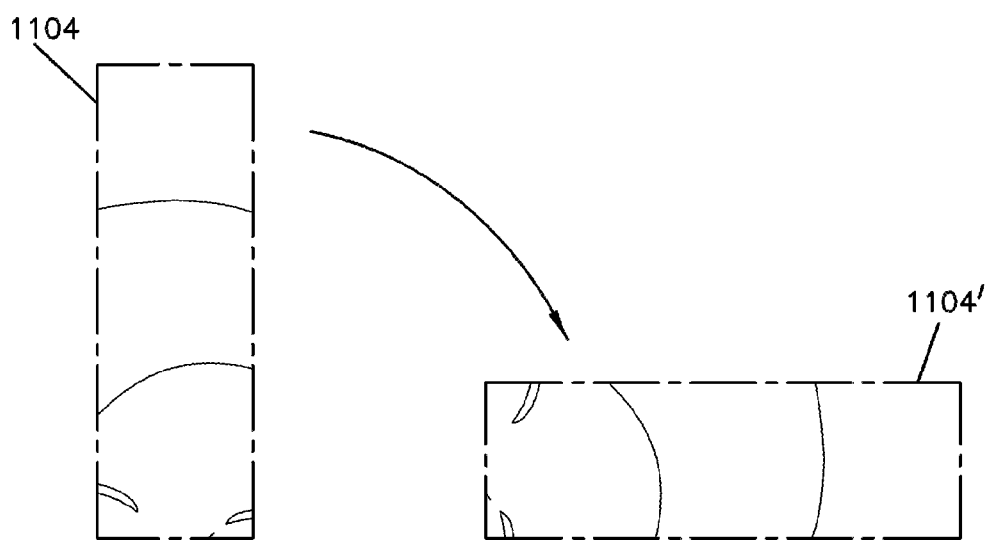
FIG. 11 illustrates an example process for cropping and rotating a top of the head image portion.
Figure 12:
FIG. 12 illustrates an example process for cropping a right side of head image portion.

Referring now to FIGS. 10-12, an example of operation 804 is illustrated. FIG. 10 illustrates the process of cropping and rotating a left side of head image portion 1002 that was within the left side of head search area 902. FIG. 11 illustrates the process of cropping and rotating a top of the head image portion 1104 that was within the top of the head search area 904. FIG. 12 illustrates the process of cropping and rotating the right side of head 1206 image portion that was within the right side of head search area 906.

In this example, all image portions are rotated so that the part of the head within the image portion is arranged on the left side of the image portion, and the background is arranged on the right side of the image portion.

As shown in FIG. 10, after the left side of the head image portion 1002 is cropped from the original image, the image portion 1002 is rotated 180°, so that the part of the head is arranged toward the left of rotated image portion 1002' and the background is arranged toward the right side of rotated image portion 1002'. Alternatively, the image portion 1002 is flipped horizontally.

As shown in FIG. 11, after the top of the head image portion 1104 is cropped from the original image, the image portion 1104 is rotated 90° clockwise, so that the part of the head is arranged on the left side of the rotated image portion 1104' and the background is arranged on the right side of the rotated image portion 1104'.

As shown in FIG. 12, after the right side of the head image portion 1206 is cropped from the original image, no further rotation is needed, because the part of the head is already arranged on the left side of the image portion 1206 and the background is arranged on the right side of the image portion 1206.

Returning now to FIG. 8, after the image portions have been cropped and rotated to a common orientation in operation 804, in some embodiments operation 806 is then performed to transform the image portions from the RGB (Red Green Blue) color space to the xyY color space. The RGB color space is a standard defined by the International Color Consortium profiles, while the xyY color space was created by the International Commission on Illumination, or CIE (Commission International de L'Eclairage). The xyY color space is an example of a luminance-chroma color space. This transformation allows the image portions to be analyzed in the luminance-chroma color space. For example, if a digital image has a strongly textured background, analysis of the spatial frequencies in the image may be unreliable for detecting the transition between the head and the background. By transforming the RGB image into the xyY color space, the analysis of the color can be more reliably obtained. Texture features in the background are largely seen as variations in the luminance, but are suppressed in the chroma components. Therefore, by analyzing only the chroma components for pixel color transitions provides improved reliability. In some embodiments the background image is dyed or illuminated with a single color (or substantially a single color), allowing analysis in the luminance-chroma color space to be even more reliable.

However, other possible embodiments do not transform the image from the RGB color space. For example, if the background in a digital image has very little texture, an analysis of the RGB image (or a filtered variation of the RGB image) can be sufficient to provide a reliable result by analyzing the spatial frequencies of the image portion. Filtering can be performed to further improve the reliability. For example, blurring filters (Gaussian or median) are used in some embodiments to suppress background texture. Further, some embodiments use edge-detecting filters (such as Canny filters) to outline the transitions between the background and the subject. Edge-detecting filters will sometimes also find transitions between different parts of the face, but false detections can be avoided, as discussed herein, by scanning from a starting point arranged over the background and scanning toward the portion of the head until the outermost transition is identified.

After transformation, operation 808 is performed to scan the image portions to find the transition point defining the head mass extrema points.

Figure 13:
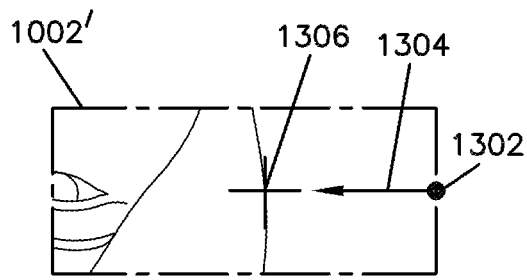
FIG. 13 illustrates scanning of the rotated left side of head image portion shown in FIG. 10.
Figure 14:
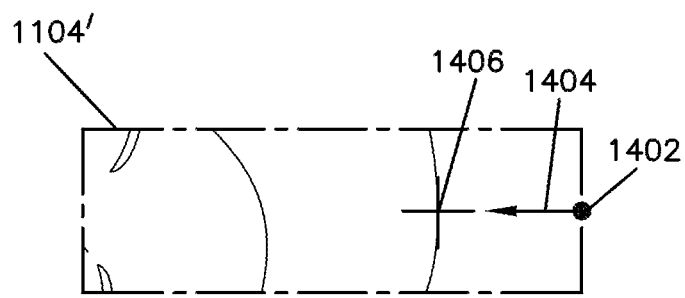
FIG. 14 illustrates the scanning of the rotated top of the head image portion shown in FIG. 11.
Figure 15:
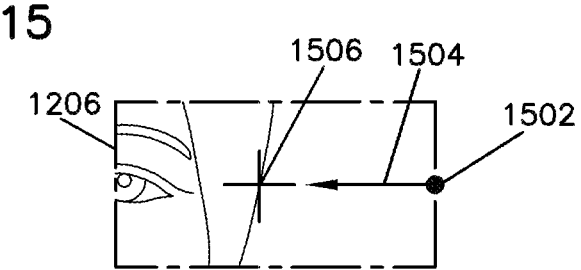
FIG. 15 illustrates the scanning of the right side of the head image portion shown in FIG. 12.

FIGS. 13-15 illustrate an example of operation 808. FIG. 13 illustrates the scanning of the rotated left side of head image portion 1002'. FIG. 14 illustrates the scanning of the rotated top of the head image portion 1104'. FIG. 15 illustrates the scanning of the right side of the head image portion 1206.

In this example, scanning of image portions 1002', 1104', and 1206 begins at starting points 1302, 1402, and 1502. The starting points are positioned at the right-most pixel of the image portion and positioned at a midpoint between the upper and lower boundaries. In this example, scanning then proceeds to the left, in the directions of arrows 1304, 1404, and 1504, and the changes in color are monitored. Because the starting points 1302, 1402, and 1502 are selected to be positioned over the background, the operation scans to the left in the image portion until it detects a significant change in color from the starting point (e.g., a color change greater than a predetermined threshold value. The point at which the change in color occurs is determined to be the head mass extrema point (1306, 1406, and 1506) in the respective image portion. Scanning in this matter works particularly well when the original image contains a substantially solid colored background. If the entire image portion is scanned without locating a point having a sufficient color change, the predetermined threshold is lowered and scanning is repeated. Alternatively, the point having the largest color change is selected as the respective head mass extrema point.

In another possible embodiment, rather than scanning for color changes, operation 808 identifies a transition between dark pixels and light pixels by evaluating a brightness of the pixels within the digital image. For example, in some embodiments a background illuminated image is used for this purpose. When a background illuminated image is taken, without substantial foreground lighting, the subject is shadowed but the background is bright. Additional details of the use of a background illuminated image are described in U.S. patent application Ser. No. 11/732,507, titled METHOD AND APPARATUS FOR BACKGROUND REPLACEMENT IN STILL PHOTOGRAPHS, filed on Apr. 3, 2007, now U.S. Pat. No. 7,834,894, issued Nov. 16, 2010 as discussed herein.

During the scanning of the image portions, averaging functions are used in some embodiments. For example, beginning at the starting point 1302, 1402, or 1502, the colors of all pixels vertically above and below the starting point are determined and an average value is computed. This average value is then compared with the average value of the next vertical set of pixels. The process continues until a point having a sufficient average color difference is identified. Such an averaging process reduces the chance that a small feature in the background or imperfection in the digital image will result in an incorrectly identified head mass extrema point.

Other embodiments include other averaging functions. For example, in some embodiments a digital filter is used to evaluate a working area of the digital image. As the scan proceeds, the working area is adjusted in the scan direction shown by arrows 1304, 1404, or 1504. At each point, the digital filter estimates the background chroma and counts the number of pixels within the working area that do not match the estimate. When the number of pixels exceeds a threshold value, the current scan point is taken to be the transition point.

In another embodiment, the starting points are set to be on the opposite sides of the image portions, such that they are along the left side of the image portions. Alternatively, the image portions are rotated 180° (or flipped horizontally). In this embodiment, the starting point is arranged over a portion of the head and scanning proceeds in the opposite direction until a significant color change (e.g., a color change greater than a predetermined threshold value) is detected. This alternative embodiment can be more effective when the background itself includes large variations in color, greater than the variations in color of the subject's head. This alternative embodiment can also be useful when the digital image contains only a dark silhouette of the subject with a lighter background.

Returning now to FIG. 8, after the head mass extrema points have been found in the respective image portions (1002, 1104, and 1206) in operation 808, the points are then mapped to the corresponding coordinates of the original image in operation 810. For example, the coordinate of the point is determined for the image portion (when the image portion is in the original and non-rotated orientation). This coordinate is then mapped to the corresponding coordinate in the original image by adding to the coordinate the offset of the image portion from the origin of the original image.

As a more specific example, if the coordinate of the head point in the image portion is (50,51), the coordinate of the same head point in the original image can be calculated as follows. First, the location of the upper left coordinate of the image portion must be determined in the original image, such as (1025, 25). The coordinate of the head point in the original image is then determined by adding the x-coordinates to obtain the final x-coordinate, and adding the y-coordinates to obtain the final y-coordinate. In this example, the final x-coordinate is 1075 (1025+50) and the final y-coordinate is 76 (25+51).

Figure 16:
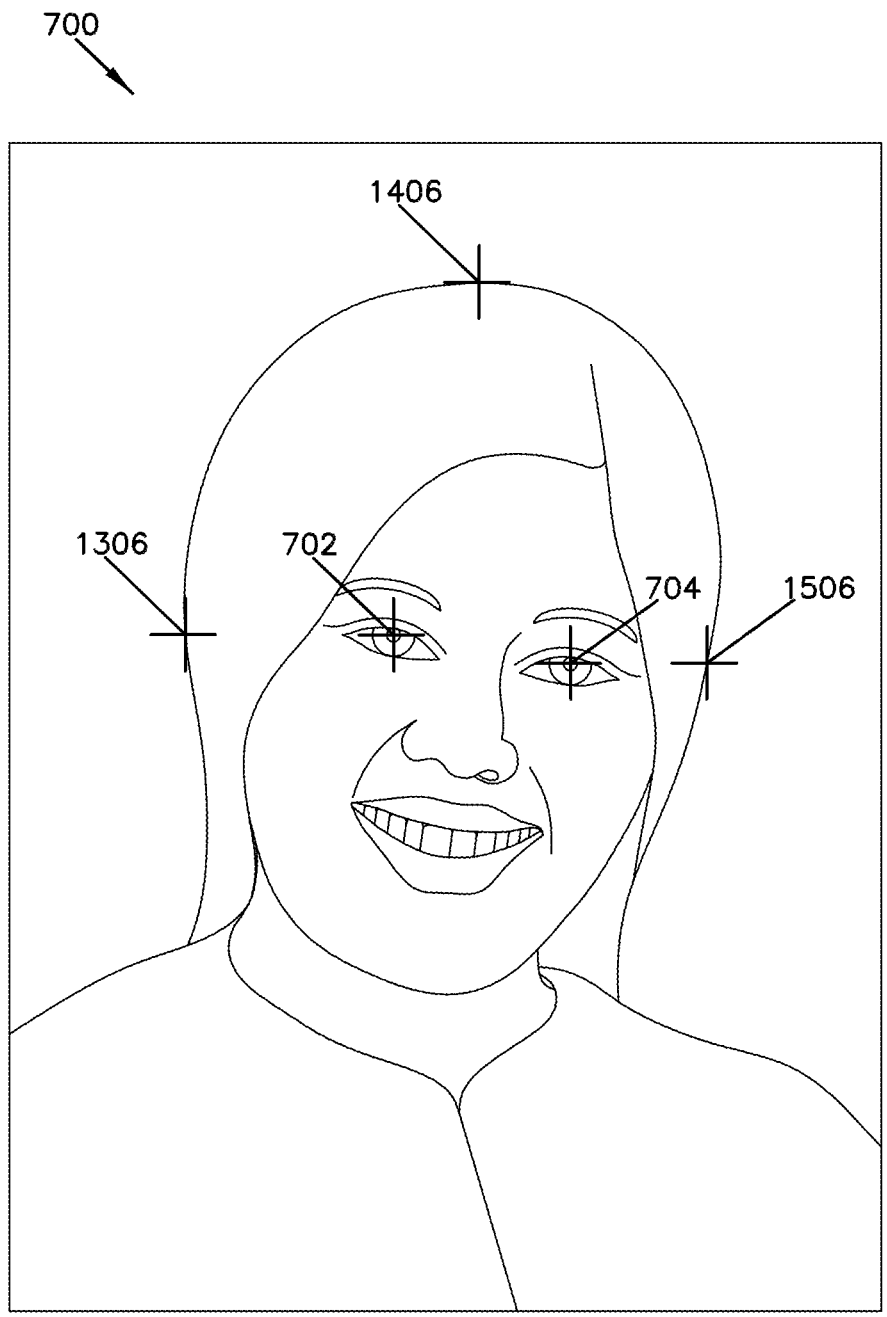
FIG. 16 shows an example of head mass extrema points identified by the method shown in FIG. 8.

The result of operation 504 is illustrated in FIG. 16, which shows an example of the positions of each of the identified head mass extrema points, including left side of head point 1306, top of head point 1406, and right side of head point 1506. The left and right eye center points 702 and 704 are also shown. In some embodiments, the method of finding head mass extrema points is also used to identify a chin point.

Returning now to FIG. 5, after the head mass extrema points have been found, operation 506 is performed to find the chin point. In another possible embodiment, operation 506 is performed prior to operation 504 or simultaneous to operation 504.

Figure 17:
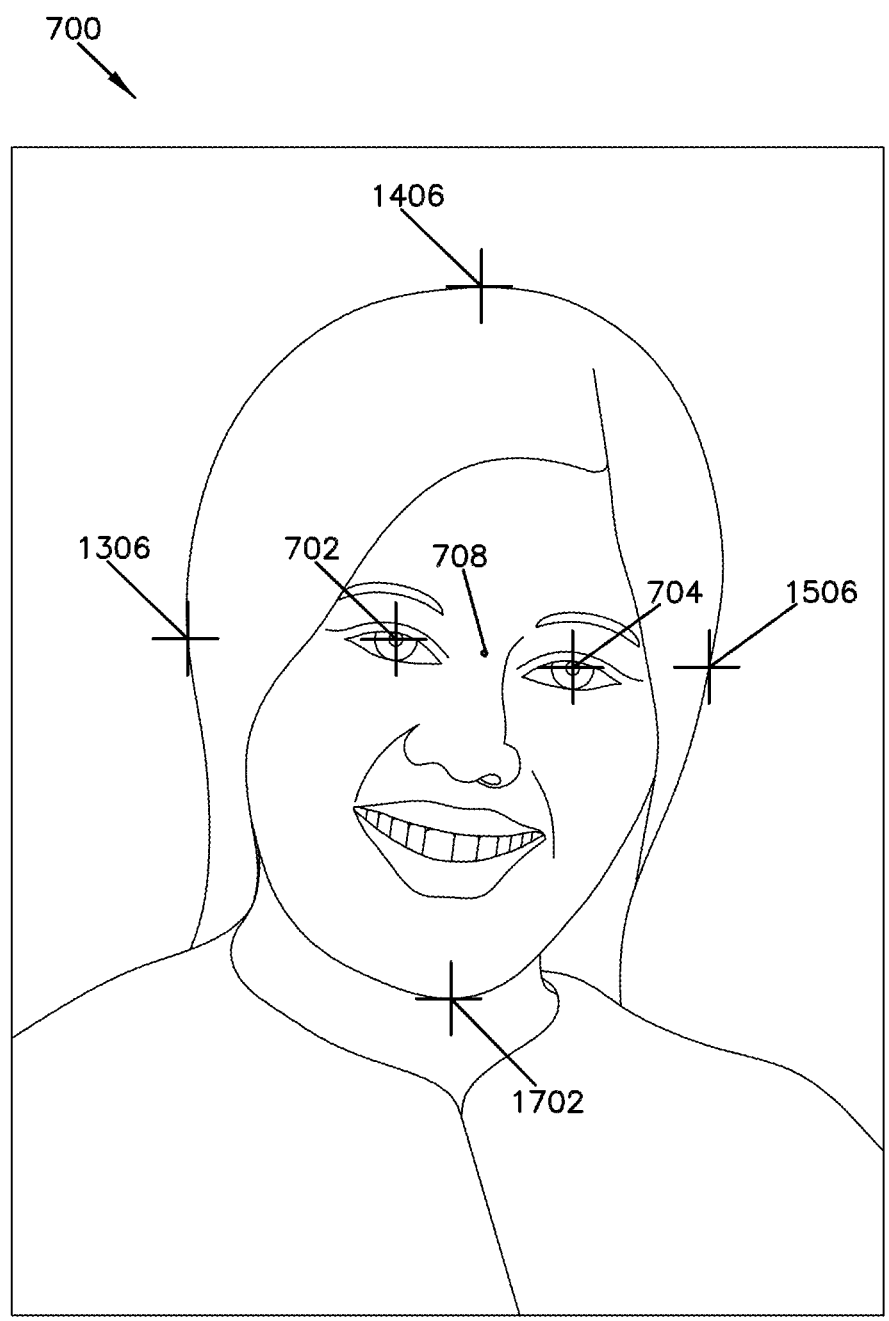
FIG. 17 shows an example of the head mass extrema points shown in FIG. 16 and a chin point.

Operation 506 is performed in some embodiments utilizing commercially available face finding software, such as the VisPro-ware Software Development Kit. The result of operation 402 (including operations 502, 504, and 506) is illustrated in FIG. 17, which shows eye center points 702 and 704, inter-eye center point 708, head mass extrema points 1306, 1406, and 1408, and the chin point 1702.

Returning now to FIG. 4, after the desired head points have been identified in operation 402, operation 404 is performed to evaluate the confidence levels of each head point to identify possible errors.

Although this example describes operation 404 as being performed after all head points have been identified, another possible embodiment performs operation 404 after or during the identification of each individual head point in operation 402. An example of operation 404 is illustrated and described with reference to FIG. 18.

Figure 18:
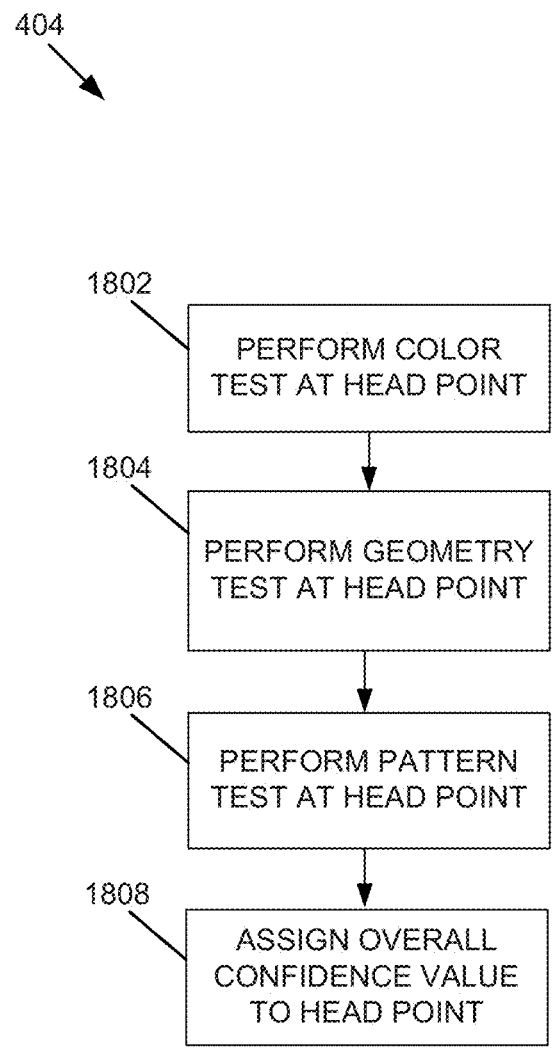
FIG. 18 is a flow chart illustrating an example method of generating confidence levels for head points in a digital image.
Figure 19:
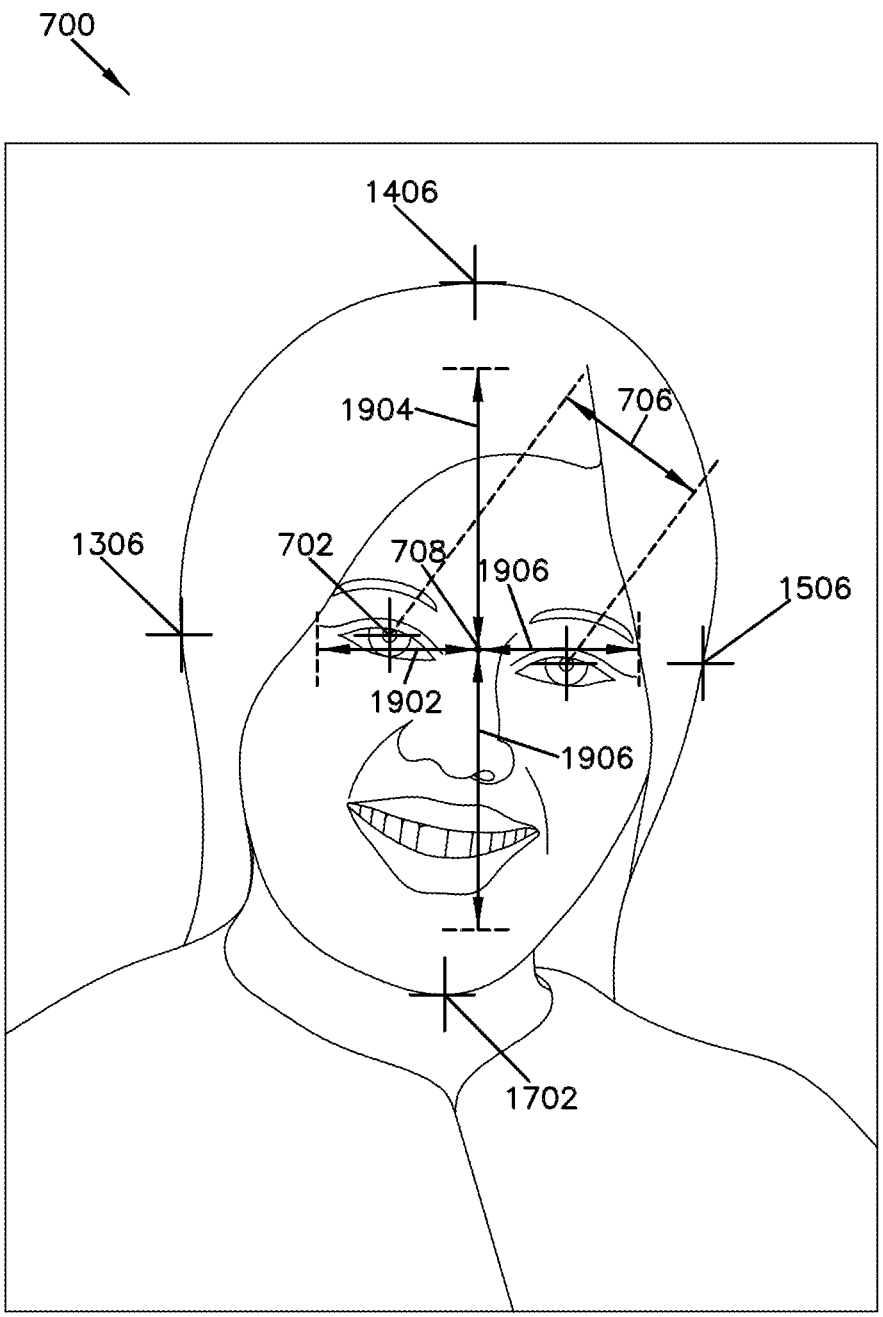
FIG. 19 shows an example of a geometry test of the method shown in FIG. 18.

FIG. 18 is a flow chart illustrating an example of operation 404, which includes a method of generating confidence levels for head points in a digital image. In this example, operation 404 includes operations 1802, 1804, and 1806.

In some embodiments, confidence levels are evaluated for each head point and a specific confidence value is then assigned to that point that represents the confidence level. The confidence levels are subsequently used to identify the points that are most likely to contain an error, such that the digital images associated with those images can be selectively reviewed and corrections can be made if necessary. In some embodiments multiple confidence tests are performed resulting in multiple confidence values being generated and assigned to the respective head point. In some embodiments, the multiple confidence values are then evaluated to generate an overall confidence value for the head point.

One example of a confidence test is a color difference test of operation 1802. The color difference test is performed on the digital image by calculating a color difference across the identified transition point. If the head point is the left or right side of the head, the confidence test evaluates and compares the color of the digital image on the left side of the head point with the color of the digital image on the right side of the head point. If the head point is the top of the head point, the confidence test evaluates and compares the color of the digital image below the top of the head point with the color of the digital image above the head point. A confidence value is then assigned to the head point, where a larger color difference is given a higher confidence value, and a smaller color difference is given a lower confidence value. In some embodiments the confidence values are between 0 and 1, where 1 represents a low confidence level and 0 represents a high confidence level. For example, a confidence value of 0.1 represents a relatively high confidence value for a given head point, where a confidence value of 0.9 represents a relatively low confidence value for the given head point. In some embodiments the confidence values of the color difference test are stored in memory and associated with the respective head point and the digital image.

Another example of a confidence test is the geometry test of operation 1804. An example of the geometry test is illustrated and described with reference to FIG. 19, which shows inter-eye distance 706, inter-eye center point 708, head mass extrema points 1306, 1406, and 1408, and the chin point 1702. In addition, example threshold distances 1902, 1904, 1906, and 1908 are also shown.

In some embodiments, one or more geometry tests are performed to evaluate the position of a head point as compared with other head points. The geometry test generates a confidence value based on the likelihood that the head point is correct according to known geometries of the typical person's head. In this example, geometry tests are performed to generate confidence values for each of the head mass extrema points 1306, 1406, and 1506, and for chin point 1702.

For each head point, a threshold distance 1902, 1904, 1906, and 1908 is defined for that head point. The distances 1902, 1904, 1906, and 1908 represent a minimum distance away from the inter-eye center point 708 that the head point will be located on a typical person. The identified head point 1306, 1406, 1506, and 1702 is then evaluated to determine how far away from the inter-eye center point 708 the head point is. If the head point is further away from the inter-eye center point 708 than the threshold distance, a low confidence value is assigned to that head point for this test. Otherwise, if the distance of the head point from the inter-eye center is equal to or less than the respective threshold distance 1902, 1904, 1906, and 1908, a high confidence value is assigned to the head point for this test. In some embodiments a low confidence value is a 1, while a high confidence value is a 0.

Examples of threshold distances are as follows. In some embodiments, the left and right side of head threshold distances 1902 and 1904 are typically in a range from about 0.5 to about 1.2 times the inter-eye distance 706. The top of the head and chin threshold distances 1904 and 1908 are typically in a range from about 1 to about 1.7 times the inter-eye distance 706.

In an alternate embodiment, a ratio is calculated, such as by dividing the inter-eye distance by the distance between the inter-eye center point and the respective head point. In some embodiments a high confidence level is assigned to the head point if the ratio value is greater than a threshold value. In other embodiments, a high confidence level is assigned to the head point if the ratio value is within a range of values. Otherwise, a low confidence value is assigned to the head point for this test.

Although this example refers to distances, other embodiments can similarly operate based on the comparison of x-coordinates or y-coordinates, or a combination of x-coordinates and y-coordinates. For example, when evaluating the left side of head point 1306, a low confidence value is assigned to the head point 1306 if the x-coordinate is less than the x-coordinate of the inter-eye center point minus the threshold distance 1902. Otherwise a high confidence value is assigned to the point 1306.

Further, in some embodiments distances are calculated as the direct distance from one point to another point. However, in other embodiments distances are calculated based solely on the horizontal (x-coordinates) or vertical components (y-coordinates) of the points of interest.

Returning to FIG. 18, other embodiments include other or additional geometry tests. For example, some embodiments perform additional geometry tests to generate a confidence value for chin point 1702. In one example embodiment, the following process is performed. First, mouth corner points are identified by a face finding software application. These points are then averaged to obtain a mouth center point. Similarly, the eye center points 702 and 704 are averaged to obtain an inter-eye center point 708. Next, a distance from inter-eye center point 708 to the mouth center point is computed. A distance from the mouth center point to the chin point 1702 is computed. An inter-eye distance 706 is computed, and a distance from a nose point to the chin point is computed. Knowing these distances, the ratio of the mouth-to-chin distance and the mouth-to-eye distance is computed. The chin confidence level is then set to LOW if the ratio exceeds a threshold. A ratio is also computed based on nose-to-chin distance and inter-eye distance. The chin confidence level is set to LOW if the ratio exceeds a threshold. In this example, if the chin confidence level is LOW, the overall image confidence level is also set to LOW.

Yet other geometry tests are performed in some embodiments. For example, in some embodiments an additional geometry test is performed using head points. In this example, vertical eye to chin and top-of-head to chin distances are computed. The eye position is then evaluated by computing a ratio of eye-chin to top-chin distances. If the eye position is outside of a specified range, the confidence level of the image is set to LOW. Otherwise, the head aspect ratio is computed as width over height using the top, side, and chin points. A minimum aspect ratio is computed as a linear function of eye position. If the head aspect ratio is below the minimum, the confidence level is set to LOW. Otherwise, a two-dimensional distance is computed from eye center to top of head, and a ratio of top-to-eye distance and inter-eye distance is computed. If the top-eye distance ratio exceeds a threshold, the confidence level of the image is set to LOW. Otherwise, a vertical distance from nose to eye center is computed, and a ratio of inter-eye distance to vertical eye-nose distance is computed. If the eye-eye to eye-nose ratio exceeds a threshold, the confidence level is set to LOW. If all tests have passed successfully, the confidence level remains at the default HIGH level.

Another possible embodiment performs edge checking on the digital image to confirm that the subject intersects only the bottom edge of the digital image. In some embodiments the edges of the digital image are scanned to confirm that only the background is present at the left edge, top edge, and right edge of the digital image. In some embodiments a background illuminated image is used for this purpose, and in this example, scanning involves checking for dark pixels. If dark pixels are found along the top or sides of the image, the operation determines that the subject is improperly positioned within the digital image, and the confidence level of the image is set to LOW. Additional information about the capturing and processing of background and foreground illuminated images is provided in U.S. patent application Ser. No. 11/732,507, titled METHOD AND APPARATUS FOR BACKGROUND REPLACEMENT IN STILL PHOTOGRAPHS, filed on Apr. 3, 2007, now U.S. Pat. No. 7,834,894, issued Nov. 16, 2010 the disclosure of which is hereby incorporated by reference in its entirety.

With continued reference to FIG. 18, an additional test or set of tests is performed in some embodiments with operation 1806. In operation 1806, one or more pattern tests are performed to evaluate a pattern or shape of a feature at a head point to an expected pattern or shape. A confidence value is then assigned to the head point according to how closely the head point matches the expected pattern. An example of a pattern test is illustrated in FIGS. 20-27.

Figure 20:
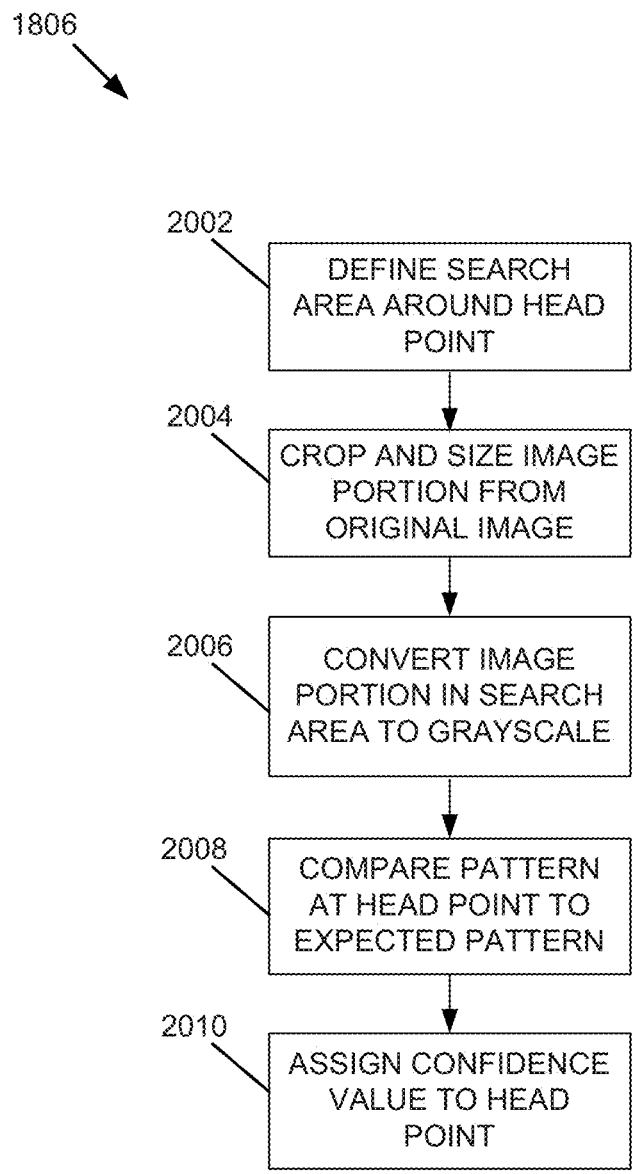
FIG. 20 is a flow chart illustrating an example pattern test of the method shown in FIG. 18.

FIG. 20 is a flow chart illustrating an example of operation 1806, including a method of evaluating a pattern in a digital image at a head point. In this example, operation 1806 includes operations 2002, 2004, 2006, and 2008. A specific example of operation 1806 is described below with reference to FIGS. 21-27, in which operation 1806 is used to evaluate a pattern in a digital image at the identified chin point.

Figure 21:
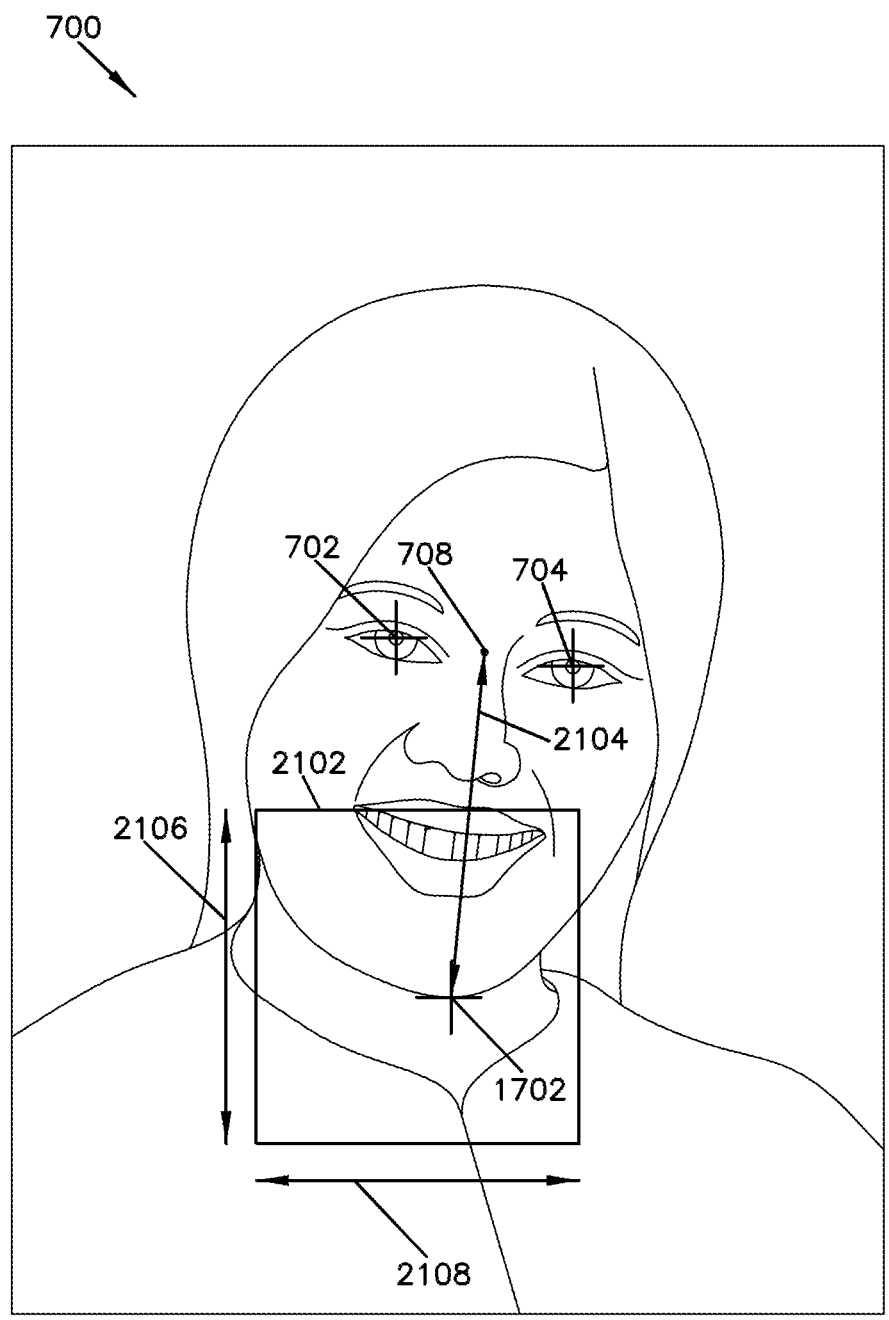
FIG. 21 illustrates a chin search area of the pattern test shown in FIG. 20.

In this example, operation 1806 begins with operation 2002 to define a search area around the head point of interest. An example of operation 1806 is illustrated with reference to FIG. 21, which includes digital image 700 including eye center points 702 and 704, and chin point 1702. FIG. 21 further illustrates a search area 2102 and distances 2104, 2106, and 2108.

In this example, search area 2102 is defined as a square region surrounding the identified chin point 1702. The size of search area 2102 is determined based on a distance 2104, which is the distance between the inter-eye center point 708 and the chin point 1702. In this example, search area 2102 has a height of distance 2106 and a width of distance 2108 which are both equal to distance 2104 and is positioned so that chin point 1702 is at the center of search area 2102.

Returning briefly to FIG. 20, after the search area 2102 has been defined, operation 2004 is next performed to crop and size the image portion defined by the search area. An example of operation 2004 is illustrated with reference to FIG. 22.

Figure 22:
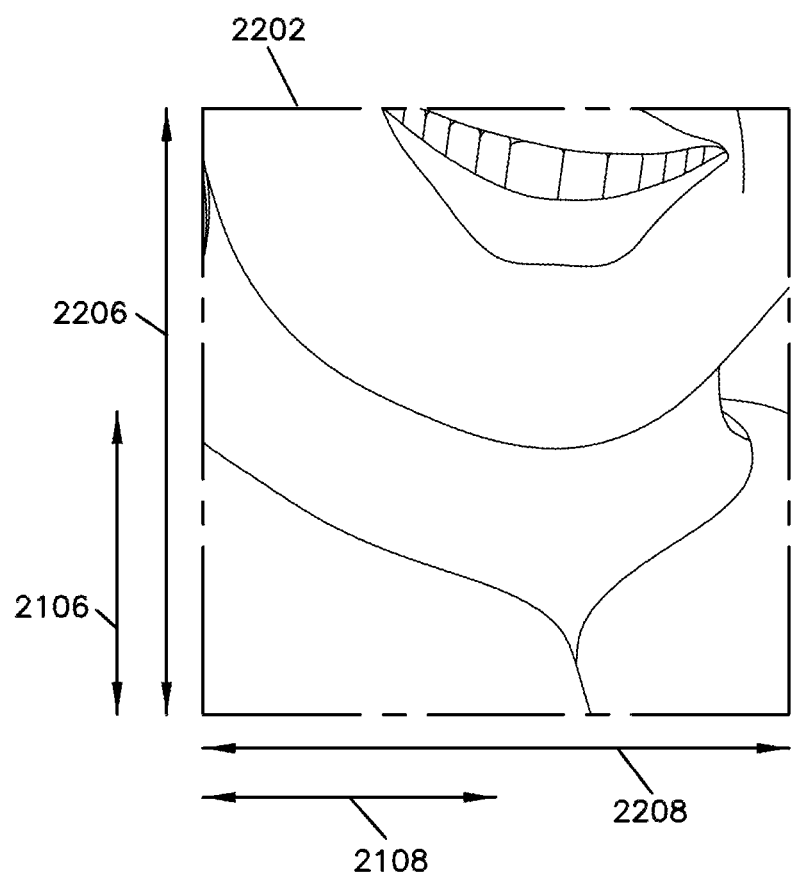
FIG. 22 illustrates an example image portion after having been cropped from the search area shown in FIG. 21.

FIG. 22 illustrates an example image portion 2202 after having been cropped from the search area 2102 and resized. Because the cropped image portion can have various sizes (due to the dimensions of the search area 2102 being defined by distance 2104, as shown in FIG. 21), after cropping the image portion 2202 from the original image, the image portion 2202 is then scaled to a desired size for subsequent processing. In this example, the original image portion 2202 had a height of distance 2106 and a width of distance 2108. The image portion 2202 is then scaled to have a desired height 2206 and desired width 2208. In this example, image portion 2202 is enlarged to the desired size.

Returning to FIG. 20, once the image portion has been cropped and sized, operation 2006 is performed to convert the image portion to grayscale. In some embodiments the original image is a red, green, and blue (RGB) image, such as a 24 bit image having eight bits per color per pixel. The RGB image is converted into a grayscale image by weighting the red, green, and blue values of each pixel and assigning a gray value to the pixels based on the red, green, and blue values. In some embodiments, the grayscaled image is adjusted to a have a desired white point and a desired black point, such as using a linear based mapping algorithm.

After the image portion 2202 has been converted to grayscale, operation 2008 compares the pattern of the grayscaled image portion 2202 to an expected pattern. The operation compares the image portion 2202 with the expected pattern to determine how well the pattern within the image portion 2202 matches the expected pattern. An example is illustrated with reference to FIGS. 23-25.

Figure 23:
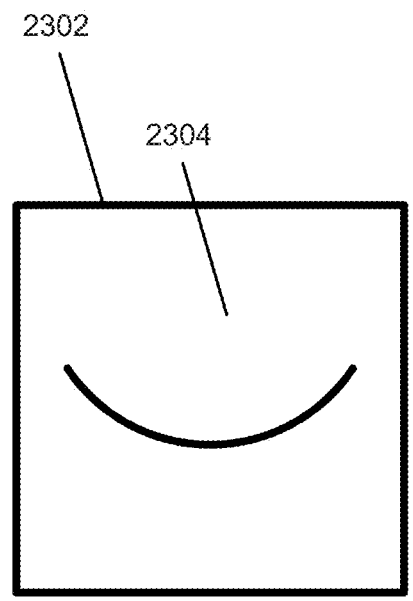
FIG. 23 is a schematic diagram of an example chin map of the pattern test shown in FIG. 20.

FIG. 23 is a schematic diagram of an example chin map 2302. The chin map 2302 includes a pattern 2304 that defines an expected pattern of a chin in a digital image. In some embodiments a chin map is generated as follows. A sampling of chin images from a population of subjects is first obtained. The chin images are scaled and sized to a common scale and size, and are converted into grayscale. The grayscaled chin images are also adjusted to have a common black point and a common white point, such as using a linear based mapping algorithm. The sampling of chin images is then evaluated to generate a chin map 2302 representing an average of all samples of the chin images. For example, to generate the first pixel of the chin map, the grayscale value of the (0,0) pixel of each sample chin image is evaluated. An average of the grayscale value is then calculated and assigned to the (0,0) pixel of the chin map. The process continues until each pixel of the chin map has been determined. The chin map is then stored in memory for subsequent use.

Figure 24:
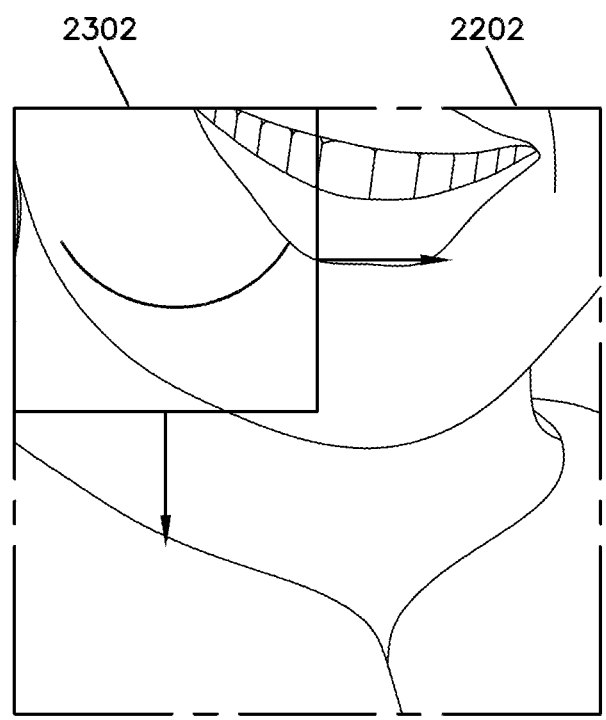
FIG. 24 illustrates a process of comparing the chin map shown in FIG. 23 with the image portion shown in FIG. 22.

FIG. 24 illustrates an example of operation 2008, during which the pattern of the image portion 2202 is compared with the pattern of the chin map 2302. In this example, the comparison begins by aligning the chin map (which is smaller than the image portion 2202) with the upper left corner of the image portion 2202. The pattern of the chin map 2302 is then compared to the pattern of the image portion 2202, and a confidence value is calculated based on how closely the patterns match. A confidence value is then generated, where an exact match is given a high confidence value (such as 0) and a completely different pattern is given a low confidence value (such as a 1).

As one example, each pixel of the chin map 2302 is compared with the corresponding pixel of the image portion 2202. For each pixel, a difference between the grayscale colors is computed, and the sum of the differences for all pixels is computed. This sum is then scaled to calculate the total confidence value for that portion of the image portion 2202.

Next, the chin map is shifted to the right by a shift distance and the image is again evaluated and another confidence value is generated. The process continues until the chin map is aligned with the right side of the image portion 2202. Next, the chin map 2302 is shifted downward by the shift distance. This portion of the image is then evaluated in the same manner until the chin map 2302 is aligned with the right side of the image portion 2202. This process is continued until the entire image portion 2202 has been evaluated and all confidence values have been generated. In some embodiments the shift distance is one pixel. In other embodiments, the shift distance is larger than one pixel, such as in a range from about 5 pixels to about 50 pixels or more.

In some embodiments the confidence values are stored in a table 2504 (or matrix), such as shown in FIG. 25, which includes a plurality of data cells 2504, 2506, 2508, and 2510. Each data cell stores one confidence value associated with a portion of the image portion 2202. For example, the upper left data cell 2504 stores a confidence value associated with an upper left portion of the image portion 2202 after the evaluation shown in FIG. 24. As the chin map 2302 is shifted by one shift distance to the right, the next evaluation is performed and the resulting confidence value is stored in data cell 2506. The values shown in the data cells of the example data table 2502 shown in FIG. 25 are hypothetical and are not based on experimental data.

As discussed above, the search area 2102 (shown in FIG. 21) was selected so that the identified chin point 1702 was in the center. As a result, if the chin point 1702 was properly identified, the center data cell is likely to have the highest confidence level. In this example, confidence values range from a high confidence level of 0 to a low confidence level of 1.

Returning now to FIG. 20, after the pattern of the image portion has been compared with the expected pattern, operation 2010 is performed to assign a confidence value to the head point. An example of operation 2010 is illustrated with reference to FIGS. 25-27.

As discussed above, the result of operation 2008 is the generation of a data table 2502 that represents the confidence levels across the entire image portion 2202. These values are next weighted in operation 2008 based on how close the corresponding portion of the image is to the center of image portion 2202, since the identified chin point 1702 should be at the center of the image portion 2202.

An example of a weighting table that can be used in operation 2008 is shown in FIG. 26. The weighting table includes data cells 2604, 2606, and 2608 that have values that vary from the high confidence value (e.g., 0) at the center data cell 2608 to a low confidence value (e.g., 1) at the edges (such as in data cells 2604).

Figure 27:
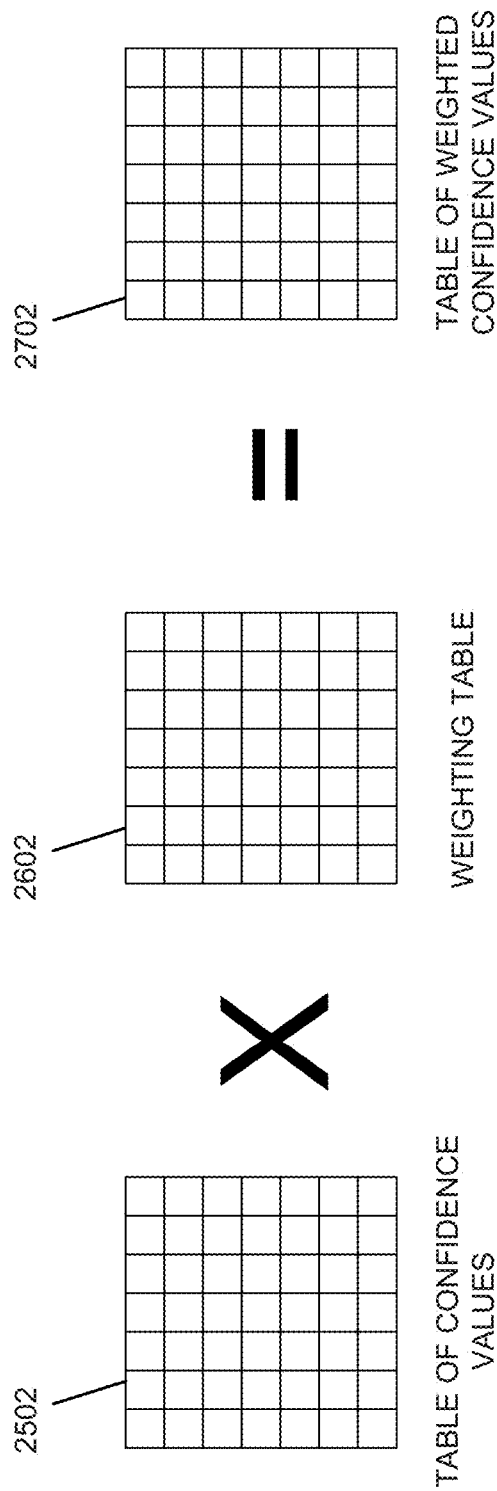
FIG. 27 illustrates the generation of a table of weighted confidence values using the table of confidence values shown in FIG. 25 and the weighting table shown in FIG. 26.

FIG. 27 illustrates a method of generating a table 2702 of weighted confidence values using the table 2502 of confidence values and the weighting table 2602. In this example, the table 2702 of weighted confidence values is calculated by multiplying the value in each data cell of table 2502 by the value of in the corresponding data cell of table 2602 and storing the result in the corresponding data cell of table 2702. The result is table 2702 that contains weighted confidence values for each portion of the image portion 2202.

In some embodiments it is desirable to generate a single confidence value for the test to assign to the head point. In some embodiments, the value of the data cell with the highest confidence level (e.g., the value closest to 0) is selected as the final confidence value for the head point to complete operation 2010.

Returning now to FIG. 18, after all confidence tests have been performed, operation 1808 assigns an overall confidence value to each head point. Although a confidence value is computed by each test, in some embodiments these confidence values are evaluated to assign a single overall confidence value to each head point. In one embodiment this is done by selecting the value of the test that returned the lowest confidence level (the value closest to 1). In this way, if a single test result shows that a head point is likely to be wrong, that head point will be identified as having a low confidence level and can be subsequently reviewed by the error correction module 206 (shown in FIG. 1) with operation 406 (shown in FIG. 4).

Returning now to FIG. 4, after all head points have been evaluated and confidence values have been assigned to the head points, operation 406 is performed to display those images that include at least one head point with a low confidence level. In some embodiments, operation 406 is performed by error correction module 206, shown in FIG. 1. An example of the error correction module 206 is described with reference to FIG. 28.

Figure 28:
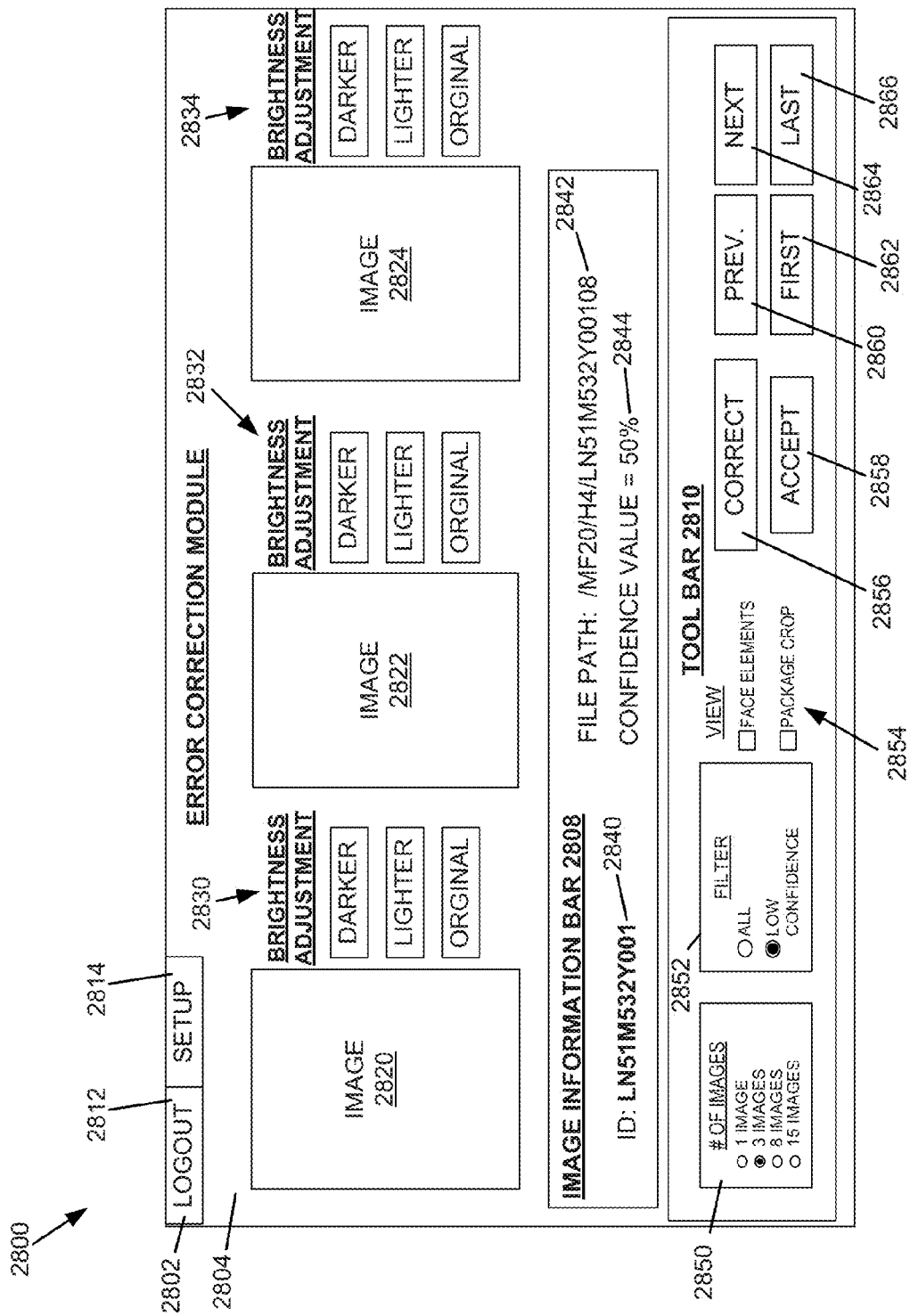
FIG. 28 is a screen shot of an example graphical user interface of an error correction module of the image processing system shown in FIG. 2.

FIG. 28 is a screen shot of an example graphical user interface 2800 of the error correction module 206. In this example, user interface 2800 includes toolbar 2802, preview window 2804, brightness adjustment buttons 2806, image information bar 2808, and tool bar 2810.

The error correction module 204 (shown in FIG. 2) operates in some embodiments to perform operation 406, in which the images that include at least one head point with a low confidence level are displayed. If correction is needed, correction data is received from the user.

Toolbar 2802 includes logout control 2812 and setup control 2814. When the logout control 2812 is selected by a user, such as with a pointer of a pointing device, such as a mouse, the logout control 2812 operates to exit error correction module 206. If changes have been made, the user is also prompted whether the changes should be saved before exiting, and if so, changes are saved to memory. When the setup control 2814 is selected by the user, a setup options window is displayed, which allows the user to select custom settings or options that modify the operation of error correction module 206.

Preview window 2804 is a graphical display area that is configured to display images, such as digital images 2820, 2822, and 2824, to the user. As discussed in more detail below, in some embodiments the digital images 2820, 2822, and 2824 are images that include at least one head point that has a low confidence level. These images are displayed to the user, who can manually review the images to determine whether manual correction is necessary. Images 2820, 2822, and 2824 are selectable by a user, such as to update the information in the image information bar 2808.

In some embodiments, images 2820, 2822, and 2824 are displayed with one or more graphical elements that relate to the identified head points. For example, in some embodiments a rectangle is displayed at or about the subject's head to show the general location of the head points that were identified. In another example, graphical elements are displayed at one or more particular head points to show the point or area where the respective head point was located. In some embodiments the graphical element is partially transparent to permit the features behind the graphical element to be visible.

Some embodiments also include image adjustment controls within preview window 2804, such as brightness adjustment controls 2830, 2832, and 2834. In this example, the controls are used to adjust the brightness of the image. Brightness adjustment control 2830 adjusts the brightness of image 2820, brightness adjustment control 2830 adjusts the brightness of image 2822, and brightness adjustment control 2830 adjusts the brightness of image 2824. For example, the brightness adjustment controls 2830, 2832, and 2834 include a darker button, a lighter button, and an original button. When the darker button is selected, the color of the image is adjusted to darken the image. When the lighter button is selected, the color of the image is adjusted to lighten the image. When the original button is selected, any changes that have been made to the brightness of the image are discarded, and the original image is displayed with the original brightness. Additional image adjustment controls are included in other embodiments, such as color adjustment controls, contrast adjustment controls, blurring or filtering controls, edge highlighting controls, drawing or airbrushing controls, or other image or color adjustment controls.

Image information bar 2808 displays information about one or more images in preview window 2804. In this example, image information bar 2808 includes image identification display 2840, path display 2842, and confidence value display 2844. Image identification display 2840 displays an identification number, code, or name of the image selected in preview window 2804. File path display 2842 displays the file path where the digital image selected in preview window 2804 is stored. Confidence value display 2844 displays the overall confidence value of the image selected in preview window 2804, such as the confidence value calculated in operation 1808, shown in FIG. 18.

Tool bar 2810 includes a plurality of controls that control the operation and display of preview window 2804 or initiate or adjust a tool of error correction module 206. In this example, tool bar 2810 includes multiple image display control 2850, filter control 2852, view control 2854, reviewing tools including correct button 2856 and accept button 2858, and navigation buttons 2860, 2862, 2864, and 2866.

Multiple image display control 2850 adjusts the total number of images that are displayed within preview window 2804 at a time. In this example, control 2850 is selectable by a user to adjust preview window 2804 to include 1, 3, 8, or 15 images at a time. Other embodiments include other numbers of images.

Filter control 2852 is selectable to select between two or more sets of digital images that are or will be displayed in preview window 2804. In this example, filter control 2852 is operable to select between all images and a subset of images that have low confidence levels. In other words, if the user wants to view all available images, the all setting is selected. The error correction module 206 operates the preview window 2804 to display all images without filtering based on confidence level. On the other hand, filter control 2852 can alternatively be set to the low confidence setting. When the low confidence setting is selected, the error correction module 206 operates the preview window 2804 to display only a subset of all of the images, the subset including those images that have been assigned a low confidence level. Since the subset of images have been assigned a low confidence level, these images are most likely to need correction.

View control 2854 adjusts the display of images in preview window 2804. In this example, view control 2854 includes a face elements selection box and a package crop selection box, although other embodiments include more, fewer, or different controls. When the face elements selection box is selected, head points associated with images 2820, 2822, and 2824 are graphically displayed on the images in preview window 2804. When the package crop selection box is selected, images 2820, 2822, and 2824 are displayed cropped according to a selected package style. When the package crop selection box is not selected, the entire digital images 2820, 2822, and 2824 are displayed without cropping.

After images 2820, 2822, and 2824 have been displayed in preview window 2804, reviewing tools (including correct button 2856 and accept button 2858) are used to receive an input from the user. In this example, reviewing tools include a correct button and an accept button. If, after the user reviews the digital images 2820, 2822, and 2824, the user finds one or more errors, correct button 2856 is selected to indicate that one or more of the images require correction. In some embodiments, selection of the correct button 2856 also causes error correction module 206 to initiate a manual correction module. In other embodiments the manual correction module is not initiated until after all (or a subset) of the images have been reviewed to flag images requiring correction. If, on the other hand, the user determines that there are no errors in images 2820, 2822, and 2824, the accept button is selected to indicate that the images do not require correction.

In another possible embodiment, correct and accept buttons 2856 and 2858 are not present. Instead, in some embodiments images 2820, 2822, and 2824 are selectable. In this embodiment, if a user clicks on one of the images, the error correction module 2800 receives the input that indicates that the associated image contains at least one error. In some embodiments, upon selection of the image, the manual correction module 3002 is initiated. In some embodiments the manual correction module opens a new window 3002 that permits the user to adjust the head points. In another possible embodiment, the manual correction module operates to allow the user to make manual corrections directly within user interface 2800.

Navigation buttons 2860, 2862, 2864, and 2866 are provided to allow a user to navigate through a set of images using preview window 2804. In this example, navigation buttons include a previous button, a next button, a first button and a last button. When the previous button is selected by a user, preview window 2804 is updated to display a previous image in the set of images, such that image 2820 and image 2822 are shifted to the right and image 2824 is no longer displayed. The previous image is displayed at the location of image 2820 shown in FIG. 28. In another possible embodiment, the previous button 2860 operates to update preview window 2804 to include a prior set of images, such as the three prior images (or any other number of images, such as selected in the number of images control 2850). Similarly, when the next button 2864 is selected, preview window 2804 is updated to display the next image (or a next set of images) of the current set of images.

When the first button 2862 is selected, preview window 2804 is updated to display the first image of the set of images, such as at the location of image 2820 in FIG. 28. Similarly, when the last button 2866 is selected, preview window 2804 is updated to display the last image of the set of images, such as at the location of image 2824 in FIG. 28.

In some embodiments, error correction module 206 utilizes a confidence selectivity value to determine whether or not a digital image should be displayed in user interface 2800. In some embodiments the confidence selectivity value is hardcoded into the software application. In another possible embodiment, the confidence selectivity value is adjustable by an authorized user, such as a production manager, a director, or other authorized user. For example, the confidence selectivity value is a value between 0% (no selectivity) and 100% (full selectivity). When the confidence selectivity is set to a low value (e.g., 5%), error correction module 206 the majority of the digital images will be included in a set of images that qualify as having a low confidence level and that will be displayed to the user for manual review. In this example, the operator will be presented with a large number of images including those that are likely to be correct as well as images that are likely to be incorrect. On the other hand, when the confidence selectivity is set to a high value (e.g., 95%), only a small number of the images that are most likely to have errors will be included in the set of images having a low confidence level. The resulting set of images is made available for display in preview window 2804.

By filtering the images that are included in the set of low confidence level images, the total number of images that need to be manually reviewed is lessened, and manual review is focused to those images that are most likely to require correction. The greater the selectivity of the filter, the smaller the number of images that will need to be manually reviewed. However, if the selectivity is too large, images that contain errors may not be identified by the manual review, resulting in errors in the final images. Therefore, by decreasing the selectivity of the filter and increasing the number of images that are reviewed, fewer errors will go undetected.

Figure 29:
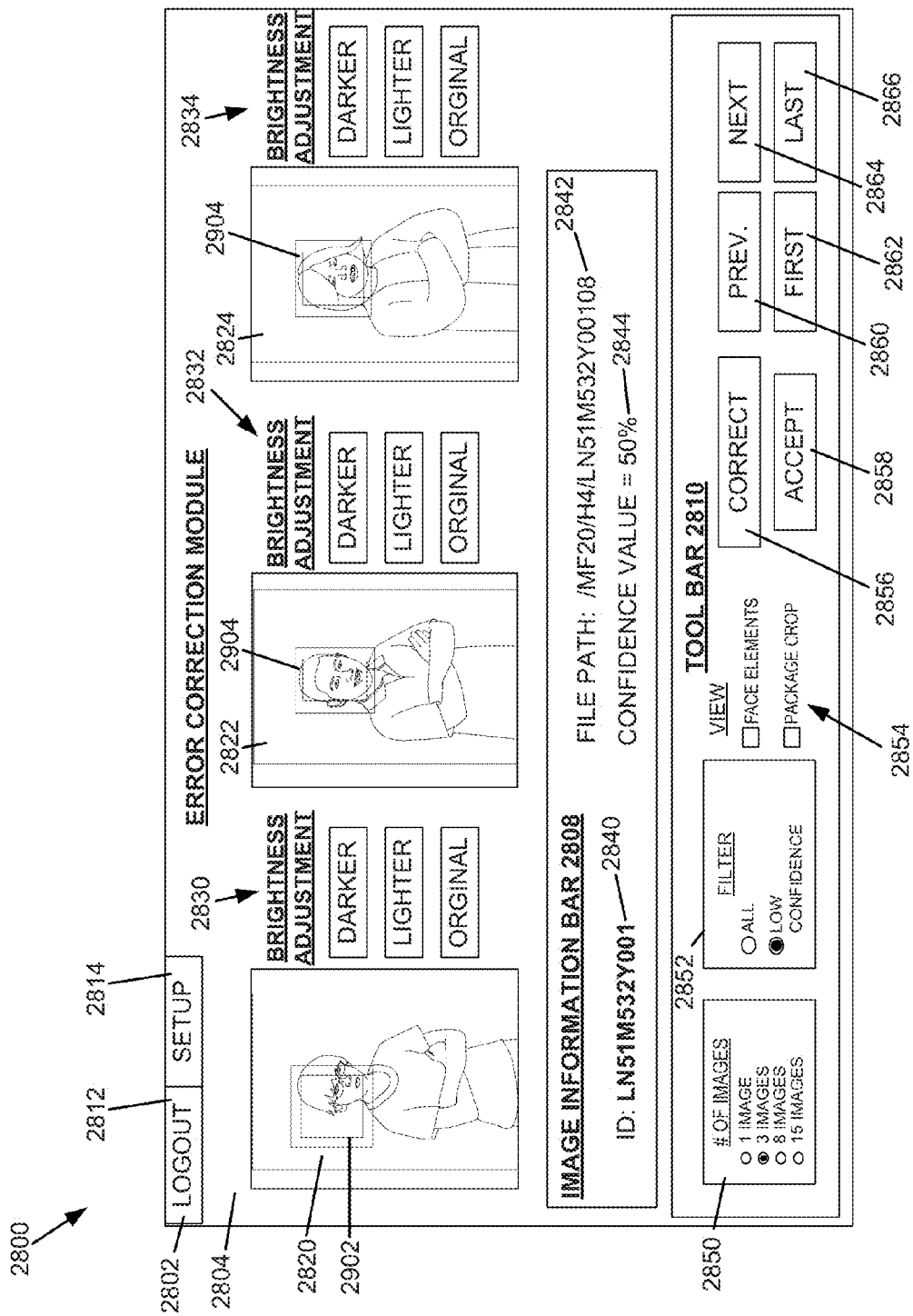
FIG. 29 is a screen shot of another graphical user interface of the error correction module of FIG. 28.

FIG. 29 is a screen shot of another example graphical user interface of the error correction module 206. In this example, user interface 2800 includes toolbar 2802, preview window 2804, brightness adjustment buttons 2806, image information bar 2808, and tool bar 2810. User interface 2800 also includes examples of images 2820, 2822, and 2824 that are annotated with graphical elements 2902, 2904, and 2906 that show the general location of the identified head points for each image. In some embodiments, graphical elements 2902, 2904, and 2906 are not displayed if a manual correction is made.

In this example, error correction module 206 displays graphical elements 2902, 2904, and 2906 in the form of a colored rectangle that is superimposed on images 2820, 2822, and 2824. The rectangle is positioned so that each side of the rectangle is positioned over one of the head points. For example, the upper side is aligned with the top of the head point, the left side is aligned with the left side of the head point, the right side is aligned with the right side of the head point, and the bottom side is aligned with the chin point.

In some embodiments, graphical elements 2902, 2904, and 2906 are in the shape of a border having a transparent center. The sides of the border have a width that identifies a tolerance region for each head point. The identified head point is considered acceptable if it is anywhere within the tolerance region of the graphical element. In some embodiments the tolerance region is in a range from about 5 pixels to about 300 pixels, and in some embodiments the tolerance region is in a range from about 25 pixels to about 50 pixels.

The user can then quickly review the images 2820, 2822, and 2824 and determine whether or not the head points have been properly identified by the image analysis module 202 (shown in FIG. 1). To do so, the user visually inspects each of images 2820, 2822, and 2824 and determines whether the actual head points of the subjects are within the sides of the graphical elements 2902, 2904, and 2906.

In this case, the user determines that the head points of images 2822 and 2824 are correct, but that the head points of image 2820 are incorrect. As a result, the user selects image 2820 and then selects the correct button 2856 to indicate that the head points of image 2820 require correction. Error correction module 206 receives this input, and in some embodiments, initiates a manual correction module.

Figure 30:
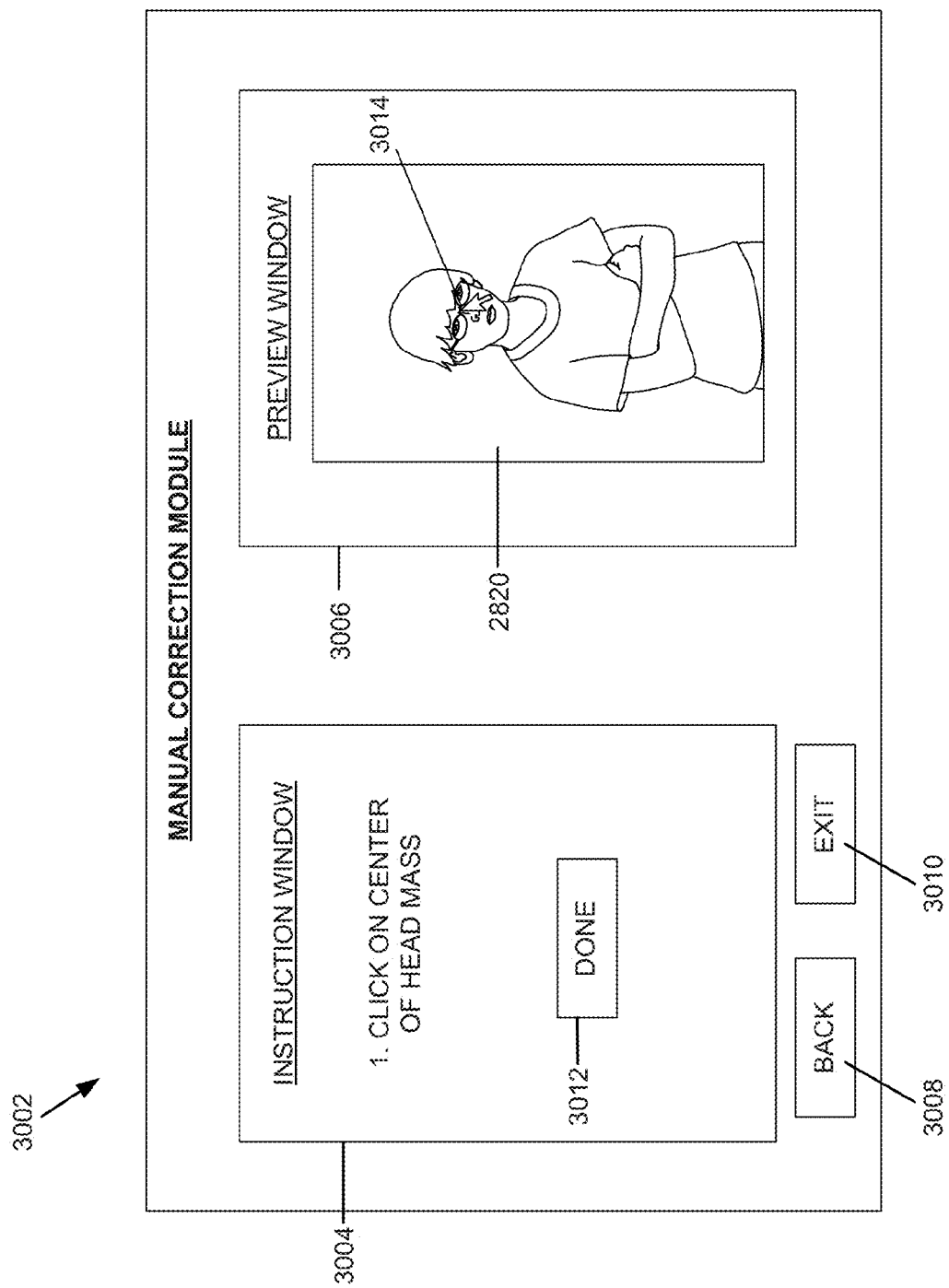
FIG. 30 is illustrates a user interface of a manual correction module of the error correction module shown in FIG. 28.
Figure 31:
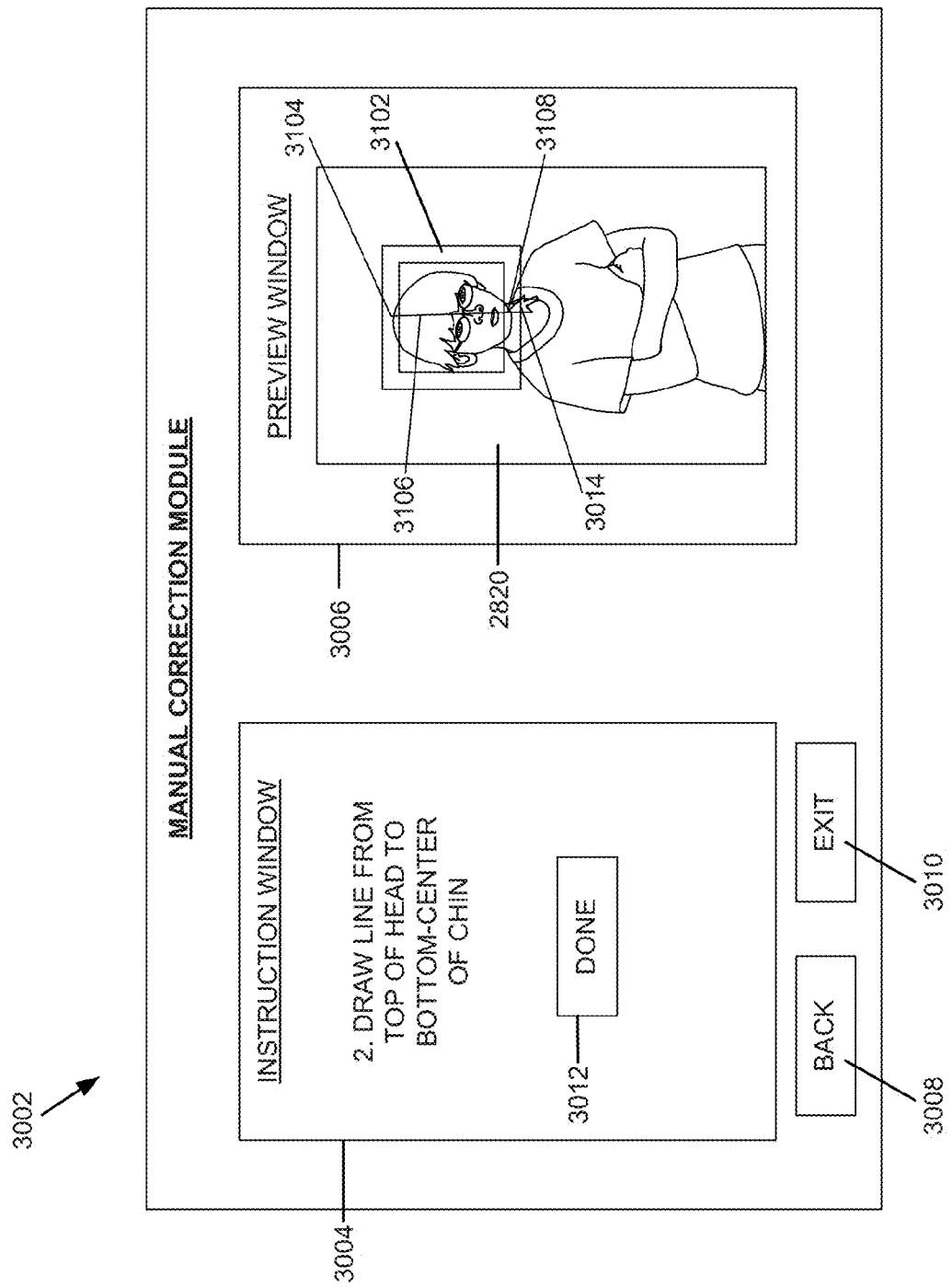
FIG. 31 illustrates another user interface of the manual correction module of FIG. 30.
Figure 32:
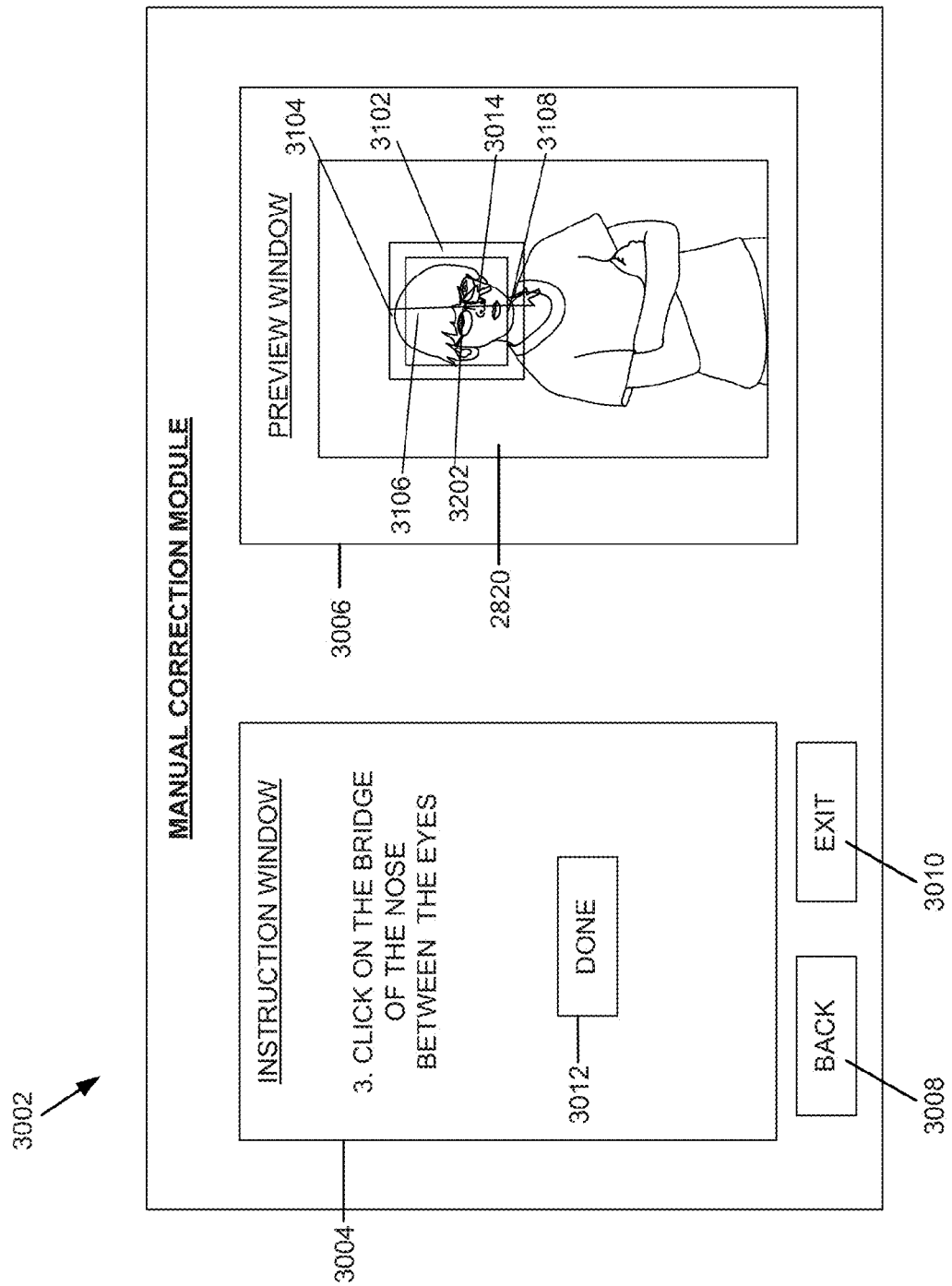
FIG. 32 illustrates another user interface of the manual correction module of FIG. 30.

An example of a manual correction module 3002 is shown in FIGS. 30-32. FIGS. 30-32 are screen shot of an example user interface of the manual correction module 3002. As noted above, in some embodiments a separate user interface is generated for the manual correction module 3002. However, in other embodiments the manual correction module operates within error correction module user interface 2800. In some embodiments instructions are not displayed to the user. In some embodiments a tutorial or instruction manual is provided that trains the user how to interact with the manual correction module 3002 so that the manual correction module 3002 does not need to provide the instructions to the user.

The user interface of the manual correction module 3002 includes instruction window 3004, preview window 3006, back button 3008, and exit button 3010. Instruction window 3004 provides instructions to the user to guide the user through the manual correction process. A done button 3012 is provided in some embodiments, which the user can select to indicate that the user has completed the indicated portion of the process. Preview window 3006 displays the digital image 2820 that is to be corrected.

The back button 3008 allows the user to indicate that the user would like to return to a previous user interface display. When the back button 3008 is selected, the manual correction module 3002 updates to display the previously displayed page of the user interface. When the exit button 3010 is selected, the manual correction module terminates and the user interface of the error correction module 206 (such as shown in FIG. 29) is again displayed.

FIG. 30 illustrates the user interface of the manual correction module 3002 including a first instruction in instruction window 3004. The first instruction asks the user to click on the center of the subject's head mass. The user moves the pointer 3014 to a point approximately at the center of the head mass and clicks the image 2820 at that point. Done button 3012 is then selected to inform the manual correction module 3002 that the task has been completed.

FIG. 31 illustrates the user interface of the manual correction module 3002 including a second instruction in instruction window 3004. A second instruction is displayed in instruction window 3004, which instructs the user to draw a line from the top of the head to the bottom-center of the chin. Following the instructions, the user moves the pointer 3014 to a point 3104 approximately at the top of the head and clicks to cause the manual correction module to begin drawing a line 3106. The user then moves the pointer 3014 to a point 3108 approximately at the bottom center of the chin and clicks again to complete the line. The done button 3012 is then selected to indicate that the task has been completed.

In some embodiments, the preview window 3006 is updated to display a graphical element 3102 centered at the indicated center of the head mass, showing the manual correction modules current estimate of the location of the head mass, and having a top portion aligned with the top of head point 3104 and bottom portion aligned with chin point 3108. In this example the graphical element 3102 is a colored and partially transparent rectangle. Other embodiments include other graphical elements 3102. For example, in one alternate embodiment a three-sided graphical element is used. A top side is used to identify the top of the head point and left and right sides are used to show the approximate left and right sides of the head. Other shapes are used in other embodiments, such as circles, lines, squares, points, x-symbols, +-symbols, or other desired shape. Some embodiments do not include graphical element 3102 once a manual correction has begun.

FIG. 32 illustrates the user interface of the manual correction module 3002 including a third instruction in instruction window 3004. After the user has completed the second task to draw a line from the top of the head to the bottom-center of the chin, the user interface of the manual correction module is updated. In some embodiments, the graphical element 3102 is updated to position the top side of the rectangle so that the top side is aligned with the new top of the head point 3104. Similarly, the bottom side of the rectangle is positioned to align it with the new chin point 3108. Knowing the general scale of the head, based on the overall height of the head defined by line 3106, the manual correction module also, in some embodiments, adjusts the sides of the graphical element 3102 to an appropriate scale, such as by maintaining a constant aspect ratio of the square when the top and bottom sides are repositioned. As noted above, in some embodiments, graphical element 3102 is not displayed once a manual correction has begun.

A third instruction is also displayed in instruction window 3004, which instructs the user to click on the bridge of the nose between the eyes. Following the instructions, the user moves the pointer 3014 to the point on the bridge of the nose and between the eyes and clicks at that point. The user interface displays a graphical element 3202 at that point. The done button 3012 is then selected to complete the manual correction process of the manual correction module 3002.

After the manual correction module 3002 completes, in some embodiments the error correction module returns to the user interface shown in FIG. 29 to allow the user to continue reviewing additional digital images. As discussed above, in alternate embodiment, manual correction module 3002 operates within error correction module 2800, such that the error correction module continues to be displayed once manual correction is completed.

The process described above does not require the user to specifically identify the left side of the head and the right side of the head. Rather, the manual correction module estimates these locations based upon the known size of the head (from top to chin) and the approximate center point of the head mass. The resulting estimates of the sides of head points are sufficient for most applications.

In another possible embodiment, the manual correction module prompts the user to point to each of the specific head points, or alternatively to move one or more of the erroneous head point to a correct location, such as by clicking and dragging a graphical representation of the head point within the image.

Figure 33:
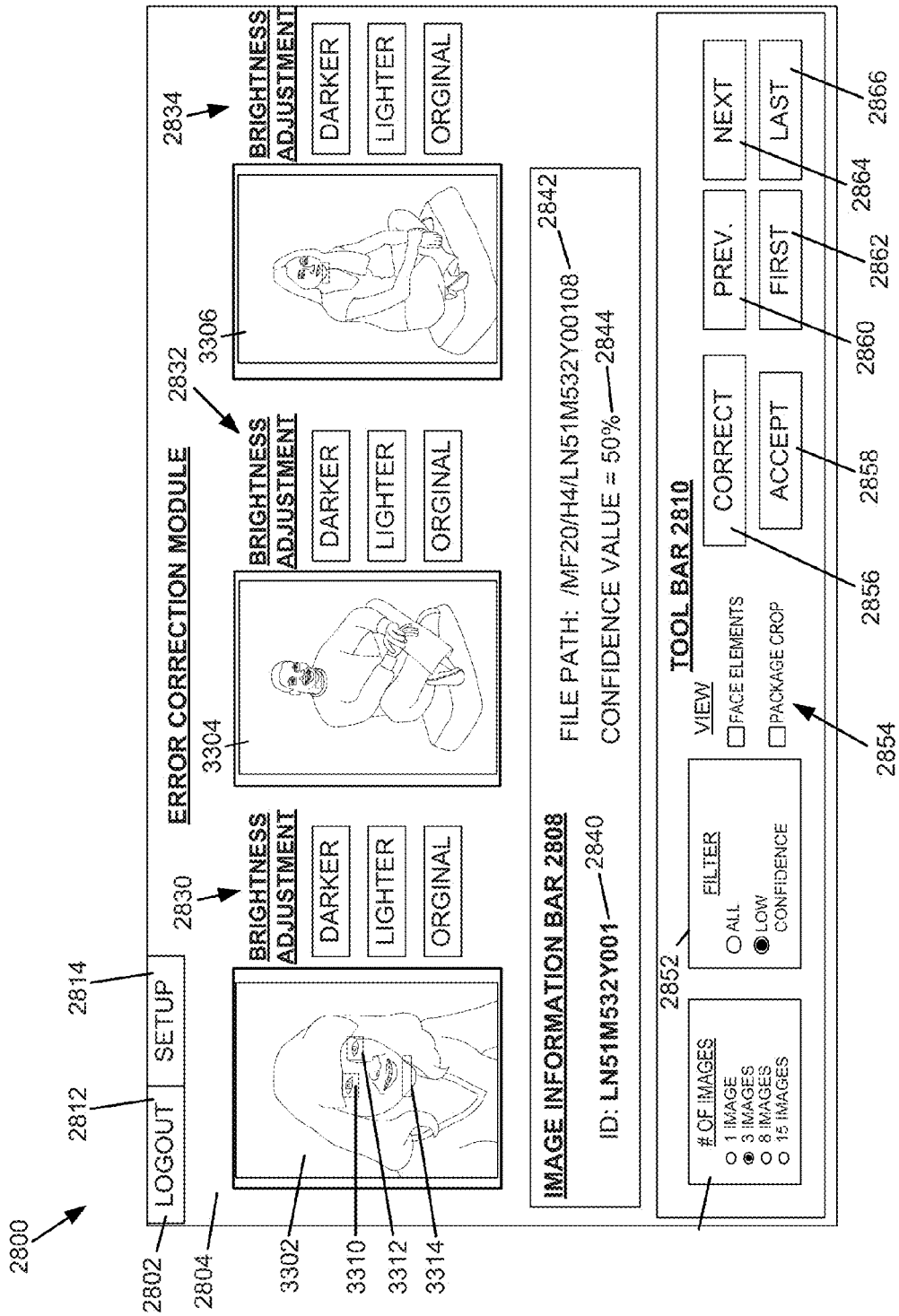
FIG. 33 is a screen shot of another example graphical user interface of the error correction module of FIG. 28.

FIG. 33 is a screen shot of another example graphical user interface of the error correction module 206. In this example, user interface 2800 includes toolbar 2802, preview window 2804, brightness adjustment buttons 2806, image information bar 2808, and tool bar 2810. User interface 2800 also includes examples of images 2820, 2822, and 2824 that are each annotated with multiple graphical elements indicating the identified locations of the eye points and the chin points in the digital images 3302, 3304, and 3306.

In this example, digital image 3302 is annotated with graphical elements 3310, 3312, and 3314. Graphical element 3310 displays the location of the identified left eye point, graphical element 3312 displays the location of the identified right eye point, and graphical element 3314 displays the location of the identified chin point. Digital images 3304 and 3306 include similar graphical elements.

In some embodiments graphical elements 3312 are colored boxes that are at least partially transparent. Examples of suitable colors are red, blue, yellow, or green, although other embodiments use other colors. A color that is different than a typical head or background color is beneficial because it will be more easily located on the digital image. Although particular points have been identified for the eyes and chin, the graphical elements define an eye region and a chin region having a height and a width. The height and width represent a suitable tolerance that the eye points and chin point can deviate from the actual eye and chin points. If the user determines that the eye points and the chin points are within the area of the graphical elements, the points are acceptable. However, if the points fall outside of the graphical elements, the points are not acceptable and manual correction is required in some embodiments.

In the example illustrated in FIG. 33, digital images 3304 and 3306 are acceptable because the actual eye points and chin points are within the areas of the graphical elements. In digital image 3302, the actual eye points are within the graphical elements 3310 and 3312, but the chin point is below graphical element 3314. As a result, the user selects image 3302 and then selects the correct button 2856 to indicate the correction is required. Correction then proceeds in the same or similar manner to discussed above with reference to the manual correction module 3002, such as shown in FIG. 30. After the correction is completed, in some embodiments the user interface of the error correction module 206 is again displayed to permit the user to continue to review the remaining digital images.

Returning now to FIG. 4, after all digital images have been reviewed and any necessary corrections have been made, operation 406 comes to an end and operation 408 is next performed. In operation 408, the appropriate cropping locations are determined in the digital images based in part on the identified head points. In some embodiments operation 408 is performed by cropping module 208, shown in FIG. 1.

Figure 34:
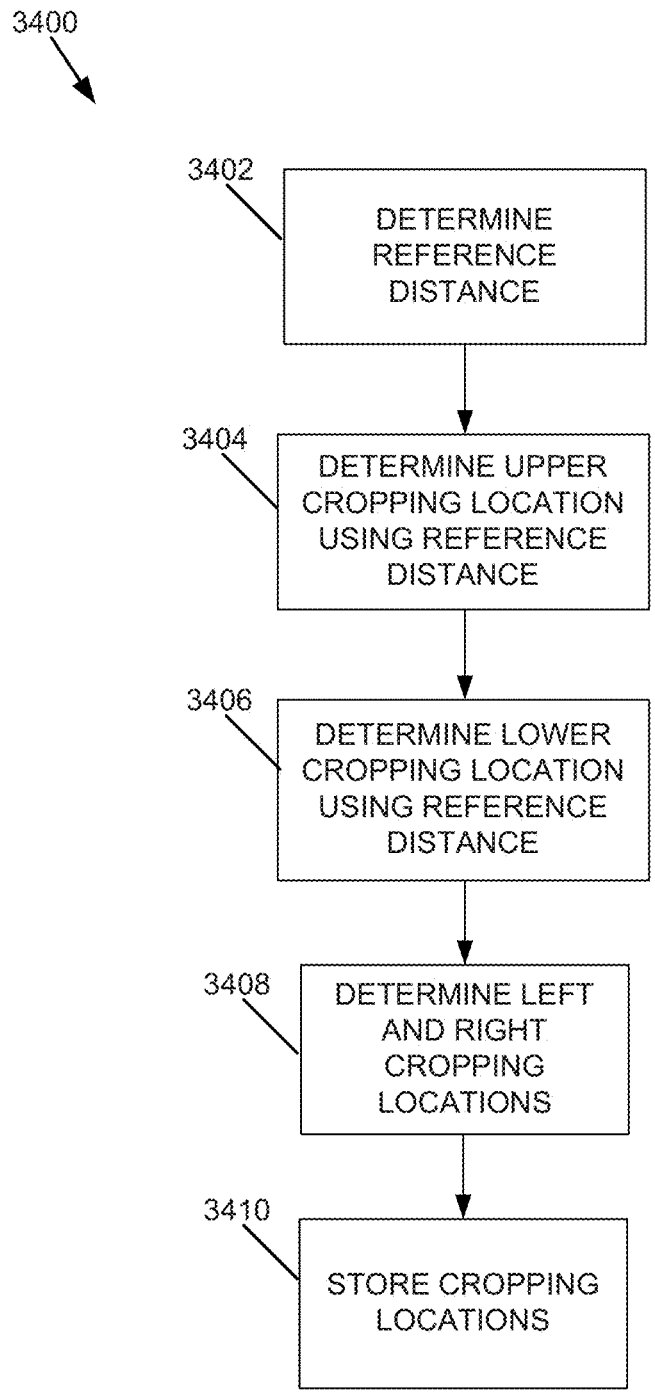
FIG. 34 is a flow chart illustrating an example method of determining cropping locations in a digital image.

FIG. 34 is a flow chart illustrating an example method 3400 of determining cropping locations in a digital image. In this example, method 3400 includes operations 3402, 3404, 3406, 3408, and 3410. Some embodiments of method 3400 are performed by cropping module 208, shown in FIG. 1. An example of method 3400 is described below with reference to FIG. 35.

Operation 3400 begins, in some embodiments, with operation 3402 to determine a reference distance in the digital image. A reference distance is used, for example, to allow the method to adjust for variations in the zoom and/or size of an original digital image. Subsequent cropping is then performed, in some embodiments, based on the reference distance.

For example, one original digital image may be a photograph of a subject that is closely zoomed in on the subject's head. Another original digital image may be a photograph of a subject that is zoomed out from the subject, such that it includes not only the subject's head, but also the subject's arms and torso. As described below, the reference distance is used in some embodiments to define cropping locations that provide a consistent final image, regardless of the zoom or size of the original image.

Figure 35:
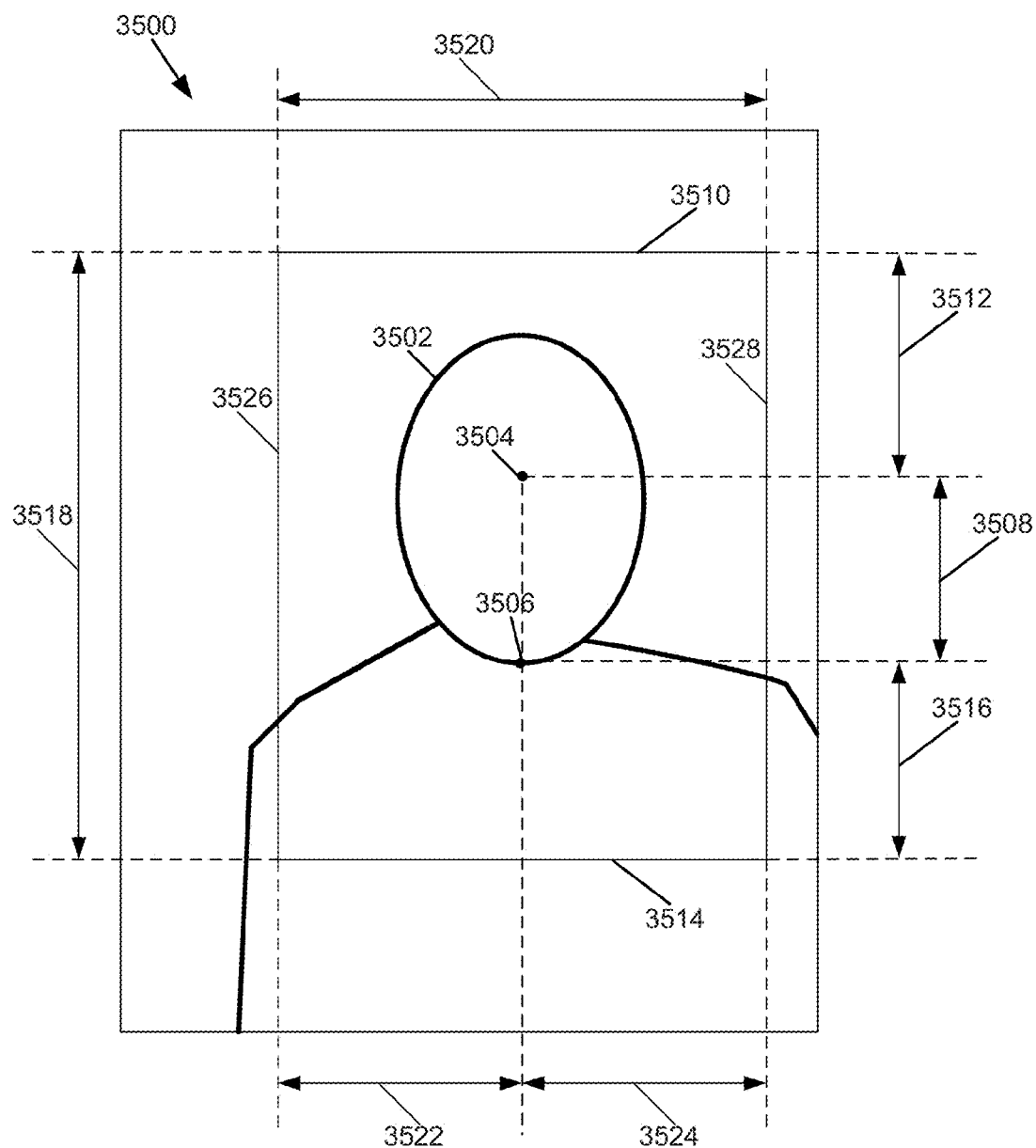
FIG. 35 illustrates an example of the method shown in FIG. 34.

The reference distance is, for example, a distance between identified head points of the subject. An example of a reference distance is a distance between an inter-eye center point and a chin point. Another example of a reference distance is a distance between a top of head point and a chin point. Yet another example of a reference distance is a distance between the left and right eye points. A further example of a reference distance is a distance between the left side of the head point and the right side of the head point. An example of operation 3402 is illustrated in FIG. 35, which shows an example reference distance 3502, which is the distance between an inter-eye center point 3504 and a chin point 3506.

After determining a reference distance, operation 3404 is performed to determine an upper cropping location using the reference distance. In some embodiments, operation 3404 also uses an upper cropping value to determine the upper cropping location. The upper cropping location is, for example, an input value provided by a user. In another possible embodiment, the upper cropping value is selected from a lookup table stored in memory. The upper cropping value may, for example, be associated with a final product identified by the user or selected by the customer. In another possible embodiment, the upper cropping value is a fixed value.

In some embodiments, the upper cropping location is determined to be a distance above a head point (or other feature), where the distance is the product of the upper cropping value and the reference distance. As one example, if the upper cropping value is 1.901, the upper cropping location is computed to be the location that is a distance of 1.901 times the reference distance above the inter-eye center point. An example of the upper cropping location 3510 is shown in FIG. 35, which is a distance 3512 above the inter-eye center point 3504. In another possible embodiment, the distance is a distance above another head point, such as an eye point, a mouth point, a center of head mass point, a top of the head point, a side of the head point, or other point within the digital image.

The upper cropping value is, in some embodiments, in a range from about 0.5 to about 4. In another embodiment, the upper cropping value is in a range from about 1.5 to about 2.5. Other embodiments include other values outside of these ranges.

Operation 3406 is performed to determine a lower cropping location using the reference distance. Similar to operation 3404, some embodiments of operation 3406 use a lower cropping value to determine the lower cropping location. The lower cropping value is an input, in some embodiments, or is determined based on another input. In other embodiments, the lower cropping value is a fixed value.

In some embodiments, the lower cropping location is determined to be a distance below a head point (or other feature), where the distance is the product of the lower cropping value and the reference distance. As one example, if the lower cropping value is 2.227, the lower cropping location is computed to be the location that is a distance of 2.227 times the reference distance below the chin point. An example of a lower cropping location 3514 is shown in FIG. 35, which is a distance 3516 below the chin point 3506. In another possible embodiment, the distance is a distance below another head point, such as an eye point, a mouth point, a center of head mass point, an inter-eye center point, a side of head point, or other point within the digital image.

The lower cropping value is, in some embodiments, in a range from about 0.5 to about 4. In another embodiment, the upper cropping value is in a range from about 2 to about 3. Other embodiments include other values outside of these ranges.

In this example, after the upper and lower cropping locations have been identified, operation 3408 is performed to determine left and right cropping locations. In some embodiments, operation 3408 uses an aspect ratio value that is provided as an input. In other embodiments, the aspect ratio value is defined by a product that is identified by the user or selected by the customer. For example, operation 3408 retrieves the aspect ratio value from a lookup table based on the final product to be produced. In another possible embodiment, the aspect ratio value is a fixed value.

The aspect ratio value identifies the desired relationship between the height and the width of a final image, and is calculated as the desired width divided by the desired height. As one example, an aspect ratio value is 0.95.

The final image height is determined by calculating the distance between the upper cropping location and the lower cropping location. In another embodiment, the height is computed as the sum of the upper and lower cropping distances 3512 and 3516 and the reference distance 3508. Once the final image height 3518 is known, operation 3408 computes the desired width by dividing the height by the aspect ratio value.

In some embodiments, the aspect ratio in a range from about 0.5 to about 2.5. In other embodiments, the aspect ratio is in a range from about 0.7 to about 1.5. Other embodiments have other aspect ratio values outside of these ranges.

Once the desired width is known, the left and right cropping locations are computed. In some embodiments, the left cropping location is computed by dividing the desired width by two and then determining the location that is that distance to the left of a head point, such as the inter-eye center point. In other embodiments, another head point (or other feature) is used, such as an eye point, a mouth point, a center of head mass point, an inter-eye center point, a side of head point, a chin point, or other point within the digital image. Similarly, the right cropping location is found by determining the location that is the distance (half of the desired width) away from the same head point. In this way, the left and right cropping locations are placed equal distances on either side of the head point.

An example is shown in FIG. 35 with reference to image 3500. FIG. 35 includes overall image width 3520, left cropping distance 3522, right cropping distance 3524, left cropping location 3526, and right cropping location 3528. The left and right cropping distances 3522 and 3524 are each one half of the overall cropped image width 3520, which is computed from the cropped image height 3518 and the aspect ratio value, for example. Left and right cropping locations 3526 and 3528 are calculated as the locations that are to the left and to the right of a head point, such as inter-eye center point 3504.

Operation 3410 is then performed to store the cropping locations in memory. In some embodiments the cropping locations are stored with the original image, such as in metadata of the original image. In another embodiment, the cropping locations are stored in memory and associated with the original image, such as by storing the cropping locations with an identifier of the original image, such as the file name of the original image.

Although method 3400 has been described with reference to an exemplary order of the various operations, other embodiments perform the operations in different orders. For example, in some embodiments, operation 3406 is performed before operation 3404. As another example, in some embodiments the right cropping location is computed before the left cropping location. In another possible embodiment, left and right cropping locations are computed by operations 3404 and 3406, while upper and lower cropping locations are computed by operation 3408. Further, in another possible embodiment each cropping location is stored in memory as soon as it is computed (e.g., during or after operations 3404, 3406, and 3408), rather than after operation 3408.

Figure 36:
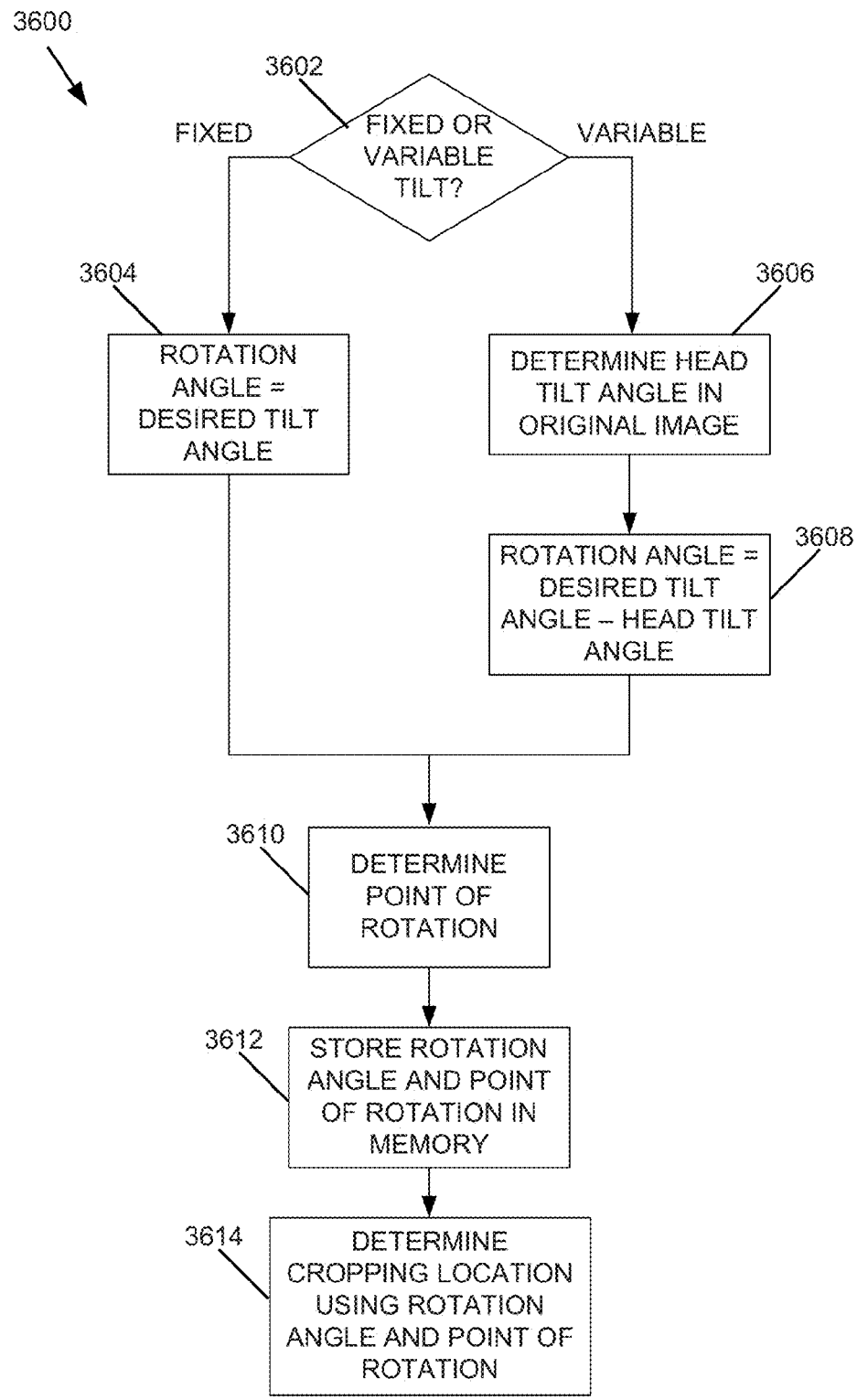
FIG. 36 is a flow chart illustrating an example method for computing rotated cropping locations for a digital image.

FIG. 36 is a flow chart illustrating an example method 3600 for computing rotated cropping locations for a digital image. In this example, method 3600 includes a fixed rotation mode and a variable rotation mode, and includes operations 3602, 3604, 3606, 3608, 3610, 3612, and 3614.

In some embodiments, method 3600 begins with operation 3602 to determine whether to operate in a fixed tilt mode or a variable tilt mode. The fixed tilt mode operates to apply a fixed rotation angle to a cropped image regardless of the position of the subject in the image. The variable tilt mode, on the other hand, considers whether the subject's head is already tilted, and if so, the rotation angle is adjusted to obtain a desired tilt angle.

In some embodiments the fixed or variable tilt mode is input by a user. In another embodiment, the fixed or variable tilt mode is selected by a customer, such as with the purchase order and is retrieved by operation 3602.

If operation 3602 determines that the fixed tilt mode is to be used, operation 3604 is next performed to set the rotation angle equal to the desired tilt angle.

If operation 3602 determines that the variable tilt mode is to be used, operations 3606 and 3608 are next performed.

Operation 3606 determines the head tilt angle in the original image. In one example embodiment, operation 3606 computes the angle between an imaginary vertical line (e.g., a line parallel with the left or right sides of the original image) and a line passing through the inter-eye center point and the chin point. Other embodiments use other head points, such as the top of the head point, etc.

Figure 37:
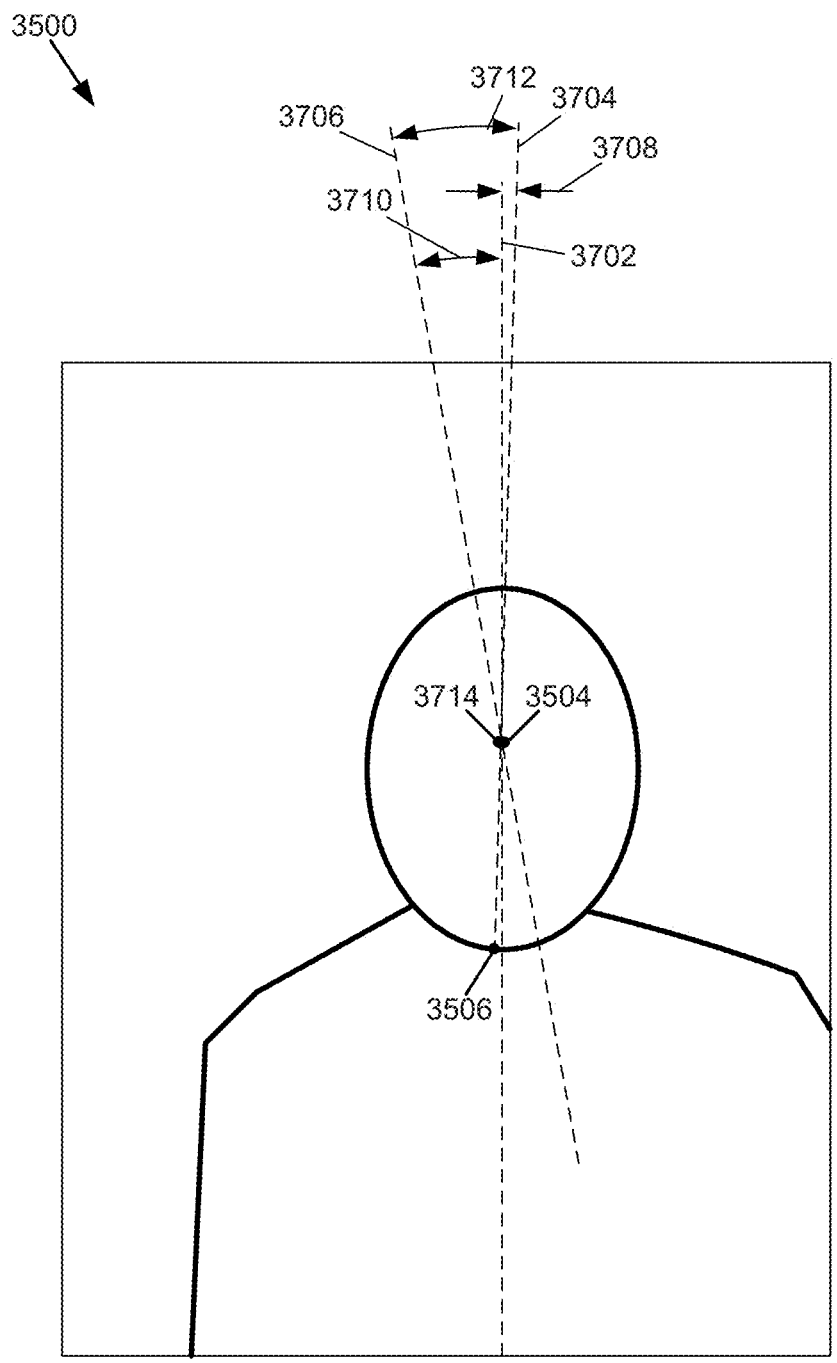
FIG. 37 illustrates an example of the method shown in FIG. 36.

An example is shown in FIG. 37 with reference to image 3500, and shows an imaginary vertical line 3702 and head tilt line 3704. The imaginary vertical line 3702 is a line parallel with the left and right sides of image 3500. The head tilt line is a line passing through selected head points, such as the inter-eye center point 3504 and the chin point 3506. The angle between the imaginary vertical line 3702 and the head tilt line 3704 is the head tilt angle 3708.

After determining the head tilt angle in operation 3606, the rotation angle is then calculated. In this example, the rotation angle is calculated by subtracting the head tilt angle from the desired tilt angle.

An example of operation 3606 is also shown in FIG. 37, which includes a desired tilt line 3706 defined by the desired tilt angle 3710. The desired tilt angle 3710 is, for example, the desired overall tilt of the subject's head in the final cropped image with respect to the imaginary vertical line 3702. The rotation angle 3712 is computed as the difference between the desired tilt angle 3710 and the head tilt angle 3708. In some embodiments the rotation angle 3712 is in a range from about −30 degrees to about 30 degrees, and in other embodiments in a range from about −20 degrees to about 20 degrees, and in further embodiments in a range from about −10 degrees to about 10 degrees. In other possible embodiments, rotation angle 3712 only has positive rotation angles (e.g., ranges from about 0 to 30, 0 to 20, or 0 to 10).

In this example, after the rotation angle has been determined, operation 3610 is performed to determine a point of rotation. In some embodiments the point of rotation is a center point of the original image. In other embodiments, the image is rotated about a different point of rotation. In some embodiments the point of rotation is defined by one or more head points, such as to ensure that the center point is located at or around a center of the final cropped image.

An example of a point of rotation 3714 is also shown in FIG. 37. In this example, the point of rotation 3714 is calculated as the point horizontally aligned with the inter-eye center point 3504 and vertically aligned between the inter-eye center point and the chin point (e.g., an average of the x-coordinates of the inter-eye center point and the chin point). Other embodiments include other points of rotation, such as defined by other head points. In some embodiments, operation 3610 is performed before one or more of operations 3602, 3604, 3606, and 3608.

Operation 3612 is then performed to store the rotation angle and the point of rotation in memory. In some embodiments operation 3612 is performed during or after operations 3604, 3608, and 3610, such as to store the angle and point of rotation values as they are computed.

After the rotation angle and point of rotation have been determined, operation 3614 is performed to determine rotated cropping locations using the rotation angle and point of rotation values. In some embodiments, operation 3614 is the same as method 3400 (described with reference to FIGS. 34 and 35), except that each of the cropping locations is computed based on the original image being rotated about the point of rotation according to the rotation angle.

Figure 38:
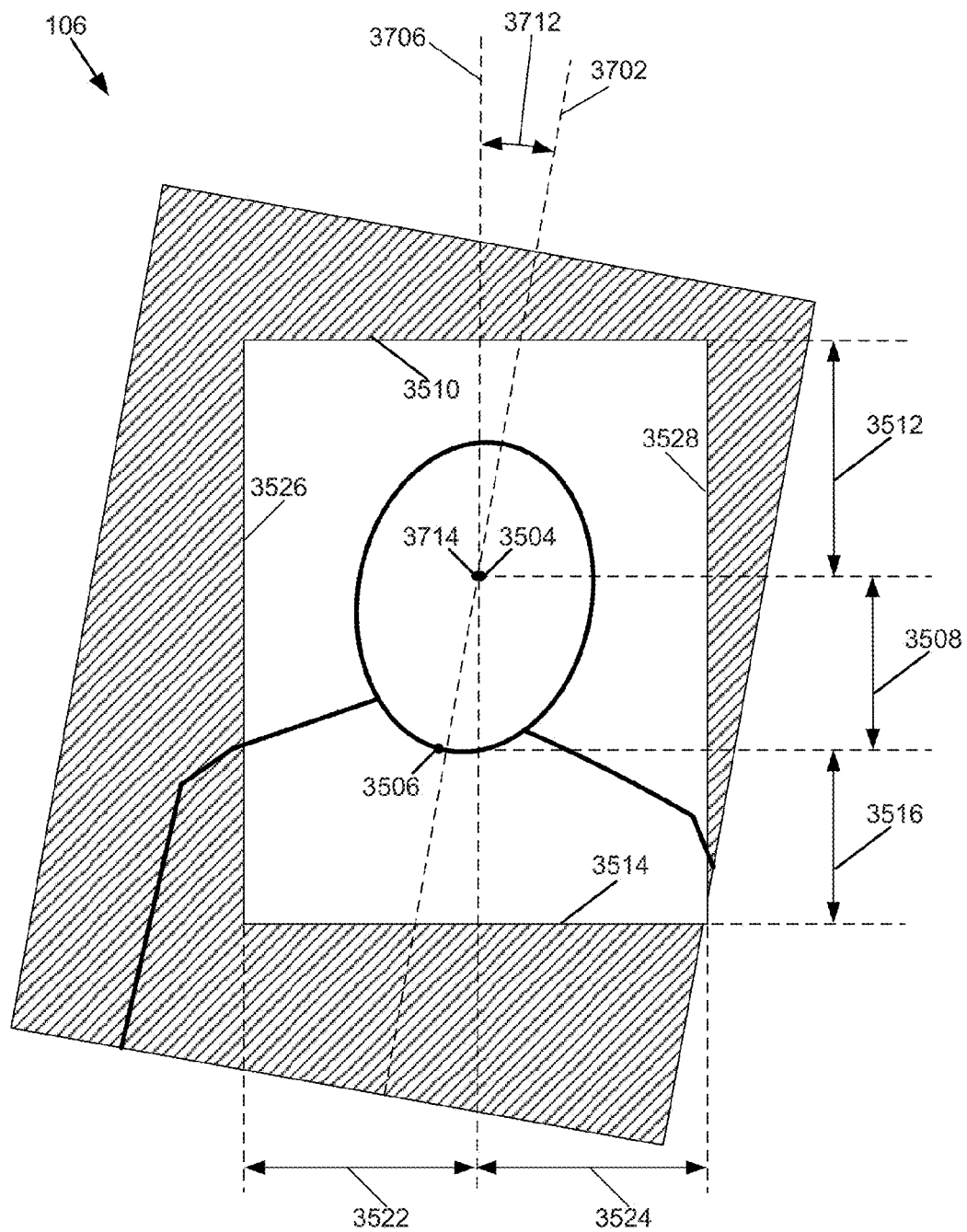
FIG. 38 further illustrates an example of the method shown in FIG. 36.

FIG. 38 illustrates an example of operation 3614, which determines the cropping locations for the cropped image to include a fixed or variable tilt angle. In this example, the cropping locations are computed based on a rotation of the original image an amount of the rotation angle 3712. The upper cropping location 3510, lower cropping location 3514, left cropping location 3526, and right cropping location 3528 are, in some embodiment, computed in the same or similar manner as described above with reference to FIGS. 34 and 35 and method 3400. For example the upper cropping distance 3512 and lower cropping distance 3516 are determined using a reference distance 3508, which are then used to determine the upper and lower cropping locations. The left and right cropping locations are then determined according to a desired aspect ratio of the image and the left and right cropping distances 3522 and 3524.

Figure 39:
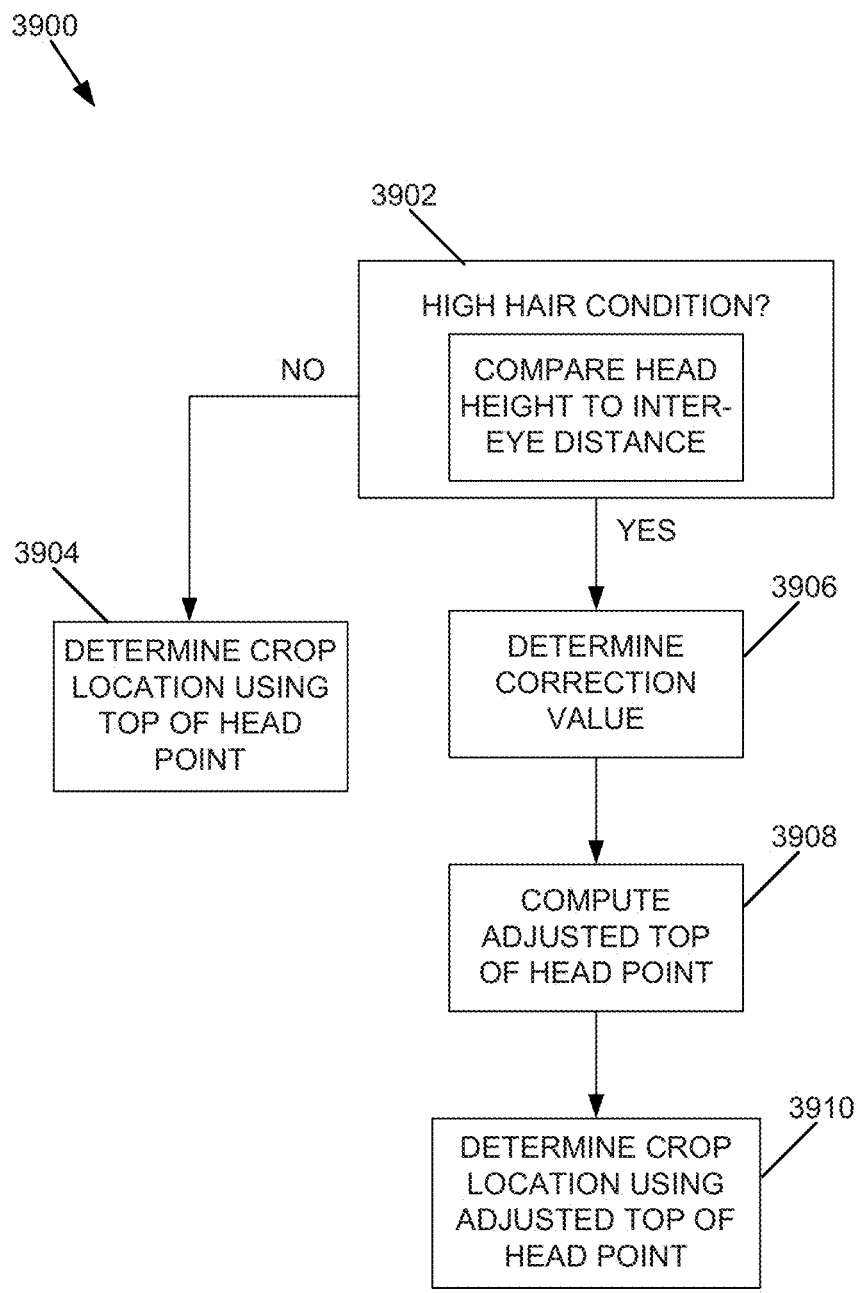
FIG. 39 is a flow chart illustrating an example method of determining cropping locations including a method of checking for a high hair condition.

FIG. 39 is a flow chart illustrating an example method 3900 of determining cropping locations, including a method of checking for a high hair condition. In this example, method 3900 includes operations 3902, 3904, 3906, and 3908.

Some embodiments utilize a method of checking for a high hair condition to adjust cropping locations in which the top of a subject's head is unusually high. For example, sometimes a subject in an image may have a tall hair style that lifts the hair high above the subject's head. At other times, a subject may be wearing a hat, scarf, or other object on the subject's head that is a distance above the actual top of the subject's head. In such cases, the head finding operations that identify a top of the head, such as previously described herein, may identify the top of the head point to be much higher than the actual top of the subject's head. Although this top of the head point can be used to define cropping locations, this point is less desirable in some situations, such as when the cropped images are to be incorporated into a composite product in which various images will be arranged in close proximity to one another. Examples of such composite products include yearbooks, picture books, and photo directories, which include a plurality of commonly sized images that are typically arranged in rows and columns.

In such products, when cropping locations are calculated based on an unusually high top of head point, the result is an image in which the subject appears smaller or more distant than others that do not have unusually high top of head points. Accordingly, the method 3900 is used in some embodiments to identify such images and to determine an adjusted top of head point. The adjusted top of head point can then be used to determine final cropping locations that will result in a final cropped image with greater uniformity to other images to be used in the same product.

The example method 3300 begins with operation 3902, which determines whether there is a high hair condition, such as by evaluating head points or other features within the digital image. In one example, operation 3902 involves comparing a head height to an inter-eye distance.

Figure 40:
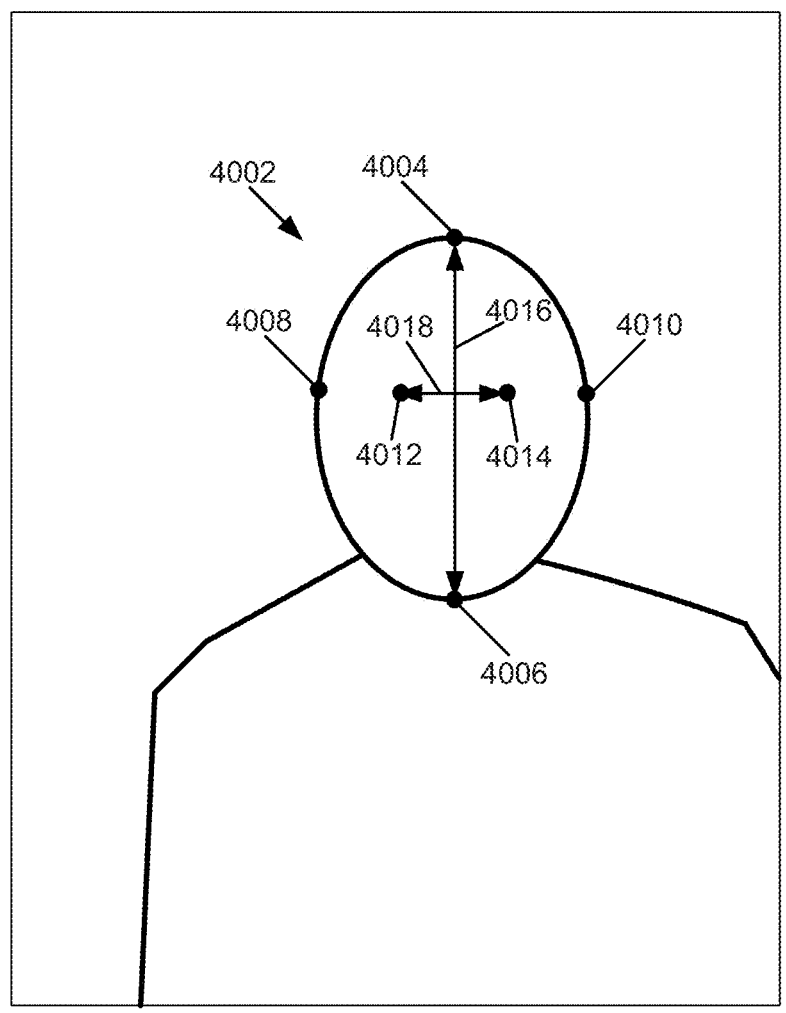
FIG. 40 illustrates an example of the method shown in FIG. 39.

An example is shown in FIG. 40, which includes an image 3500 and a subject 4002. In this example, various head points have been identified in the digital image, including top of head point 4004, chin point 4006, left side of head point 4008, right side of head point 4010, left eye point 4012, and right eye point 4014. In this example, head height 4016 is calculated as the distance between top of head point 4004 and chin point 4006. Inter-eye distance 4018 is calculated as the distance between left eye point 4012 and right eye point 4014. In other possible embodiments, other head points and distances are used.

After the head height 4016 and the inter-eye distance 4018 have been determined, the distances are measured to determine whether a high hair condition exists. In some embodiments, a high hair condition is determined by dividing the inter-eye distance 4018 by the head height 4016 to generate a high hair indicator value. The high hair indicator value is then compared to a threshold value. If the high hair indicator value is less than the threshold value, operation 3902 determines that a high hair condition exists and operations 3906, 3908, and 3910 are performed. If the high hair indicator value is greater than or equal to the threshold value, operation 3902 determines that a high hair condition is not present. In this case, operation 3904 is performed.

Operation 3904 determines the cropping locations using the previously identified head point or points, without further adjustment. An example of operation 3904 is method 3400 illustrated and described herein with reference to FIGS. 34 and 35. Another example of method 3400 is illustrated with reference to FIG. 41, in which different head points are used to define the cropping locations.

Figure 41:
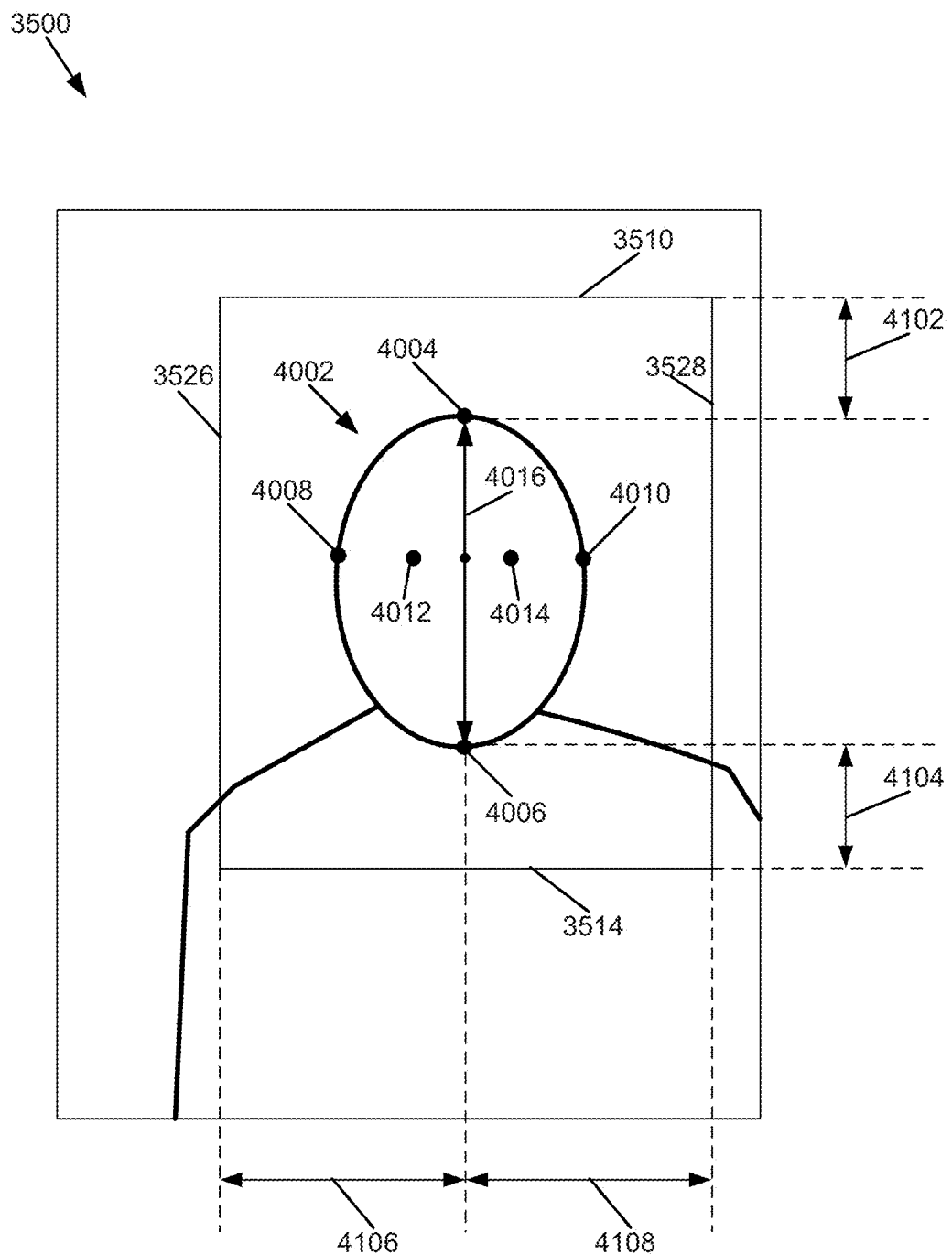
FIG. 41 further illustrates an example of the method shown in FIG. 39.

FIG. 41 includes image 3500 showing a subject 4002 having identified head points including identified top of head point 4004, chin point 4006, left side of head point 4008, right side of head point 4010, left eye point 4012, and right eye point 4014.

In this example, a reference distance is determined as the head height 4016, being the distance between the top of the head point 4004 and the chin point 4006. The upper and lower cropping distances 4102 and 4104 are then determined by multiplying the reference distance by upper and lower cropping values.

Upper cropping location 3510 is then computed as a location that is above top of head point 4004 a distance equal to upper cropping distance 4102, and the lower cropping location 3514 is computed as a location that is below chin point 4006 a distance equal to lower cropping distance 4104.

Once the upper and lower cropping locations have been determined, the left and right cropping locations are determined (as discussed above), by calculating the left and right cropping distances 4106 and identifying the locations that are to the left or the right of a center point, such as top of the head point 4004, the inter-eye center point, the chin point 4006, another head point, or another point computed using one or more head points.

Figure 42:
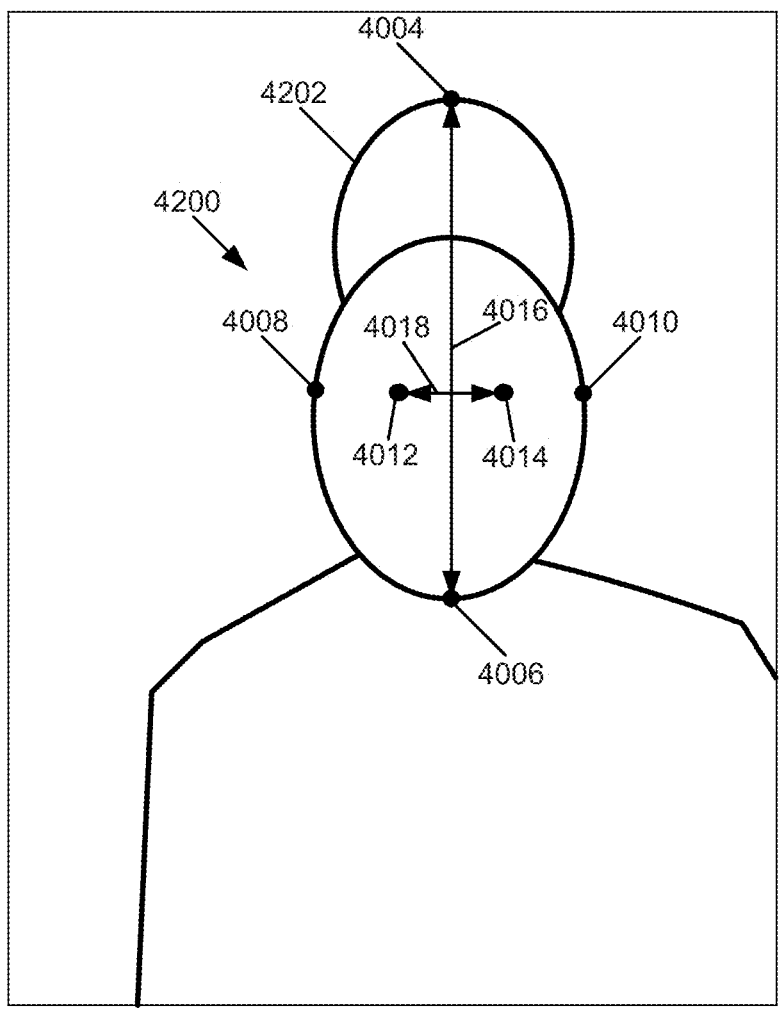
FIG. 42 further illustrates an example of the method shown in FIG. 39.

Another example of operation 3402 is described with reference to FIG. 42. In this example, image 3500 includes a subject 4200 having high hair 4202. The identified head points include top of head point 4004, chin point 4006, left side of head point 4008, right side of head point 4010, left eye point 4012, and right eye point 4014.

Operation 3402 computes the head height 4016 as the distance between the top of head point 4004 and the chin point 4006 and the inter-eye distance 4018 as the distance between left eye 4012 and right eye 4014. Then, the head height 4016 is compared to the inter-eye distance, such as by computing a high hair indicator value. In this example, because the subject 4200 has high hair 4202, the high hair indicator value is less than the threshold value. As a result, operation 3402 determines that a high hair condition exists.

Returning now to FIG. 39, if a high hair condition is determined to be present in operation 3902, operations 3906, 3908, and 3910 are performed.

Operation 3906 determines a correction value, and operation 3908 uses the correction value to compute an adjusted top of head point. The correction value is a constant calculated based on the degree of the high hair condition. As one example, the correction value is calculated using the following formula: CorrectionValue=(−6.37×HighHairindicator)+ 1.52. Other embodiments include other formulas.

In some embodiments a maximum high hair correction value is used. In this case, operation 3906 further evaluates the high hair correction value to determine if is exceeds a maximum value. If so, the high hair condition is determined to be an extreme high hair condition and the maximum high hair correction value is assigned. An example of a maximum high hair correction value is 0.7, which is assigned if the high hair indicator is greater than 0.129. Other embodiments include other values.

After the high hair correction value has been determined, an adjusted top of head point is computed in operation 3908. As one example, the vertical component of the top of the head point is computed using the following formula: AdjustedTopofHeadY=TopofHeadY+(CorrectionValue)* (EyeCenterY−TopofHeadY), where AdjustedTopofHeadY is the y-coordinate of the adjusted top of the head point, Topof- HeadY is the y-coordinate of the identified top of head point, CorrectionValue is the high hair correction value, and EyeCenterY is the y-coordinate of the inter-eye center point. In this example, the adjusted top of head point has the same x-coordinate as the identified top of head point. Other embodiments use other head points or different formulas.

Figure 43:
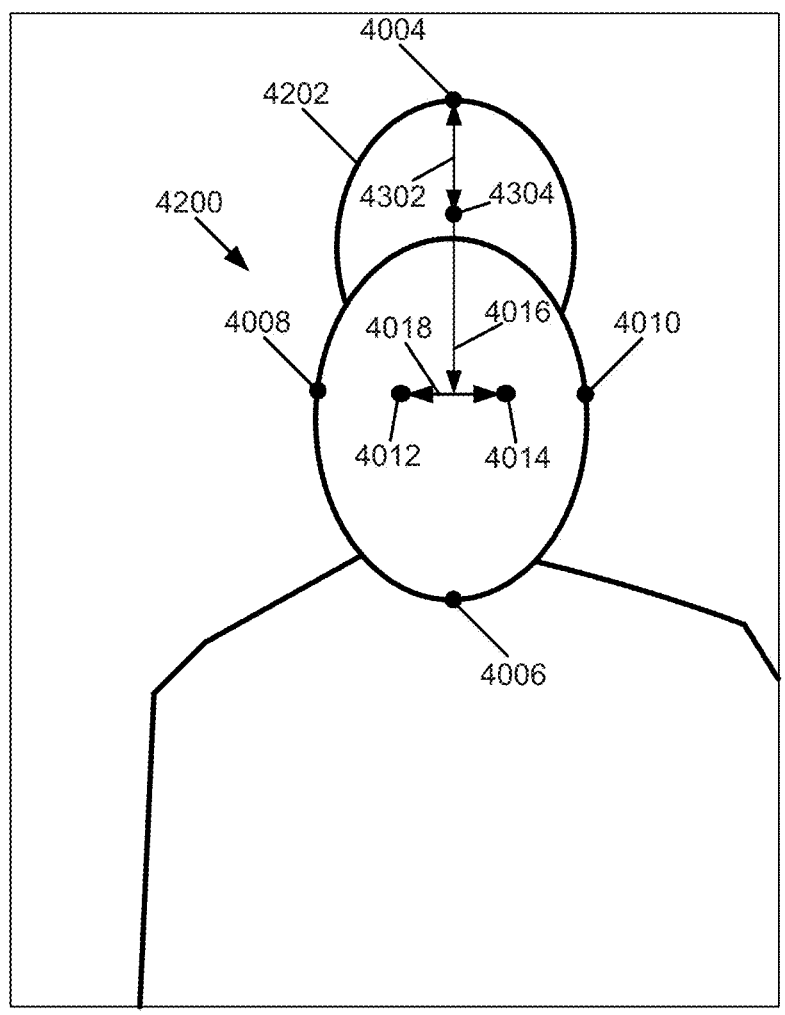
FIG. 43 further illustrates an example of the method shown in FIG. 39.

An example of an adjusted top of head point is shown in FIG. 43. In this example, operation 3906 determines that a moderate high hair condition exists, and computes the appropriate correction value. The correction value is then used in operation 3408 to calculate a correction distance 4302. The correction distance 4302 is computed by multiplying the correction value by a reference distance, such as the head height 4016 between the top of head point 4004 and the inter-eye center point. The adjusted top of head point 4304 is then determined by calculating the location that is below top of head point 4004 a distance equal to the correction distance 4302. This adjusted top of head point 4304 provides a corrected point from which cropping locations can be computed to provide, for example, a more pleasing product or a product that has improved uniformity to other images that do not have a high hair condition. In another possible embodiment, the adjusted top of head point 4304 is an estimate of the subject's actual top of head point. The adjusted top of head point 4304 need not be precisely located at the actual top of the subject's head to provide improved cropping location determinations, in some embodiments.

After the adjusted top of head point is computed, operation 3910 is performed to determine cropping locations using the adjusted top of head point. An example of operation 3910 is method 3400 illustrated and described herein with reference to FIGS. 34 and 41, except that in this embodiment the adjusted top of head point is used in place of the identified top of head point.

Figure 44:
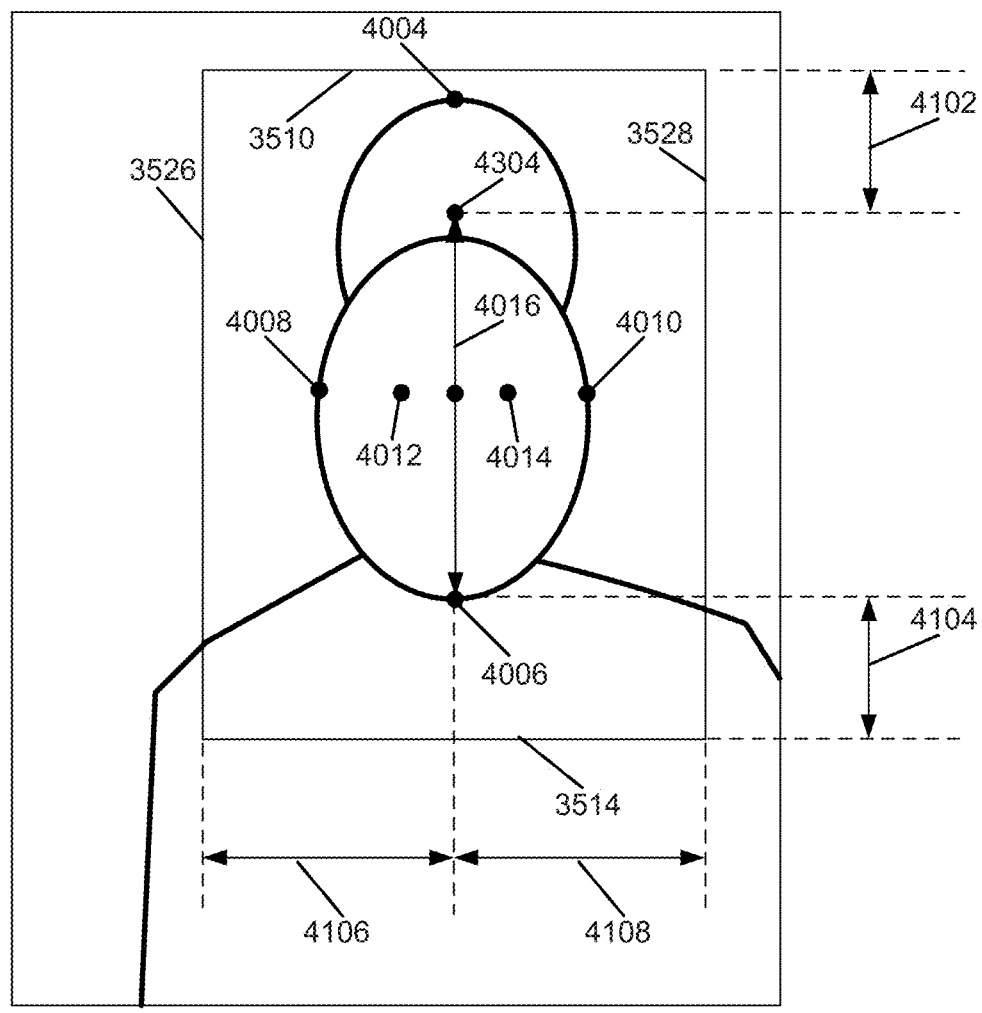
FIG. 44 further illustrates an example of the method shown in FIG. 39.

FIG. 44 illustrates another example of a method of determining cropping locations. In this example, after the adjusted top of the head point 4304 has been determined, the upper and lower cropping locations are determined. Upper and lower cropping distances are calculated by multiplying upper and lower cropping values by reference distance 4016. In this example, reference distance 4016 is the distance between adjusted top of head point 4304 and chin point 4006. Upper cropping location 3510 is then determined as the location that is a distance equal to upper cropping distance 4102 above the adjusted top of head point 4302. Lower cropping location 3514 is then determined as the location that is a distance equal to lower cropping distance 4104 below the chin point 4006. With the upper and lower cropping locations 3510 and 3514 known, the left and right cropping locations are then determined, by computing the left and right cropping distances 4106 and 4108 using reference distance 4016 as described herein.

Figure 45:
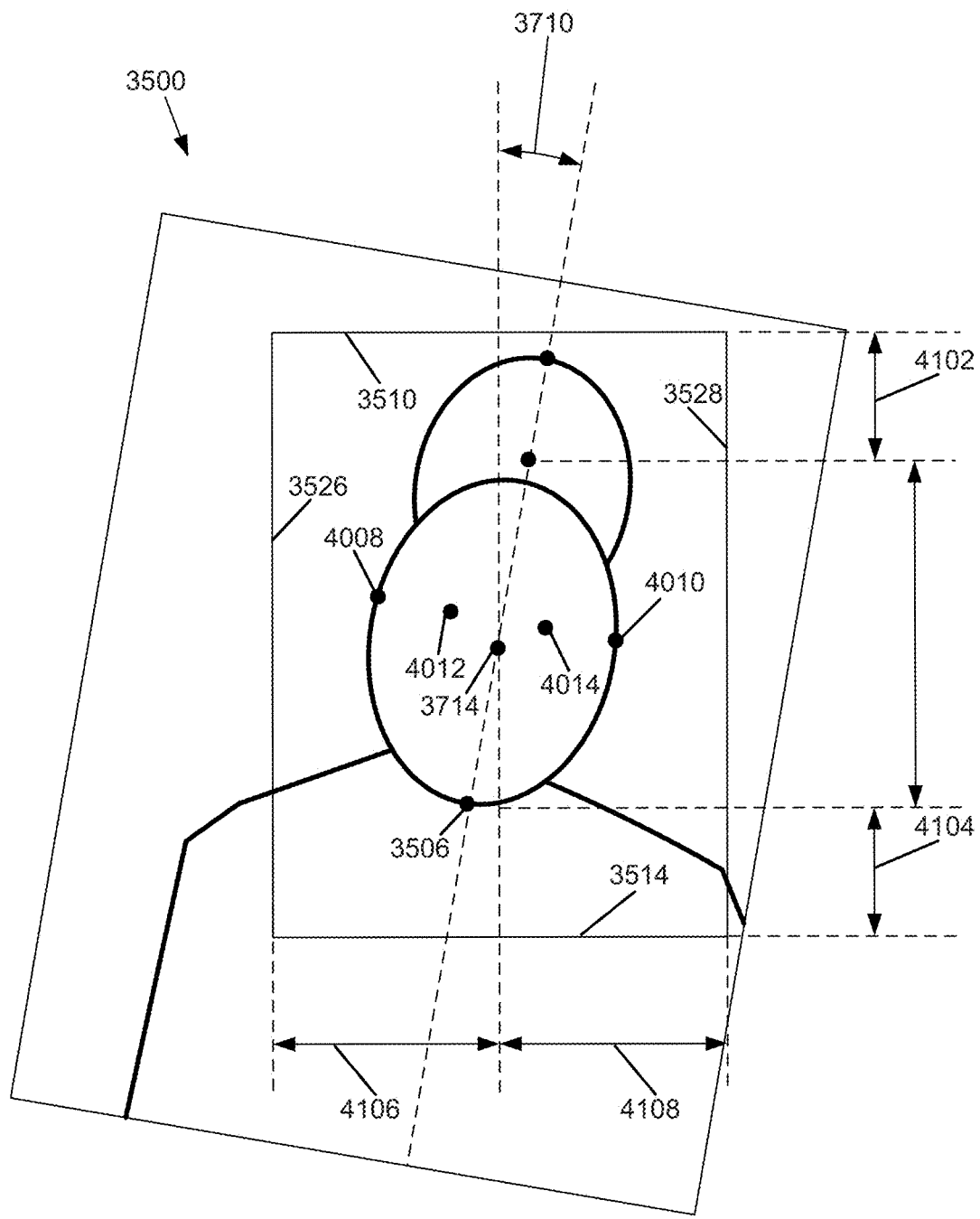
FIG. 45 illustrates an example in which cropping locations are determined using a rotation angle and the method shown in FIG. 39.

FIG. 45 illustrates another example method of determining cropping locations. The method includes a method of checking and correcting a high hair condition and also a method of adjusting a rotation angle of a cropped image.

In some embodiments, the example method combines the operations of method 3600, described herein with reference to FIG. 36, with the operations of method 3900, described herein with reference to FIG. 39. As a result, the cropping locations are computed using an adjusted top of head point if a high hair condition is detected and also computed to achieve a desired tilt angle 3710.

In some embodiments additional processing is performed to confirm that the cropping locations are properly positioned. In some embodiments, the cropping locations are evaluated to determine if the edges are outside of an active area of the original image. For example, in some embodiments a periphery of the image is considered outside of the active area and therefore cropping locations are adjusted so as to not extend beyond the active area. For example, in some embodiments the outer 5% of the original image is considered to be outside of the active area. If a cropping location falls outside of the active area, the cropping locations are adjusted to move the cropping locations to within the active area and also to maintain a desired aspect ratio of the cropped image. For example, if the right side of the image extends off of the right side of the active area of the original image, the right cropping location will be adjusted to within the active area. In some embodiments the left side is also moved an equal distance to maintain the desired aspect ratio of the cropped image. In other embodiments, the top and/or bottom cropping locations are adjusted to maintain the desired aspect ratio of the cropped image.

Further, when an original image is rotated for cropping, processing is performed in some embodiments to confirm that no portion of the cropped image extends beyond the boundaries of the rotated original image, or alternatively, extends outside of the active area of the rotated original image. If it is determined that any portion exceeds the active area or a boundary of the rotated original image, the cropping locations are adjusted to be within the active area or boundaries of the original image and to maintain the desired aspect ratio.

Further, in some embodiments original images can be oriented with either landscape orientation or portrait orientation. Therefore, in some embodiments the cropping locations and/or head points (i.e., coordinates associated with the head points) that are identified are converted from landscape to portrait, or from portrait to landscape as needed to properly identify the locations or points within the image.

Figure 46:
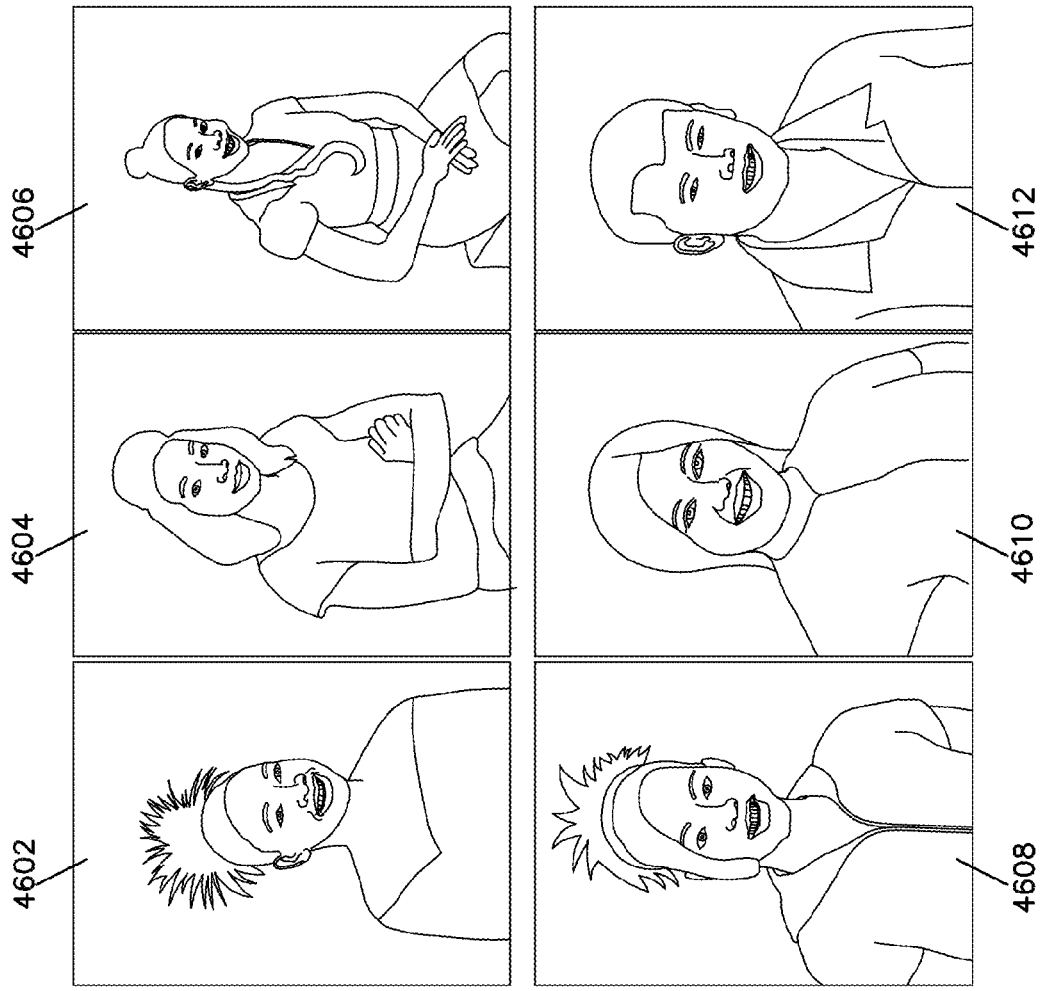
FIG. 46 illustrates several original images, such as captured by a digital camera.

FIGS. 46-49 illustrate several examples of the cropping methods described herein. FIG. 46 shows an arrangement of six original images, including images 4602, 4604, 4606, 4608, 4610, and 4612.

As seen in FIG. 46, the original images include a large amount of variability. For example, in images 4604 and 4606 the photographer had the lens zoomed out so that the complete arms of the subjects are included in the image. The other images were taken by a photographer who had zoomed in more closely. As a result, the images are not uniform.

Figure 47:
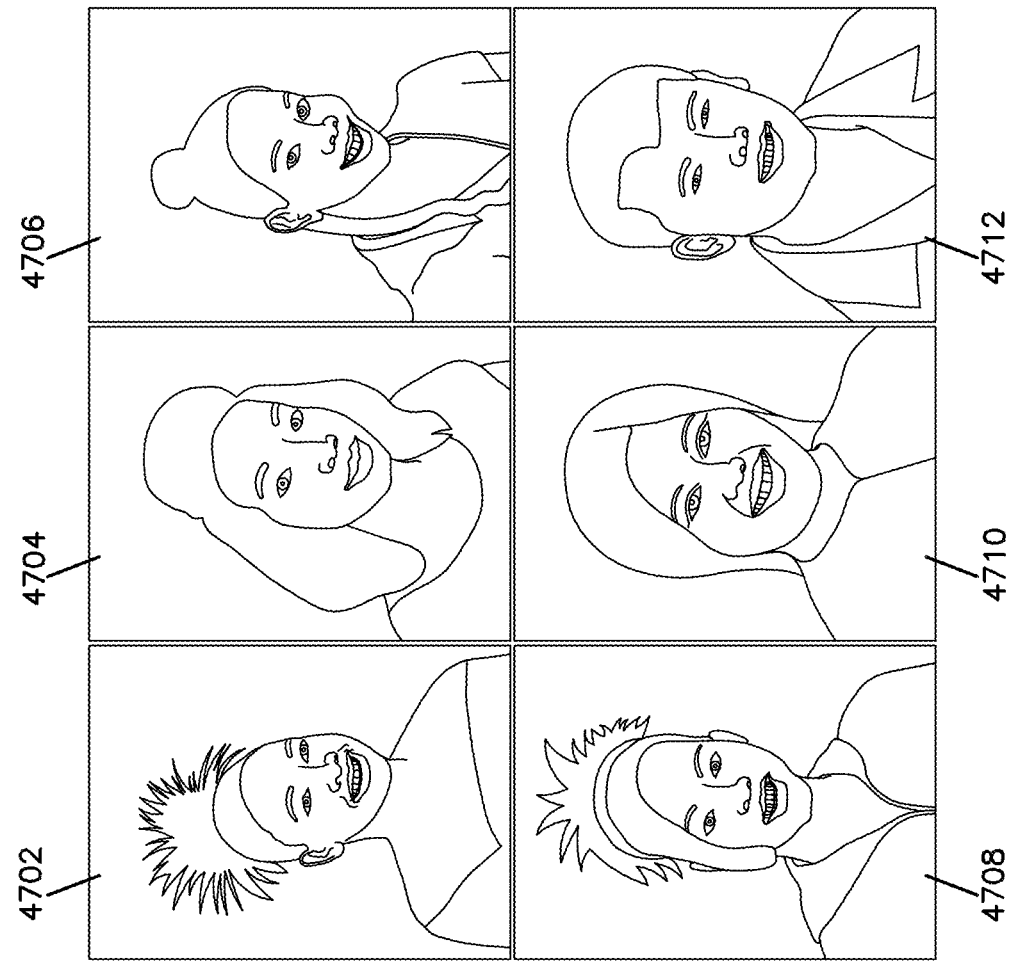
FIG. 47 illustrates an example of several final images after cropping at defined cropping locations.

FIG. 47 shows an example of the final images formed by cropping the original images at the defined cropping locations, as discussed herein. This example includes cropped images 4702, 4704, 4706, 4708, 4710, and 4712. The example shows an improvement in uniformity. For example, cropped images 4704, 4706 are now cropped to enlarge the head and shoulders and remove the remaining portions of the original image.

However, the example shown in FIG. 47 also illustrates a problem that can result if a subject has high hair. In this example, cropped images 4702, 4706, and 4708 both have high hair. As a result, the subjects in the cropped images 4702, 4706, and 4708 appear somewhat smaller and more distant than the subjects in the other cropped images.

Figure 48:
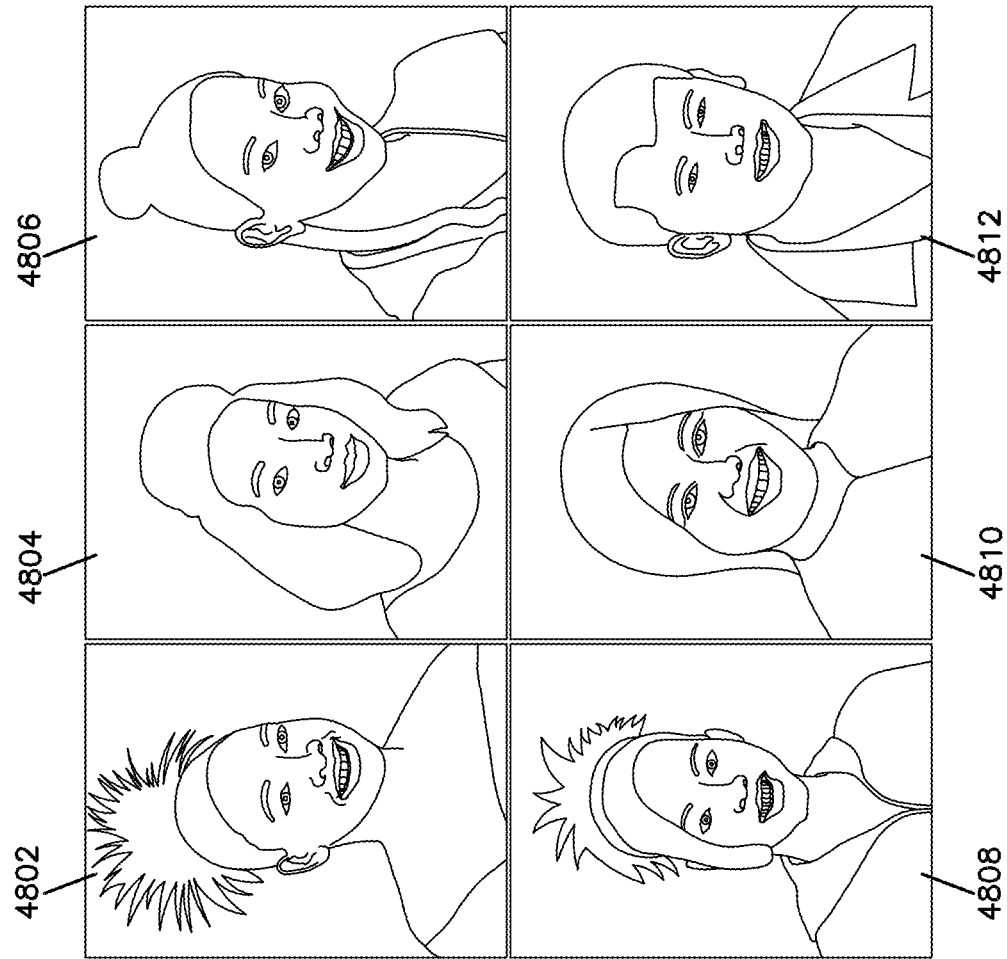
FIG. 48 illustrates another example of several final images after checking for a high hair condition and cropping at defined cropping locations.

FIG. 48 shows an example of the final images formed by cropping the original images at cropping locations defined with a high hair condition correction. This example includes cropped images 4802, 4804, 4806, 4808, 4810, and 4812. This example shows an even greater improvement in the uniformity between the cropped images. For example, the heads of the subjects in cropped images 4802 and 4806 have been enlarged to more closely match the sizes of the heads in the other images.

Figure 49:
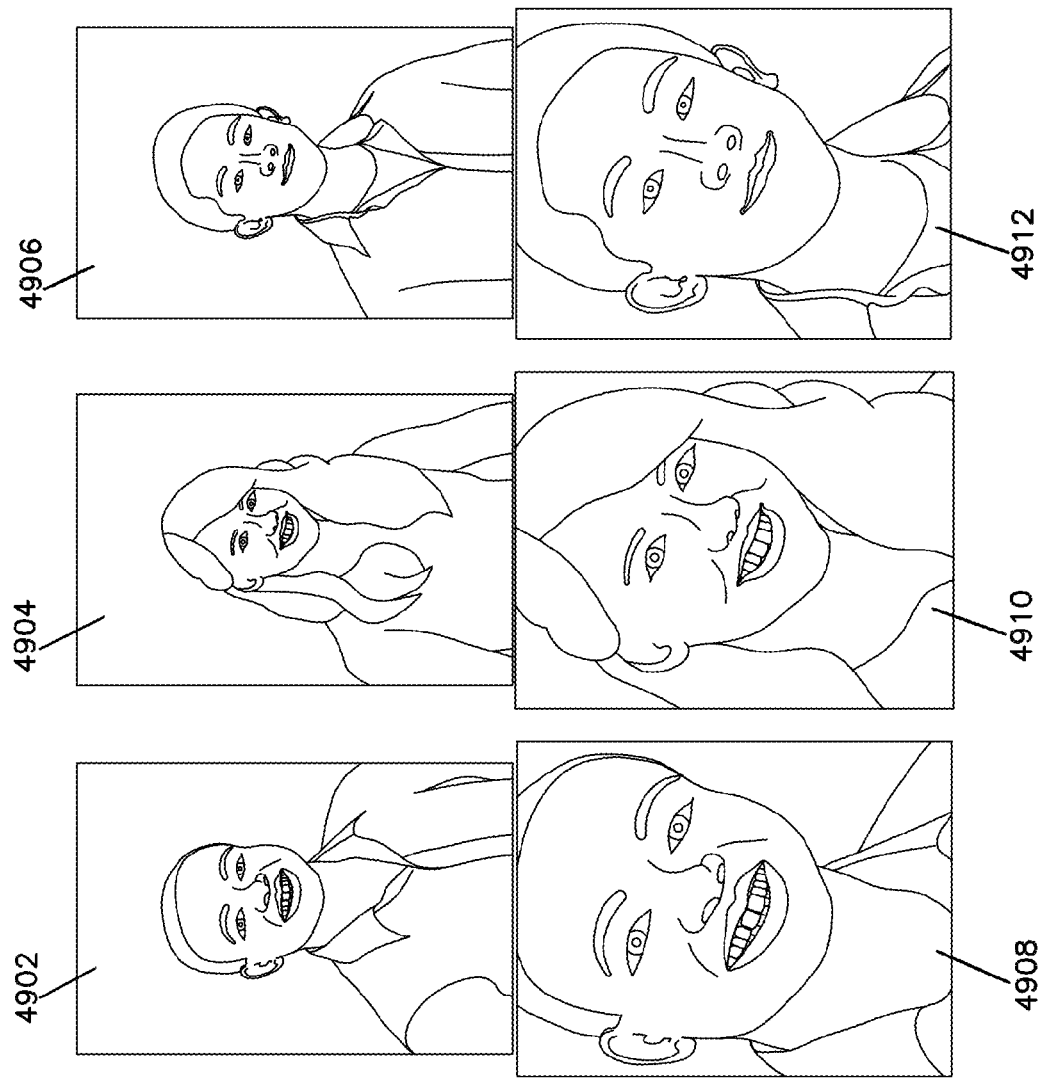
FIG. 49 illustrates another example including several original images and several final images including a desired head tilt angle.

FIG. 49 shows a comparison of a set of original images 4902, 4904, and 4906 to a set of final images 4908, 4910, and 4912 after determining cropping locations using a variable tilt processes, such as described with reference to FIG. 36. As can be seen in FIG. 49, the subjects within original images 4902, 4904, and 4906 have variable degrees of head tilt. The subject's head in image 4902 is held approximately vertically with little or no head tilt, while the subject's heads in images 4904 and 4906 are moderately tilted toward the right.

The variable tilt processing and cropping is then performed on the original images, resulting in final images 4908, 4910, and 4912 that have substantially uniform head tilts and crops. Although the subject in original image 4902 had approximately no tilt, the cropping locations are defined to adjust the subject's head tilt to about 20°. Similarly, although the subject's heads in images 4910 and 4912 already had moderate tilts, the cropping locations are also positioned to obtain head tilts of about 20°. Other embodiments generate cropping locations and final images in which the subjects have other degrees of head tilt.

Various cropping algorithms are provided below that illustrate several specific embodiments according to the present disclosure. Although specific formulas and values are provided, these details are provided by way of example only. Other embodiments include other formulas and other values other than the specific formulas and values provided below.

Following is an example algorithm for calculating cropping locations using an inter-eye center point and a chin point that utilizes a desired rotation angle, such as illustrated in FIG. 38.

EyeCenterX=EyeCenterXFraction*ImageWidth
EyeCenterY=EyeCenterYFraction*ImageHeight
ChinX=ChinXFraction*ImageWidth
ChinY=ChinYFraction*ImageHeight
$\theta_{EXPECTED}$=0°
$\theta_{HEADTILT}$=tan$^{-1}$((ChinX−EyeCenterX)/(ChinY−EyeCenterY))
$\theta_{VARIABLE}$=$\theta_{EXPECTED}$−$\theta_{HEADTILT}$
If fixed tilt $\theta_{VARIABLE}$=$\theta_{EXPECTED}$
CropAngle=$\theta_{VARIABLE}$*−1.0
Crop Sin=sin(3.1416*Crop Angle/180)
Crop Cos=cos(3.1416*Crop Angle/180)
CropCenterX=(EyeCenterX+ChinX)/2
CropCenterY=EyeCenterY
CropOffx=CropCenterX−Crop Cos*CropCenterX+Crop Sin*CropCenterY
CropOffy=CropCenterY−Crop Sin*CropCenterX−Crop Cos*CropCenterY
EyeCenterX'=Crop Cos*EyeCenterX−Crop Sin*EyeCenterY+CropOffx
EyeCenterY'=Crop Sin*EyeCenterX+Crop Cos*EyeCenterY+CropOffy
ChinX'=Crop Cos*ChinX−Crop Sin*ChinY+CropOffx
ChinY'=Crop Sin*ChinX+Crop Cos*ChinY+CropOffy
CropHeight=(ChinY'−EyeCenterY')*(1+EyeCenterCropParam+ChinCropParam)
CropWidth=Aspect*CropHeight
ULX=EyeCenterX'−CropWidth/2
ULY=EyeCenterY'−(EyeCenterCropParam*(ChinY'−EyeCenterY'))
LRX=EyeCenterX'+CropWidth/2=ULX+CropWidth
LRY=ChinY'+(ChinCropParam*(ChinY'−EyeCenterY'))
=ULY+CropHeight In the above example, the variables are as follows. EyeCenterCropParam is an upper cropping parameter based on eye position. ChinCropParam is a lower cropping parameter based on chin position. Aspect is an aspect ratio of crop height/width. EyeCenterX is an average eye x coordinate. EyeCenterY is an average eye y coordinate. ChinX is a bottom of chin x coordinate. ChinY is a bottom of chin y coordinate. ImageWidth is a width of an image. ImageHeight is a height of the image. CropWidth is a width of the cropped image. CropHeight is a height of the cropped image.

Variables used in one or more of the following examples include the following. HeadCropParam is the upper cropping parameter based on top of head position. ChinCropParam is the lower cropping parameter based on chin position. Aspect defines Aspect ratio of crop height/width. CropAngle is the angle of crop in degrees. HeadX is the top of Head X coordinate. HeadY is the top of Head Y coordinate. ChinX is the bottom of chin X coordinate. ChinY is the bottom of chin Y coordinate. LeftSideOfHeadX is the left side of head X coordinate. LeftSideOfHeadY is the left side of head Y coordinate. RightSideOfHeadX is the right side of head X coordinate. RightSideOfHeadY is the right side of head Y coordinate. CropCenterX is the center of head mass X coordinate. LeftEyeX is the left eye X coordinate. LeftEyeY is the left eye Y coordinate. RightEyeX is the right eye X coordinate. RightEyeY is the right eye Y coordinate. EyeDistX is the distance between the X coordinates of the left and right eyes. ImageWidth is the width of the original image. ImageHeight is the height of the original image. CropWidth is the width of the cropped image. CropHeight is the height of cropped image. HighHairindicator indicates if subject has high hair and its severity. HighHairMultiplier is the top of head multiplier for subjects with high hair. AdaptiveHeadY is the top of head value that is modified for subjects with high hair. ULX is the upper left X cropping coordinate. ULY is the upper left Y cropping coordinate. LRX is the lower right X cropping coordinate. LRY is the lower right Y cropping coordinate.

Following is an algorithm that is used in some embodiments to convert head point fractional values to coordinates of an original image.

HeadX=HeadXFraction*ImageWidth
HeadY=HeadYFraction*ImageHeight
ChinX=ChinXFraction*ImageWidth
ChinY=ChinYFraction*ImageHeight
LeftSideOfHeadX=LeftSideOfHeadXFraction*ImageWidth
LeftSideOfHeadY=LeftSideOfHeadYFraction*ImageHeight
RightSideOfHeadX=RightSideOfHeadXFraction*ImageWidth
RightSideOfHeadY=RightSideOfHeadYFraction*ImageHeight In some embodiments, identifications of head points are done or corrected manually, as discussed herein. In some embodiments where manual correction is performed, the sides of the head points are not available. When the sides of the head points are not available, the horizontal center of the crop (CropCenterX) is found by the top of head point horizontal value, which is then used in one or more of the methods, operations, or algorithms described herein.

Following is an algorithm that is used in some embodiments to calculate cropping coordinates without a rotation angle.

CropCenterX=(LeftSideOfHeadX+RightSideOfHeadX)/2
ULy=HeadY−HeadCropParam*(ChinY−HeadY)
LRy=ChinY+ChinCropParam*(ChinY−HeadY)
CropHeight=(ChinY−HeadY)*(1+HeadCropParam+ChinCropParam)
CropWidth=Aspect*CropHeight
ULx=LeftSideOfHeadX+(RightSideOfHeadX−LeftSideOfHeadX)/2−CropWidth/2
LRx=ULx+CropWidth
CropCenterY=(ULy+LRy)/2
URx=LRx URy=ULy
LLx=ULx
LLy=LRy The following is an algorithm that is used in some embodiments to calculate cropping coordinates without a rotation angle but including a high hair correction.

CropCenterX=(LeftSideOfHeadX+RightSideOfHeadX)/2
HighHairindicator=(RightEyeX−LeftEyeX)/(ChinY−HeadY)
If (HighHairindicator<0.129) then
   HighHairMultiplier=0.7
If (0.129≦HighHairindicator<0.239
   HighHairMultiplier=(−6.37*HighHairindicator)+1.52
Else
   HighHairMultiplier=0.0
AdaptiveHeadY=HeadY+(HighHairMultiplier*(EyeCenterY−HeadY))
ULy=AdaptiveHeadY−HeadCropParam*(ChinY−AdaptiveHeadY)
LRy=ChinY+ChinCropParam*(ChinY−AdaptiveHeadY)
CropHeight=(ChinY−AdaptiveHeadY)*(1+HeadCropParam+ChinCropParam)
CropWidth=Aspect*CropHeight
ULx=LeftSideOfHeadX+(RightSideOfHeadX−LeftSideOfHeadX)/2−CropWidth/2
LRx=ULx+CropWidth
CropCenterY=(ULy+LRy)/2
URx=LRx
URy=ULy
LLx=ULx
LLy=LRy The following is an algorithm that is used in some embodiments to calculate cropping coordinates with a rotation angle. In this example, $\theta_{EXPECTED}$ is the desired final angle (i.e., a fixed value), $\theta_{HEADTILT}$ is a calculated posing angle of subject's head, and $\theta_{VARIABLE}$ is an angle of additional rotation needed to achieve the expected angle.

$\theta_{HEADTILT}$=tan$^{-1}$((ChinX−EyeCenterX)/(ChinY−EyeCenterY))
if variable tilt, then $\theta_{VARIABLE}$=$\theta_{EXPECTED}$−$\theta_{HEADTILT}$
If fixed tilt, then $\theta_{VARIABLE}$=$\theta_{EXPECTED}$
CropAngle=$\theta_{VARIABLE}$*−1.0
Crop Sin=sin(3.1416*Crop Angle/180)
Crop Cos=cos(3.1416*Crop Angle/180)
CropCenterX=(LeftSideOfHeadX+RightSideOfHeadX)/2
CropCenterY=(ULy+LRy)/2
CropOffx=CropCenterX−Crop Cos*CropCenterX+Crop Sin*CropCenterY
CropOffy=CropCenterY−Crop Sin*CropCenterX−Crop Cos*CropCenterY
HeadX'=Crop Cos*HeadX−Crop Sin*HeadY+CropOffx
HeadY'=Crop Sin*HeadX+Crop Cos*HeadY+CropOffy
ChinX'=Crop Cos*ChinX−Crop Sin*ChinY+CropOffx
ChinY'=Crop Sin*ChinX+Crop Cos*ChinY+CropOffy
LeftSideOfHeadX'=Crop Cos*LeftSideOfHeadX−Crop Sin*LeftSideOfHeadY+CropOffx
LeftSideOfHeadY'=Crop Sin*LeftSideOfHeadX+Crop cos*LeftSideOfHeadY+CropOffy
RightSideOfHeadX'=Crop Cos*RightSideOfHeadX−Crop Sin*RightSideOfHeadY+CropOffx
RightSideOfHeadY'=Crop Sin*RightSideOfHeadX+Crop cos*RightSideOfHeadY+CropOffy The following is an algorithm that is used in some embodiments to recalculate cropping coordinates after a rotation angle is applied.

ULy=HeadY'−HeadCropParam*(ChinY'−HeadY')
LRy=ChinY'+ChinCropParam*(ChinY'−HeadY')
CropHeight=(ChinY'−HeadY')*(1+HeadCropParam+ChinCropParam)
CropWidth=Aspect*CropHeight
ULx=LeftSideOfHeadX'+(RightSideOfHeadX'−LeftSideOfHeadX')/2−CropWidth/2
LRx=ULx+CropWidth
URx=LRx
URy=ULy
LLx=ULx
LLy=LRy Following are several algorithms that are used in some embodiments to calculate cropping coordinates based on three head points, such as the top center of the head, bottom center of the chin, and the point between the eyes. This is used, for example, when manual correction of an image is performed, as discussed herein, such that other head points may not be available.

The following is an algorithm that is used in some embodiments to calculate cropping coordinates without a rotation angle.

CropCenterX=HeadX
ULy=HeadY−HeadCropParam*(ChinY−HeadY)
LRy=ChinY+ChinCropParam*(ChinY−HeadY)
CropHeight=(ChinY−HeadY)*(1+HeadCropParam+ChinCropParam)
CropWidth=Aspect*CropHeight
ULx=HeadX−CropWidth/2
LRx=ULx+CropWidth
CropCenterY=(ULy+LRy)/2
URx=LRx
URy=ULy
LLx=ULx
LLy=LRy The following is an algorithm that is used in some embodiments to calculate cropping coordinates without a rotation angle but including a high hair correction.

CropCenterX=HeadX
EyeChinDist=sqrt((ChinX−EyeCenterX)^2+(ChinY−EyeCenterY)^2)
If |EyeCenterX−((RightEyeX+LeftEyeX)/2)|≦0.15*EyeChinDist && EyeCenterX> LeftEyeX && EyeCenterX<RightEyeX
   EyeDistX=RightEyeX−LeftEyeX
Else
   EyeDistX=0.60*EyeChinDist*1.15
HighHairindicator=EyeDistX/(ChinY−HeadY)
If (HighHairindicator<0.129) then
   HighHairMultiplier=0.7
If (0.129≦HighHairindicator<0.239) then
   HighHairMultiplier=(−6.37*HighHairindicator)+1.52
Else
   HighHairMultiplier=0.0
AdaptiveHeadY=HeadY+(HighHairMultiplier*(EyeCenterY−HeadY))
ULy=AdaptiveHeadY−HeadCropParam*(ChinY−AdaptiveHeadY)
LRy=ChinY+ChinCropParam*(ChinY−AdaptiveHeadY)
CropHeight=(ChinY−AdaptiveHeadY)*(1+HeadCropParam+ChinCropParam)
CropWidth=Aspect*CropHeight
ULx=HeadX−CropWidth/2
LRx=ULx+CropWidth
CropCenterY=(ULy+LRy)/2
URx=LRx
URy=ULy LLx=ULx
LLy=LRy The following is an algorithm that is used in some embodiments to calculate cropping coordinates with a rotation angle. In this example, HeadMassCtrX is the horizontal center of head mass for manual head finding when tilt required, and HeadMassCtrY is the vertical center of head mass for manual head finding when tilt required.

HeadMassCtrX=HeadX
HeadMassCtrY=EyeCenterY
$\theta_{HEADTILT}$=tan$^{-1}$((ChinX−EyeCenterX)/(ChinY−EyeCenterY))
$\theta_{VARIABLE}$=$\theta_{EXPECTED}$−$\theta_{HEADTILT}$
If fixed tilt $\theta_{VARIABLE}$−$\theta_{EXPECTED}$
CropAngle=$\theta_{VARIABLE}$*−1.0
Crop Sin=sin(3.1416*Crop Angle/180)
Crop Cos=cos(3.1416*Crop Angle/180)
CropCenterX=HeadX
CropCenterY=(ULy+LRy)/2
CropOffx=CropCenterX−Crop Cos*CropCenterX+Crop Sin*CropCenterY
CropOffy=CropCenterY−Crop Sin*CropCenterX−Crop Cos*CropCenterY
HeadX'=Crop Cos*HeadX−Crop Sin*HeadY+CropOffx
HeadY'=Crop Sin*HeadX+Crop cos*HeadY+CropOffy
ChinX'=Crop Cos*ChinX−Crop Sin*ChinY+CropOffx
ChinY'=Crop Sin*ChinX+Crop cos*ChinY+CropOffy
HeadMassCtrX'=Crop Cos*HeadMassCtrX−Crop Sin*HeadMassCtrY+CropOffx
HeadYMassCtrY'=Crop Sin*HeadMassCtrX+Crop cos*HeadMassCtrY+CropOffy The following is an algorithm that is used in some embodiments to recalculate cropping coordinates after a rotation angle is applied.

ULy=HeadY'−HeadCropParam*(ChinY'−HeadY')
LRy=ChinY'+ChinCropParam*(ChinY'−HeadY')
CropHeight=(ChinY'−HeadY')*(1+HeadCropParam+ChinCropParam)
CropWidth=Aspect*CropHeight
ULx=HeadMassCtrX'−CropWidth/2
LRx=ULx+CropWidth
URx=LRx
URy=ULy
LLx=ULx
LLy=LRy Following are several algorithms that are used in some embodiments to check whether the cropping locations have exceeded the active area of an image, and if so, to adjust the cropping locations to be within the active area. In this example, ImageWidth is the width of the original image, ImageHeight is the height of the original image, ImageOrientation is the image orientation in terms of an angle from 0° to 360°, IULy Fraction is the fractional value of the active area upper left Y coordinate, IULx Fraction is the fractional value of the active area upper left X coordinate, ILRx Fraction is the fractional value of the active area upper left coordinate, ILRx Fraction is the fractional value of the active area upper left coordinate, IULx is the Active area upper left X coordinate, IULy is the Active area upper left Y coordinate, ILRx is the Active area lower right X coordinate, and ILRy is the Active area lower right Y coordinate.

The following computes the limits of the active area in the image if no rotation angle is applied.

If (ImageOrientation=0° or ImageOrientation=180°) then
IULx=IULx Fraction*ImageWidth
IULy=IULy Fraction*ImageHeight
ILRx=ILRx Fraction*ImageWidth
ILRy=ILRy Fraction*ImageHeight
IURx=ILRx
IURy=IULy
ILLx=IULx
ILLy=ILRy
If (ImageOrientation=90° or ImageOrientation=270°) then
IULx=IULy Fraction*ImageHeight
IULy=IULx Fraction*ImageWidth
ILRx=ILRy Fraction*ImageHeight
ILRy=ILRx Fraction*ImageWidth
IURx=ILRx
IURy=IULy
ILLx=IULx
ILLy=ILRy The following computes the limits of the active area in the image if a rotation angle is applied.

CropOffx=CropCenterX−Crop Cos*CropCenterX+Crop Sin*CropCenterY
CropOffy=CropCenterY−Crop Sin*CropCenterX−Crop Cos*CropCenterY
IULx'=Crop Cos*IULx−Crop Sin*IULy+CropOffx
IULy'=Crop Sin*IULx+Crop cos*IULy+CropOffy
ILRx'=Crop Cos*ILRx−Crop Sin*ILRy+CropOffx
ILRy'=Crop Sin*ILRx+Crop cos*ILRy+CropOffy
IURx'=Crop Cos*IURx−Crop Sin*IURy+CropOffx
IURy'=Crop Sin*IURx+Crop cos*IURy+CropOffy
ILLx'=Crop Cos*ILLx−Crop Sin*ILLy+CropOffx
ILLy'=Crop Sin*ILLx+Crop cos*ILLy+CropOffy The following algorithms are used for testing the active area if a tilt angle is greater than or equal to 0°.

The following evaluates the top line.
Slope1=(IURy−IULy)/(IURx−IULx)
Intercept)=IURy−Slope1*IURx
yLimit=Slope1*URx+Intercept1
if (URy<yLimit) then
CropHeight=LLy−ULy
URy=yLimit
ULy=URy
LLy=URy+CropHeight
LRy=LLy The following tests the left line.
If (ILLx=IULx) then
xLimit=IULx
else
Slope2=(ILLy−IULy)/(ILLx−IULx)
Intercept2=ILLy−Slope2*ILLx
xLimit=(ULy−Intercept2)/Slope2
if (ULx<xLimit) then
ULx=xLimit
CropWidth=URx−ULx
CropHeight=CropWidth/Aspect
LLx=ULx
LLy=ULy+CropHeight
LRx=URx
LRy=LLy The following tests the bottom line.
Slope3=(ILRy−ILLy)/(ILRx−ILLx)
Intercept3=ILLy−Slope3*ILLx
yLimit=Slope3*LLx+Intercept3
If (LLy>yLimit) then
LLy=yLimit
LRy=LLy
CropHeight=LLy−ULy
CropWidth=CropHeight*Aspect
URx=LRx The following tests the right line.

```
If (ILRx=IURx)
    xLimit=ILRx
Else
    Slope4=(ILRy-IURy)/(ILRx-IURx)
    Intercept4=ILRy-Slope4*ILRx
    xLimit=(LRy-Intercept4)/Slope4
if (LRx>xLimit) then
    LRx=xLimit
    URx=LRx
    LRy=LLy
    The following confirms the aspect ratio and corrects as
necessary.
    CurrentAspect=(LRx-ULx)/(LRy-ULy)
If (CurrentAspect>Aspect)
    CropWidthExpected=(LRy-ULy)*Aspect
    CropWidth=LRx-ULx
    ULx'=ULx-(CropWidthExpected-CropWidth)/2
    LRx'=ULx'+CropWidthExpected
    CropWidth=CropWidthExpected
If (CurrentAspect<Aspect)
    CropHeightExpected=(LRx-ULx)/Aspect
    CropHeight=LRy-ULy
    ULy'=ULy-(CropHeightExpected-CropHeight)/2
    LRx'=ULy'+CropHeightExpected
    CropHeight=CropHeightExpected
    The following algorithms are used for testing the active
area if a tilt angle is less than 0°.
    The following evaluates the top line.
Slope1=(IURy-IULy)/(IURx-IULx)
Intercept)=IURy-Slope1*IURx
yLimit=Slope1*ULx+Intercept1
if (ULy<yLimit) then
CropHeight=LLy-ULy
URy=yLimit
ULy=URy
LLy=URy+CropHeight
LRy=LLy
    The following tests the left line.
    If (ILRx=IURx) then
        xLimit=ILRx
    Else
        Slope2=(ILRIy-IURy)/(ILRx-IURx)
        Intercept2=ILRy-Slope2*ILRx
        xLimit=(URy-Intercept2)/Slope2
    if (URx>xLimit) then
        URx=xLimit
        CropWidth=URx-ULx
CropHeight=CropWidth/Aspect
    URx=ULx+CropWidth
LLx=ULx
LLy=ULy+CropHeight
LRx=URx
LRy=LLy
    The following tests the bottom line.
Slope3=(ILRy-ILLy)/(ILRx-ILLx)
Intercept3=ILLy-Slope3*ILLx
yLimit=Slope3*LRx+Intercept3
If (LRy>yLimit) then
    LRy=yLimit
    LLy=LRy
    CropHeight=LRy-URy
    CropWidth=CropHeight*Aspect
    ULx=LLx
    The following tests the left line.
If (ILLx=IULx) then
    xLimit=IULx
Else
    Slope4=(ILLy-IULy)/(ILLx-IULx)
    Intercept4=ILLy-Slope4*ILLx
    xLimit=(LLy-Intercept4)/Slope4
if (LLx<xLimit) then
    LLx=xLimit
    ULx=LLx
    LRy=LLy
    The following confirms the aspect ratio and corrects as
necessary.
    CurrentAspect=(LRx-ULx)/(LRy-ULy)
If (CurrentAspect>Aspect)
    CropWidthExpected=(LRy-ULy)*Aspect
    CropWidth=LRx-ULx
    ULx=CropCenterX-(CropWidthExpected/2)
    If (ULx<IULx)
        ULx'=IULx
    If (ULx+CropWidthExpected>ILRx)
        ULx=ILRx-CropWidthExpected
    LRx=ULx+CropWidthExpected
    LRy=ULy+CropWidthExpected/Aspect
    CropWidth=CropWidthExpected
If (CurrentAspect<Aspect)
    CropHeightExpected=(LRx-ULx)/Aspect
    CropHeight=LRy-ULy
    ULy=CropCenterY-(CropHeightExpected/2)
    If (ULy<IULy)
        ULy=IULy
    If (ULy+CropHeightExpected>ILRy)
        ULy=ILRy-CropHeightExpected
    LRx=ULx+CropHeightExpected*Aspect
    LRy=ULy+CropHeightExpected
    CropHeight=CropHeightExpected
    The following algorithms address various possible image
orientations and provide the necessary image rotation to
ensure that horizontally shot images are properly cropped. In
this example, all images are stored in portrait view; as such
the image width and height are always passed in accordingly.
    OrigImageWidth=ImageWidth
    OrigImageHeight=ImageHeight
If (ImageOrientation=90) then
    ImageHeight=OrigImageWidth
    ImageWidth=OrigImageHeight
    NewULX=OrgImageWidth-ULY-CropHeight
    NewULY=ULX
    NewLRX=NewULX+CropHeight
    NewLRY=NewULY+CropWidth
If (ImageOrientation=270) then
    ImageHeight=OrigImageWidth
    ImageWidth=OrigImageHeight
    NewULX=ULY
    NewULY=ImageWidth-LRX
    NewLRX=NewULX+CropHeight
    NewLRY=NewULY+CropWidth
If (ImageOrientation=180) then
    NewULX=ImageWidth-LRX
    NewULY=ImageHeight-LRY
    NewLRX=NewULX+CropWidth
    NewLRY=NewULY+CropHeight
If (ImageOrientation=0) then
    NewULX=ULX
    NewULY=ULY
    NewLRX=LRX
    NewLRY=LRY
ULX=NewULX
ULY=NewULY
LRX=NewLRX
LRY=NewLRY
```

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An image processing system comprising:
   a processing device; and
   a memory device, the memory device storing instructions that, when executed by the processor, cause the processor to:
   analyze a digital image and locate of head points of a subject in the digital image;
   evaluate the head points by performing a geometry test to evaluate a geometry of the head points;
   assign a confidence level based on the evaluation of the head points; and
   when the confidence level is less than a threshold value, initiate a review of at least one of the head points in the digital image, wherein the plurality of head points include an identified top of head point and an adjusted top of head point, wherein the adjusted top of head point is computed as being a distance below the identified top of head point.

2. The image processing system of claim 1, wherein the confidence level is assigned to the digital image, wherein the confidence level is associated with a probability that the head points are correctly identified.

3. The image processing system of claim 2, wherein when initiating a review of the at least one of the head points, the processor is further caused to:
   display to a user the digital image and, if at least one of the head points is incorrect, receive an input identifying a corrected location for the at least one head point.

4. The image processing system of claim 1, wherein the geometry test causes the processor to:
   compute a reference distance between at least two of the head points other than the first head point;
   determine a first distance between the first head point and another of the plurality of head points; and
   compare the first distance with the reference distance.

5. The image processing system of claim 1, wherein to assign the confidence level, the processor is further caused to:
   determine if any of the plurality of head points have a low confidence level using a threshold value, and if so, setting the confidence level to the low confidence level.

6. The image processing system of claim 1, wherein the processor is further caused to: define cropping locations for the digital image using at least one of the head points.

7. The image processing system of claim 6, wherein the processor is further caused to: store cropping locations in memory and associate the cropping locations with the digital image for subsequent generation of at least one cropped digital image using the cropping locations.

8. A method of cropping a digital image, the method comprising:
   identifying within the digital image a first point, the first point representing a top of a subject's head within the digital image;
   performing a head geometry test, with a computing device, to determine whether the subject has a high hair condition using at least the first point;
   computing an adjusted top of head point when determined that the subject has a high hair condition; and
   determining a cropping location using the adjusted top of head point when determined that the subject has a high hair condition, wherein determining whether the subject has a high hair condition comprises:
   comparing a head height to a distance between eye center points;
   determining whether a difference between the head height and the distance between the eye center points exceeds a threshold difference; and
   if the difference exceeds the threshold difference, determining that the high hair condition is present.

9. The method of claim 8, wherein the adjusted top of head point is computed as a point that is a distance below the first point.

10. The method of claim 9, wherein the distance is equal to a multiple of a reference distance in the digital image.

11. The method of claim 10, wherein the reference distance is selected from the group comprising a distance between eye centerpoints, a distance between left and right sides of the subject's head, and a distance between an inter-eye center point and a chin point.

12. The method of claim 8, further comprising determining the cropping location using the first point when determined that the subject does not have the high hair condition.

13. The method of claim 8, further comprising:
    identifying a chin point in the digital image; and
    determining a second cropping location using the chin point.

14. A method of checking a location of a first head point identified within a digital image including a plurality of head points, the method comprising:
    determining, with a computing device, a reference distance as a distance between two of the plurality of head points, other than the first head point;
    determining, with the computing device, a first distance between the first head point and one of the plurality of head points; and
    comparing the first distance with the reference distance to evaluate an accuracy of the location of the first head point, and
    determining that a high hair condition is present when a difference between the first distance and the reference distance exceeds a threshold.

15. The method of claim 14, wherein the first head point is selected from the group consisting of a top of head point, a left side of head point, a right side of head point, and a bottom of chin point.

16. The method of claim 14, wherein the reference distance is a distance between a left eye center point and a right eye center point.

17. The method of claim 15, wherein the first distance is a distance between the bottom of chin point and an inter-eye center point.

18. A method of evaluating a digital image, the method comprising:
    identifying within the digital image a first point, the first point representing a top of a subject's head within the digital image; and
    determining, with a computing device, whether the subject has a high hair condition using at least the first point by:
    comparing a head height to a distance between eye center points;
    determining whether a difference between the head height and the distance between the eye center points exceeds a threshold difference; and
    if the difference exceeds the threshold difference, determining that the high hair condition is present.

19. The method of claim 18, wherein if the high hair condition is present, computing an adjusted top of head point.

20. The method of claim 18, wherein the adjusted top of head point is computed as a point that is a distance below the first point.

21. The method of claim 20, wherein the distance is equal to a multiple of a reference distance in the digital image.

22. The method of claim 21, wherein the reference distance is selected from the group comprising a distance between eye centerpoints, a distance between left and right sides of the subject's head, and a distance between an inter-eye center point and a chin point.

* * * * *

UNITED STATES PATENT AND TRADEMARK OFFICE
CERTIFICATE OF CORRECTION

PATENT NO. : 8,498,453 B1  Page 1 of 2
APPLICATION NO. : 12/570803
DATED : July 30, 2013
INVENTOR(S) : Benson et al.

It is certified that error appears in the above-identified patent and that said Letters Patent is hereby corrected as shown below:

In the Specification

Col. 37, line 45: "Crop   Cos*" should read --CropCos*--

Col. 37, line 47: "Crop   Sin*" should read --CropSin*--

Col. 37, line 49: "Crop   Cos*" should read --CropCos*--

Col. 37, line 51: "Crop   Sin*" should read --CropSin*--

Col. 38, line 27: "HighHairindicator indicates" should read --HighHairIndicator indicates--

Col. 39, line 9: "HighHairindicator" should read --HighHairIndicator--

Col. 39, line 11: "If (HighHairindicator" should read --If (HighHairIndicator--

Col. 39, line 14: "HighHairindicator" should read --HighHairIndicator--

Col. 39, line 15: "*HighHairindicator)" should read --*HighHairIndicator)--

Col. 39, line 49: "Crop   Cos*" should read --CropCos*--

Col. 39, line 51: "Crop   Sin*" should read --CropSin*--

Col. 39, line 57: "Crop   Cos*" should read --CropCos*--

Col. 39, line 59: "Crop   Sin*" should read --CropSin*--

Col. 39, line 61: "Crop   Cos*" should read --CropCos*--

Col. 39, line 63: "Crop   Sin*" should read --CropSin*--

Col. 40, line 42: "If     |EyeCenterX" should read --If |EyeCenterX--

Signed and Sealed this
Fourth Day of February, 2014

Michelle K. Lee
*Deputy Director of the United States Patent and Trademark Office*

CERTIFICATE OF CORRECTION (continued)
U.S. Pat. No. 8,498,453 B1

Col. 40, line 48: "HighHairindicator" should read --HighHairIndicator--

Col. 40, line 49: "If (HighHairindicator" should read --If (HighHairIndicator--

Col. 40, line 51: "HighHairindicator" should read --HighHairIndicator--

Col. 40, line 52: "*HighHairindicator)" should read --*HighHairIndicator)--

Col. 41, line 14: "tilt $\theta_{VARIBLE}-\theta_{EXPECTED}$" should read --tilt $\theta_{VARIABLE}=\theta_{EXPECTED}$--

Col. 41, line 20: "Crop   Cos*" should read --CropCos*--

Col. 41, line 22: "Crop   Sin*" should read --CropSin*--

Col. 41, line 28: "Crop     Cos*" should read --CropCos*--

Col. 41, line 30: "Crop     Sin*" should read --CropSin*--

Col. 42, line 18: "Crop   Cos*" should read --CropCos*--

Col. 42, line 20: "Crop   Sin*" should read --CropSin*--

In the Claims

Col. 45, line 15, claim 1: "locate of head points" should read --locate head points--